(12) United States Patent
West et al.

(10) Patent No.: US 9,166,524 B2
(45) Date of Patent: Oct. 20, 2015

(54) CONNECTING COMPONENTS FOR PHOTOVOLTAIC ARRAYS

(71) Applicant: SolarCity Corporation, San Mateo, CA (US)

(72) Inventors: Jack Raymond West, San Rafael, CA (US); Brian Atchley, San Rafael, CA (US); Tyrus Hawkes Hudson, San Rafael, CA (US); Emil Johansen, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 17 days.

(21) Appl. No.: 14/615,320

(22) Filed: Feb. 5, 2015

(65) Prior Publication Data

US 2015/0155823 A1      Jun. 4, 2015

Related U.S. Application Data

(63) Continuation of application No. 14/106,153, filed on Dec. 13, 2013, which is a continuation-in-part of application No. 13/325,054, filed on Dec. 13, 2011.

(60) Provisional application No. 61/737,066, filed on Dec. 13, 2012.

(51) Int. Cl.
*E04D 13/18* (2014.01)
*E04H 14/00* (2006.01)
*H02S 20/30* (2014.01)
*F16M 13/02* (2006.01)
*H02S 40/30* (2014.01)

(52) U.S. Cl.
CPC .............. *H02S 20/30* (2014.12); *F16M 13/022* (2013.01); *H02S 40/30* (2014.12)

(58) Field of Classification Search
CPC ......... H02S 20/30; H02S 20/23; H02S 20/25; H02S 20/24; F16M 13/022; F24J 2/5245; F24J 2/5258; F24J 2002/522; F24J 2/5256; F24J 2/5254; Y02B 10/12; Y02B 10/20; Y02E 10/47; Y02E 10/50
See application file for complete search history.

(56) References Cited

U.S. PATENT DOCUMENTS

| 6,082,070 A | 7/2000 | Jen |
| 7,260,919 B1 | 8/2007 | Spransy et al. |
| 8,590,084 B2 | 11/2013 | de la Chevrotiere |
| 8,695,290 B1 | 4/2014 | Kim et al. |
| 8,800,238 B2 | 8/2014 | Davies |
| 2001/0004823 A1 | 6/2001 | Cronin et al. |
| 2005/0257453 A1 | 11/2005 | Cinnamon |
| 2007/0212935 A1* | 9/2007 | Lenox ........................... 439/567 |

(Continued)

*Primary Examiner* — Brian D Mattei
(74) *Attorney, Agent, or Firm* — Larry D. Johnson

(57) ABSTRACT

The invention includes an apparatus for mounting a photovoltaic (PV) module on a structure where the apparatus includes a base portion, a stud portion, and a coupling portion. The coupling portion includes a male portion that acts as a spring under load and a clip portion that penetrates the PV module frame to create a grounding bond. The apparatus includes a lower jaw, shaped to pry open a groove, and a key portion that can compress to allow for tolerances. The invention further includes a clip with one or more tabs and one or more teeth. The invention further includes a replacement roof tile which includes a support structure with a horizontal flange, a vertical component, a horizontal component, a flashing with an upper surface and a lower surface, and a tile-shaped metal surface having a curvilinear shape that reflects the shapes of adjacent tiles.

14 Claims, 58 Drawing Sheets

(56) References Cited

U.S. PATENT DOCUMENTS

| | | | |
|---|---|---|---|
| 2008/0053517 A1* | 3/2008 | Plaisted et al. | 136/251 |
| 2009/0032100 A1 | 2/2009 | Oak | |
| 2009/0050191 A1 | 2/2009 | Young et al. | |
| 2009/0293941 A1 | 12/2009 | Luch | |
| 2010/0122509 A1 | 5/2010 | LaCasse | |
| 2011/0138585 A1* | 6/2011 | Kmita et al. | 24/522 |
| 2011/0146763 A1* | 6/2011 | Sagayama | 136/251 |
| 2011/0179727 A1 | 7/2011 | Liu | |
| 2011/0214365 A1* | 9/2011 | Aftanas | 52/173.3 |
| 2011/0214368 A1* | 9/2011 | Haddock et al. | 52/173.3 |
| 2012/0152326 A1 | 6/2012 | West | |
| 2012/0266946 A1 | 10/2012 | West | |
| 2014/0026946 A1 | 1/2014 | West | |
| 2014/0175244 A1 | 6/2014 | West et al. | |

* cited by examiner

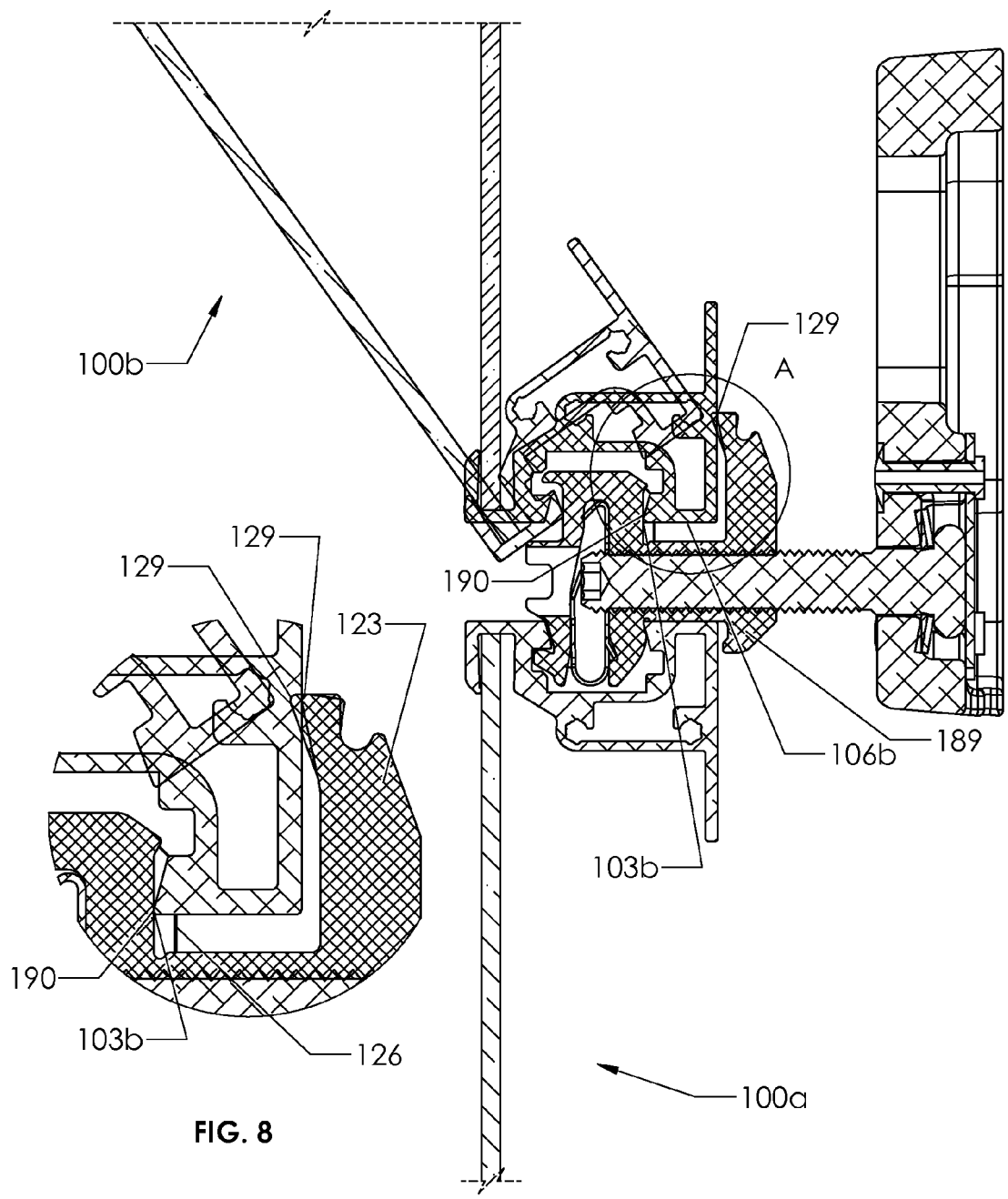

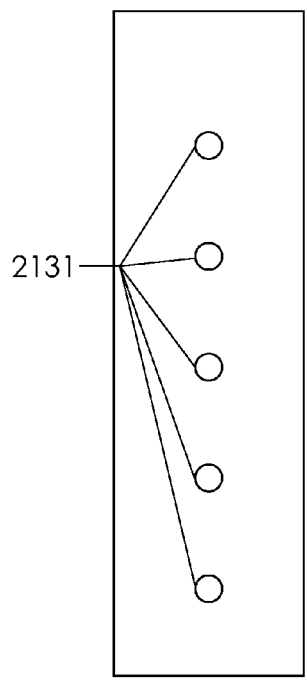
FIG. 25
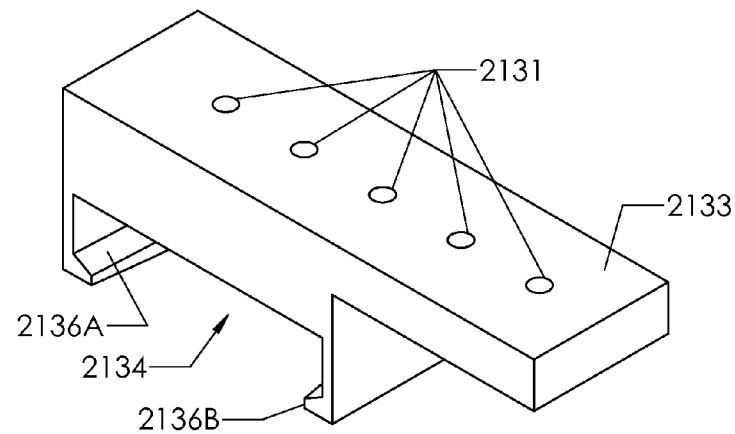
FIG. 24
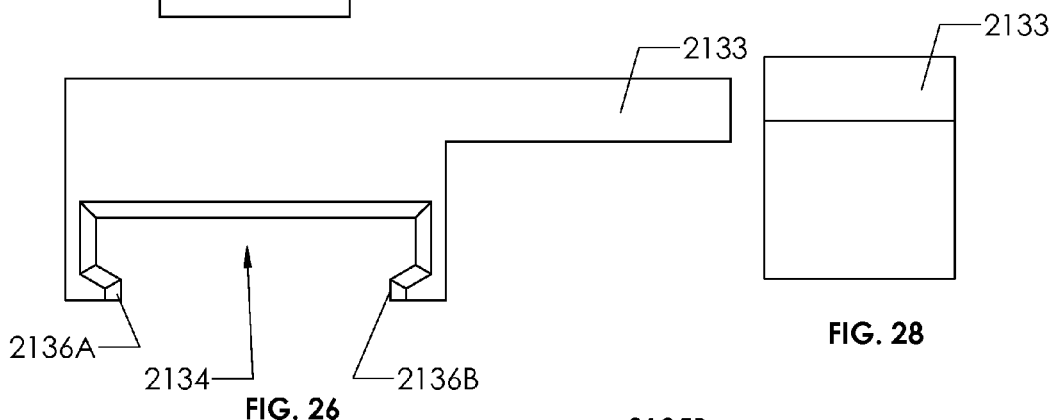
FIG. 26  FIG. 28
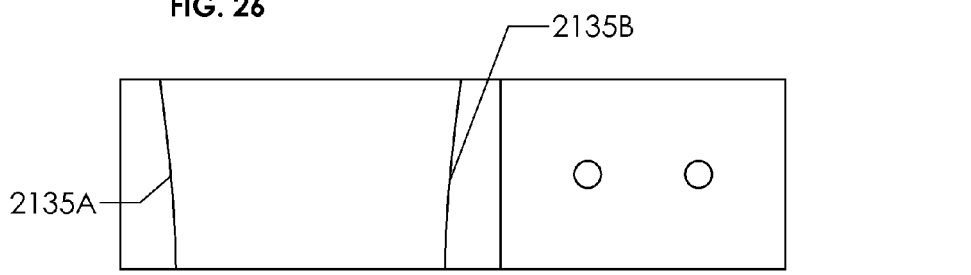
FIG. 27

CONNECTING COMPONENTS FOR PHOTOVOLTAIC ARRAYS

CROSS REFERENCES

The present application is a continuation of U.S. application Ser. No. 14/106,153, filed Dec. 13, 2013, entitled "Connecting Components for Photovoltaic Arrays", which is a continuation-in-part of U.S. application Ser. No. 13/325,054, filed Dec. 13, 2011, entitled "Discrete Attachment Point Apparatus and System for Photovoltaic Arrays". U.S. application Ser. No. 14/106,153 also claimed the benefit of the filing date of U.S. Provisional Patent Application Ser. No. 61/737,066 filed Dec. 13, 2012, entitled "Connecting Components for Photovoltaic Arrays".

BACKGROUND

Solar panels and related equipment are frequently mounted on support structures (such as roofs), or other objects that require a substantially water-tight or water resistant connection. For example, solar panels mounted on a tiled roof of a building are commonly attached to the roof via an attachment system that includes a roof hook or flashing device that allows a roof-penetrating member, such as a lag screw, to penetrate a portion of a roofing membrane without compromising the roof's ability to prevent water from entering the building. Prior art attempts to develop such flashing devices have suffered from a number a drawbacks. For example, most flashings are flat and lack the ability to mount solar panels or related equipment on Spanish tile or S tiled roofs. Most conventional flashings are designed for shingled or metal roofs and would require cutting or modifying tiles for installation. Other flashing devices do not provide adequate pressure on the seal around the lag screw. Others do not allow for a separately positionable bracket that enables adjustability relative to the lag screw after installation thereof. Others do not work well with rail-free mounting systems such as those disclosed in prior art patents and other patents and applications of common assignee and at least one common inventor. Others do not comprise a support portion with multiple holes or slots for connecting brackets and/or other devices in various positions to allow for connection to different locations along a photovoltaic ("PV") module frame. And still others are costly, do not optimize materials usage, create seals from brittle materials that have higher failure rates than resilient materials, require expensive manufacturing methods, and/or do not properly account for misalignment of components during installation. The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, apparatus, tools, and methods which are meant to be exemplary and illustrative, not limiting in scope. In various embodiments, one or more of the above-described problems have been reduced or eliminated, while other embodiments are directed to other advantages or improvements.

One embodiment of the invention comprises an apparatus for mounting a PV module on a structure where the apparatus includes a base portion, a stud portion, and a coupling portion. The coupling portion comprises a male portion that may act as a spring under load and a clip portion that may penetrate the PV module frame to create a grounding bond. The apparatus includes a lower jaw shaped to pry open a groove. The apparatus further includes a key portion that can compress to allow for tolerances. One embodiment of the invention further comprises a method for mounting PV modules on a structure comprising (i) securing the base of a leveling foot to a substrate or structure, (ii) inserting the key portion of the coupling into the groove of a PV module at an angle between five and seventy-five degrees, (iii) rotating the PV module downward toward the substrate or structure until it is parallel with the substrate or structure, causing the key portion to fully engage the groove, causing spring contraction of the key, and causing spring expansion of the groove, (iv) resting the outside surface of the frame of a second PV module on the top surface of the coupling portion such that the second PV module is at a ninety degree angle to the substrate, and (v) rotating the second PV module downward until roughly parallel with the first PV module. One embodiment of the invention facilitates ease of mounting, allows for greater tolerances, and provides electrical grounding between components. One embodiment of the invention further comprises a clip comprising one or more tabs and one or more teeth where the tabs secure the clip to a coupling portion of a leveling foot and the teeth penetrate (i) the exterior surface of a PV module when the PV module engages the coupling portion and (ii) a surface of the coupling portion when the clip engages the coupling portion, thereby creating a ground bond between the clip, the coupling portion, and the PV module. One embodiment of the invention improves and simplifies electrical grounding between components. One embodiment of the invention further comprises a replacement roof tile including a support structure with a horizontal flange, a vertical component, and a horizontal component, a flashing with an upper surface and a lower surface, and a tile-shaped metal surface having a curvilinear shape that reflects the shapes of adjacent tiles. One embodiment of the invention facilitates the installation of PV arrays on tile roofs, reduces installation time, and improves aesthetics. Lastly, the invention further comprises a method for mounting a replacement roof tile comprising mounting a support structure to a substrate, mounting a tile-shaped metal surface on a support structure, mounting a top arm to a support structure over, above, or atop a tile-shaped metal surface, mounting a leveling foot to a top arm, and mounting a PV module to a leveling foot. One embodiment of the invention facilitates the benefits of the replacement roof tile.

In addition to the exemplary aspects and embodiments described above, further aspects and embodiments will become apparent by reference to the figures and by study of the following detailed descriptions.

BRIEF DESCRIPTION OF THE DRAWINGS

Demonstrative embodiments are illustrated in referenced figures and drawings. It is intended that the embodiments and figures disclosed herein are to be considered illustrative rather than restrictive.

FIG. 7 is a cross-section of a bisected leveling foot with the PV module from FIG. 6 rotating downward to complete its installation.

FIG. 8 is an enlarged view of section A from FIG. 7.

FIG. 24 is an isometric view of a top arm.

FIG. 25 is a top view of a top arm.

FIG. 26 is a side view of a top arm.

FIG. 27 is a bottom view of a top arm.

FIG. 28 is a front view of a top arm.

DETAILED DESCRIPTION OF ONE OR MORE EMBODIMENTS OF THE INVENTION

Figure 1:
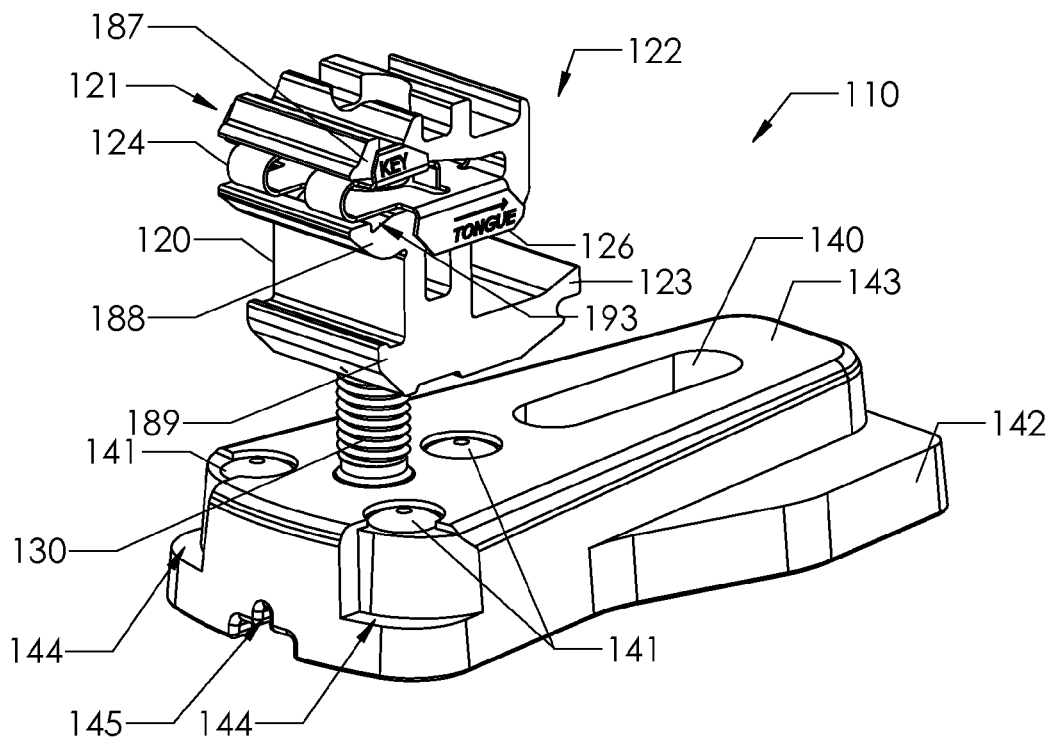
FIG. 1 is an isometric view of a leveling foot.

Terms. With reference to the figures and description herein but without limitation:

Adjacent refers to being positioned next to or adjoining or neighboring, or having a common vertex or common side. Thus, adjacent PV panels would include PV panels that have one side close to (from a few inches apart to abutting) and facing one side of another PV panel. Sometimes, but not always, the corners of adjacent panels align; so four adjacent panels would have one corner each that nearly or actually touch the other three corners.

Adjustable refers to the capability of being changed so as to match or fit.

Adjustably connected refers to an object, item, mechanism, apparatus, combination, feature, link or the like that loosely, slidable, or rigidly links, interlocks, joins, unites or fastens two or more things together in a manner that can be changed so as to match or fit.

Attach or attachment refers to one or more items, mechanisms, objects, things, structures or the like which are joined, fastened, secured, affixed or connected to another item, or the like in a permanent, removable, secured or non-permanent manner.

Axis of rotation refers to a center around which something rotates, sometimes considered a straight line through all fixed points of a rotating rigid body around which all other points of the body move in a circular manner.

Beneath refers to extending or being situated directly or substantially underneath, typically with close proximity or contact.

Between refers to being situated, located, or otherwise oriented at, in, or across the space separating two objects or regions.

Connect or connecting refers to loosely, slidably, or rigidly bringing together or into contact with or joining or fastening to form a link or association between two or more items, mechanisms, objects, things, structures or the like.

Connector refers to an object, item, mechanism, apparatus, combination, feature, link or the like that loosely, slidable, or rigidly links, interlocks, joins, unites or fastens two or more things together. May also include a device, an object, item, mechanism, apparatus, combination, feature, link or the like for keeping two parts of an electric or electronic circuit in contact.

Coplanar refers to the circumstance where two or more objects are situated, located, or otherwise substantially oriented in the same plane.

Couple refers to loosely, slidably, or rigidly joining, linking, interlocking, connecting or mating two or more objects or items, mechanisms, objects, things, structures or the like together.

Coupling refers to an object, item, mechanism, apparatus, combination, feature, link or the like that loosely, slidably, or rigidly joins, links, mates, interlocks, or connects two things together.

Crossbar refers to a mounting component that may be laterally applied to a component of combination of components that are mounted to a substrate or structure. Without limitation, a top arm or upper pedestal may be a crossbar.

Double male connector refers to a connector (see above) having two male or insertable members, usually used for connecting two female or receiving parts or coupling members together.

Disengage refers to detaching, freeing, loosening, extricating, separating or releasing from something that holds-fast, connects, couples or entangles. See Engagement below.

Enable refers to facilitating or making possible, able, feasible, practical, operational, or easy; or to cause to operate.

End refers to a final part, termination, extent or extremity of an object, item, mechanism, apparatus, combination, feature, or the like that has a length.

Engage refers to interlocking or meshing or more items, mechanisms, objects, things, structures or the like. See Disengage above.

Frame refers to an essentially rigid structure that surrounds or encloses a periphery of an item, object, mechanism, apparatus, combination, feature, or the like.

Freely refers to being without or exempt from substantial restriction or interference by a given condition or circumstance. May also refer to being unobstructed, unconstrained, unrestricted or not being subject to external restraint.

Gap refers to a break, void, opening, cleft, breach, aperture, separation, or space, as well as an interruption of continuity, between two objects, or within an object.

Groove refers to a long, narrow cut, rut, indentation, channel, furrow, gutter, slot or depression often used to guide motion or receive a corresponding ridge or tongue.

Height adjustable refers to change or adapt to bring items, objects, mechanisms, apparatus, combinations, features, components or the like into a proper, desired or preferred relationship of a distance or elevation above a recognized level, such as the ground or a support surface.

Insertable refers to an object, item, mechanism, apparatus, combination, feature, link or the like which is capable of being put in, entered into, set within, introduced, inset, inserted, placed, fit or thrust into another an object, item, mechanism, apparatus, combination, feature, link or the like.

Integral with refers to being essential or necessary for completeness, constituent, completing, containing, entire, or forming a unit. May also refer to consisting or composed of parts that together constitute a whole.

Laminate or PV laminate refers to a photovoltaic device having an interconnected assembly of solar cells, also known as photovoltaic cells which is frequently, but not always, laminated with glass and/or other materials.

Length refers to a measurement or extent of an object, item, mechanism, apparatus, combination, feature, link or the like from end to end, usually along the greater or longer of the two or three dimensions of the body; in distinction from breadth or width.

Located refers to where an object or a series of objects is physically situated with respect to one or more other objects.

Locked refers to fastened, secured or interlocked.

Orthogonally refers to relating to or composed of right angles, perpendicular or having perpendicular slopes or tangents at a point of intersection.

Near refers to a short distance from an object or location.

Perimeter refers to an essentially continuous line forming the boundary, periphery or circuit of a closed geometric figure; the outer limits of an area.

Photovoltaic module (sometimes referred to as a PV module, solar panel, solar module, or photovoltaic panel) refers to a packaged, interconnected assembly of solar cells, also known as photovoltaic cells, frequently, but not always, laminated with glass and other materials and sometimes surrounded by a frame. A plurality of PV modules are commonly used to form a larger photovoltaic system referred to as a PV array (see below), to provide electricity for commercial, industrial and residential applications.

Pivotally refers to or relates to an object, item, mechanism, apparatus, combination, feature, link or the like serving as a pivot or the central point, pin, shaft or contact on which another object, item, mechanism, apparatus, combination, feature, link or the like turns, swings, rotates or oscillates.

Positionable refers to an object, item, mechanism, apparatus, combination, feature, link or the like which is capable of being positioned, placed or arranged in a particular place or way.

Preload refers to the force that must be overcome to separate a joint once force is applied to attach a coupling to the joint. The applied force deforms the coupling and/or one or more of the components of the joint and becomes the force that must be overcome to separate the joint.

PV laminate refers to a photovoltaic device having an interconnected assembly of solar cells, also known as photovoltaic cells which is frequently, but not always, laminated with glass and/or other materials. A PV laminate with an integral frame which may support the PV laminate is sometimes referred to as a PV module.

PV module refers to a photovoltaic module (sometimes referred to as a solar panel or photovoltaic panel) is a packaged interconnected assembly of solar cells, also known as photovoltaic cells, frequently, but not always, laminated with glass and other materials and sometimes surrounded by a frame. A plurality of PV modules are commonly used to form a larger photovoltaic system referred to as a PV array (see below), to provide electricity for commercial, industrial and residential applications.

PV array refers to a plurality of photovoltaic modules connected together often in a pattern of rows and columns with module sides placed close to or touching other modules.

Rail refers to refers to a relatively straight, usually essentially evenly shaped along its length, rod, beam, girder, profile or structural member or the like, or plurality of such, of essentially rigid material used as a fastener, support, barrier, or structural or mechanical member.

Rail member refers to a structural entity, element or unit (or part of such entity, element, or unit) that acts as or embodies a rail.

Removable refers to one or more items, mechanisms, objects, things, structures or the like which are capable of being removed, detached, dismounted from or taken-away from another item or the like, or combination.

Rectilinear refers to one or more items, mechanisms, objects, things, structures or the like which are essentially bounded by, characterized by or forming straight and substantially parallel lines.

Rigidly couples refers to joining, linking, connecting or mating two or more objects or items, mechanisms, objects, things, components, structures or the like together in a non-flexible manner that is difficult to bend or be forced out of shape.

Roof refers to a structure or protective covering that covers or forms the upper covering or top of a building. The upper surface of a roof is often used as a support surface for mounting, connecting or otherwise attaching a PV module or a PV array.

Rotatably refers to one or more items, mechanisms, objects, things, structures or the like which are capable of being rotated, revolved or turned around or about an axis or center.

Skirt refers to an edging, molding or covering that may be fixed to the edge of a PV module to conceal or block the bottom area under a PV array when the PV array is mounted to a support surface.

Span refers to an extent or measure of space between, or the distance between two points or extremities.

Support or supporting refers to one or more items, mechanisms, objects, things, structures or the like which are capable of bearing weight or other force, often to keep the item or the like from falling, sinking, slipping or otherwise moving out of a position.

Support structure refers to a structure, such as a roof, table or the ground which may provide a base for securing PV modules to form a PV array.

Threaded refers to one or more items, mechanisms, objects, things, structures or the like which have, embody or include an essentially helical or spiral ridge or rib, as on a screw, nut, or bolt.

Various locations refer to places, positions or sites that are different from one another, more than one, individual or separate.

Vertical height adjustment refers to change or adapt to bring items, mechanisms, objects, things, components, structures or the like or components into a proper, desired or preferred relationship of a distance or elevation above a recognized level, such as the ground or a support surface.

Width refers to the state, quality, or fact of being wide or a measurement or extent of something from side to side; in distinction from breadth or length.

Figure 2:
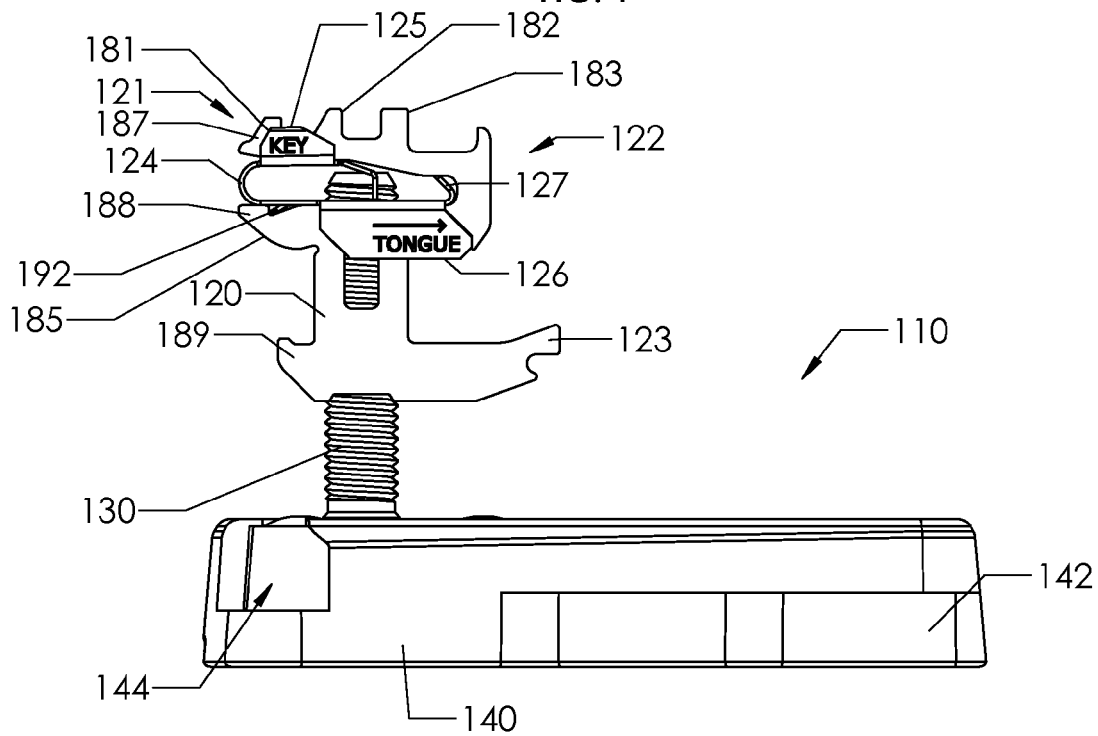
FIG. 2 is an orthogonal view of a leveling foot.
Figure 3:
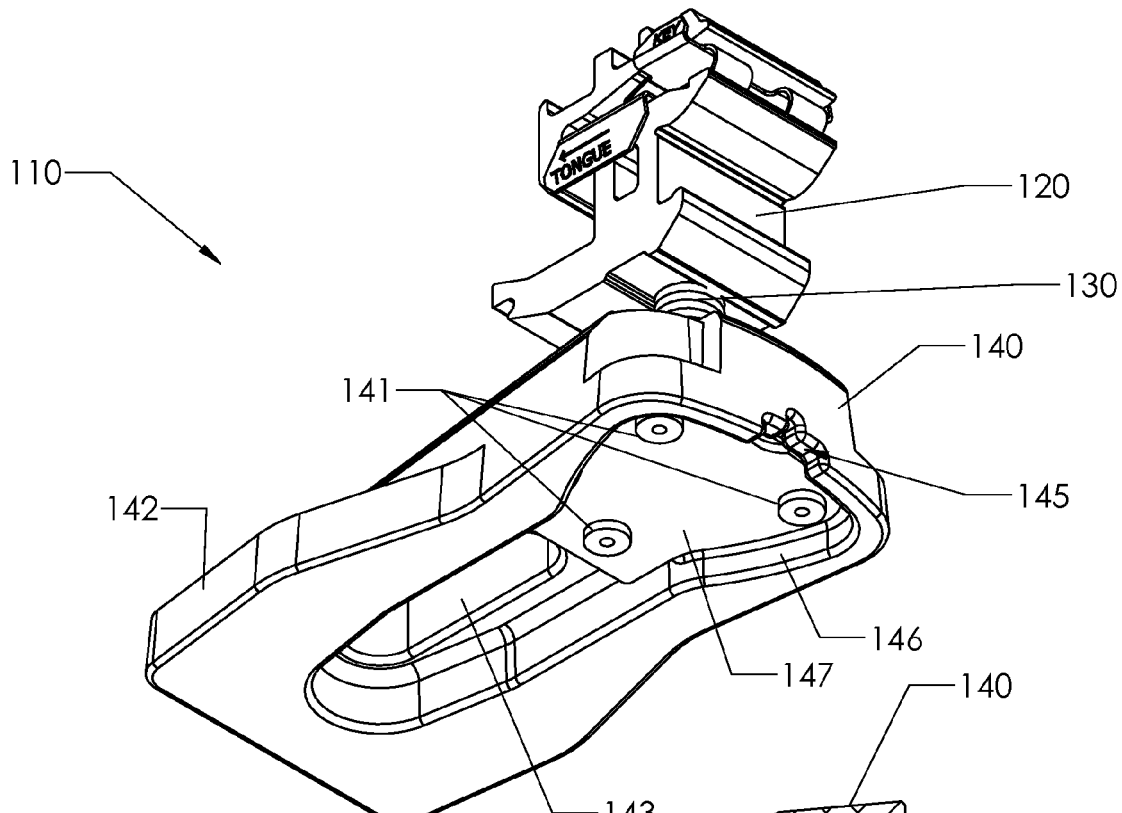
FIG. 3 is an isometric view of the underside of a leveling foot.
Figure 4:
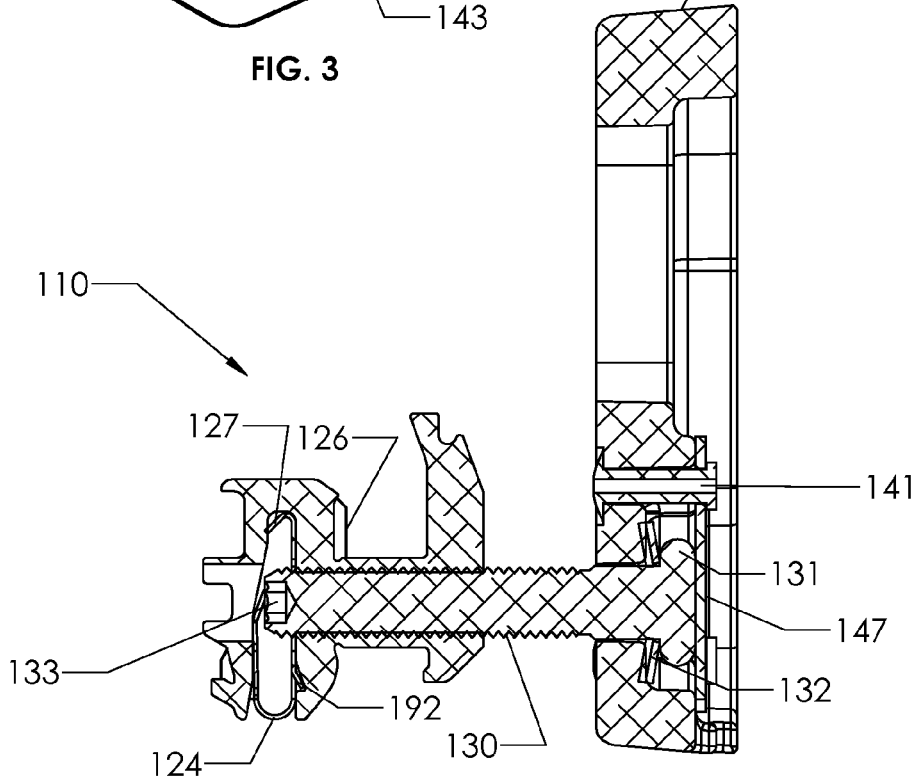
FIG. 4 is a cross-section of a bisected leveling foot.
Figure 5:
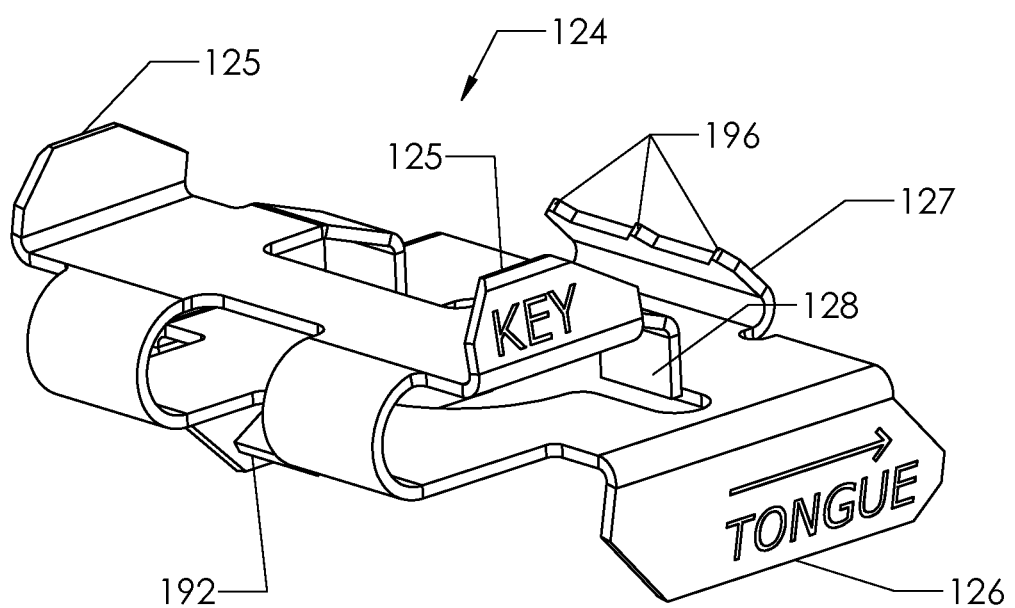
FIG. 5 is an isometric view of the clip of a leveling foot.

FIG. 1 shows a perspective view of a leveling foot, such as leveling foot 110, for coupling PV modules together and height-adjustably attaching one or more PV modules to a mounting device or flashing mount (such as those described below and/or shown and disclosed in detail at U.S. patent application Ser. No. 13/673,985 entitled: "Solar Panel Attachment System", filed approximately Nov. 9, 2012; which is incorporated by reference herein in its entirety) and then to a structure, such as a roof; or other support structure. Leveling foot 110 may provide some of the same functions as other leveling feet described in other patent applications of at least one common inventor or common assignee, while also providing a number of novel features and functions. FIG. 2 shows a side view of leveling foot 110. FIG. 3 shows a perspective view looking from underneath leveling foot 110, and FIG. 4 shows a section cut through the middle of leveling foot 110. FIG. 5 shows a perspective view of a grounding clip 124. Throughout the figures, like numerals refer to like structures or features.

Leveling foot 110 comprises a coupling for connecting adjacent PV modules together, such as spring coupling 120. Spring coupling 120 may comprise a key side 121 and a tongue side 122, each or either for connecting to a groove (shown later) in a PV module frame as disclosed in other patents and patent applications of at least one common inventor or common assignee. In other embodiments spring coupling may wrap around a PV module frame; also as described in other patent applications of at least one common inventor or common assignee. Generally, key side 121 may rotatably engage a frame and substantially resist movement of a PV module in the plane of the top of surface of a PV module. Tongue side 122 may also rotatably engage a PV module frame, yet it may further allow for variable positioning along one axis in the plane of the top of surface of the PV module. Some novel features of the instant spring coupling 120 include, but are not limited to, upper jaw 187, which may act at least partially as a spring under load; grounding clip 124, which may at least partially cut into the PV frame to create a grounding bond; and tail 123 and support 189, each or either of which may provide support to a bottom side of a PV module frame. Leveling foot 110 may further comprise a base 140, which may retain stud 130 and provide a slot 143 for a fastener that connects leveling foot 110 directly to a support structure or to a flashing device or other mounting hardware. Each of these features and others will be described in more detail below.

Coupling 120 may also comprise a separate grounding clip 124 that may be made, for example, from metal and may be installed primarily between upper and lower jaws 187, 188 as shown in FIGS. 1-5. FIG. 5 shows grounding clip 124 in isolation from coupling 120 so that its features may be better understood. Grounding clip 124 may be inserted, for example at the factory or at a later time, from the left (as shown in FIG. 2) and pushed in the direction of the arrow until a tab 192 drops into a slot 193 on a top surface of lower jaw 188. Grounding clip 124 may further comprise a top tab 127 with teeth 196 for scraping along a bottom surface of upper jaw 187 to ensure a ground bond between grounding clip 124 and the main body of spring coupling 120. One or more grounding teeth or edges 125 on key side 121 may cut into an upper lip or other portion of frame 104a upon installation, and grounding teeth or edges 126 may cut into a lower lip or other portion of frame 104b upon installation. Thus, mechanical connection of modules 100a and 100b to coupling 120, as described below, may further result in establishment of a ground bond between frame 104a and frame 104b. In some embodiments grounding edges 126 and 125 may also flex slightly under load in order to take up tolerance.

Base 140 of leveling foot 110 may comprise a retainer plate on a bottom side, such as retainer plate 147, may be held to base 140 via fasteners, rivets, screws, bolts, nails, or the like, such as rivets 141. Retainer plate 147 may be inset in a recess 146 in a bottom side of base 140 so that base 140 may sit evenly upon a mounting surface. Stud 130 may comprise a head 131 that is captured between retainer plate 147 and base 140 and resists upward motion of stud under load. An optional disc spring or resilient material such as rubber washer 132 may be captured between stud head 131 and base 140 to take up tolerance and provide a consistent and smooth feel while rotating stud 130. Base 140 may further comprise flanges 142 for widening a width of base 140 (for enhanced strength) with minimum material consumption and cutouts 144 for connecting other hardware, such as a lifter for raising a height of modules 100a, 100b. Base 140 may also comprise a cutout 145 for capturing a string line that may be used to line up a row of leveling feet 110 on a support structure.

Stud 130 may operate in a similar manner to leveling foot studs as described in other patents or patent applications of at least one common inventor or common assignee. For example, rotation of stud 130 from the top via drive feature, such as hex drive feature 133, may allow height adjustability for coupling 120 (and thus modules 100a, 100b). In other embodiments coupling 120 and base 140 are one piece with no height adjustment mechanisms between them.

Figure 6:
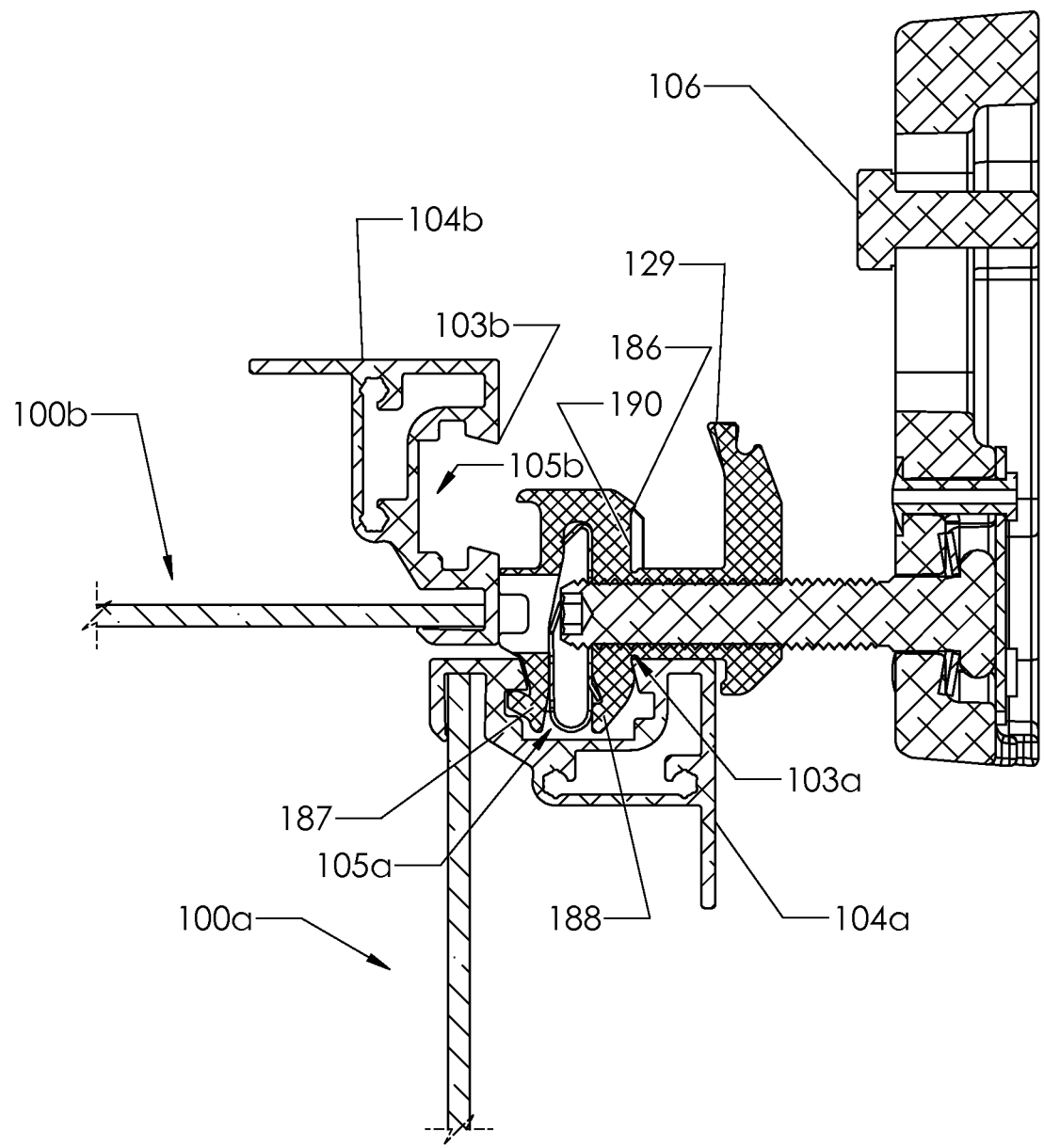
FIG. 6 is a cross section of a bisected leveling foot with one PV module installed and one PV module placed atop the leveling foot as an initial installation step.

The discussion will now be expanded to include FIGS. 6-8 which show section views through two PV modules 100a and 100b during the installation process as spring coupling 120 is utilized to connect modules 100a and 100b together. The section cut is taken through modules 100a, 100b in a location just behind the outer flaps (labeled "KEY" and "TONGUE") of grounding clip 124 (orthogonal frame members not shown for clarity). FIG. 6 shows module 100a already connected to spring coupling 120 on key side 121. In a similar manner to the key side of prior couplings described in other patents or patent applications of at least one common inventor or common assignee, the key side is engaged with a groove in the frame 104a of module 100a, such as groove 105a, by inserting key side 121 at an angle, such as an angle between 5 and 75 degrees (or commonly 5-20, 20-30, 30-50, 50-75, 5-25, 25-50, 50-75 degrees), then rotating leveling foot 110 downward (clockwise as shown in FIG. 6) until the lowest point of hump 185 passes by point or edge 103a on a lip of groove 105a. Hump 185 may be sized such that key side 121 slightly pries open groove 105a and/or upper and lower jaws 187, 188 may flex closer together during the rotating engagement process, then after hump 185 passes point or edge 103a, a spring force resulting from groove 103a flexing open and/or upper jaw 187 flexing downward towards lower jaw 188 may cause key side 121 to snap into, rest stably within, or connect to frame 104a.

One of skill in the art will recognize that the combination of groove 105a being able to spring open and jaws 187, 188 being able to spring closer together creates a double spring action that may provide an improved means and structure for taking up tolerance, such as may be required when the dimensions of the mating parts vary slightly from the nominal dimensions. For example, if the width of groove 105a has a manufacturing tolerance of ±0.020" and the height of key side 121 has a manufacturing tolerance of ±0.010", then without the spring action of jaws 187, 188 the spring action of groove 105a would need to have the ability to spring open by up to 0.060" in order to account for all possible conditions within the tolerance bands given. While this may be possible as long as the spring is very flexible (for example, when the spring rate is low), the spring force delivered by groove 105a will increase the further groove 105a opens (as long as it is not pried open past the point of plastic deformation), thereby increasing the difficulty of installation with increasing interference between the two mating parts. Yet, since the lower jaw of groove 105a must also provide structural support when uplift forces are present on module 100a and/or 100b, a reasonably stiff spring may be required. Thus, this requirement for a weak spring in order to make installation easy across the whole tolerance band is opposing the structural requirement for a stiff spring in order to resist uplift. The instant disclosure at least partially solves this problem by including a second spring in the form of upper jaw 187 which may flex toward lower jaw 188 during installation in order to provide additional tolerance take-up and effectively reduce the amount that groove 105a has to spring open to connect to a given key side 121. This reduction also improves the feel of the device during installation (and eases installation) since the highest spring force from groove 105a is reduced. Furthermore, upper jaw spring 187 may not need to resist significant uplift or downward forces due to presence of lower jaw 188 and support 189, thereby enabling upper jaw spring 187 to be a relatively weak spring which may result in a more consistent feel when inserting key side 121 into grooves 105*a* of varying width.

Catch 181 may resist horizontal movement of coupling 120 in groove 105*a* and rib 182 may serve as a guide during installation. During installation, an installer may align rib 182 with an edge of groove 105*a*, then pivot coupling around a base of rib 182 to install.

With coupling 120 connected to module 100*a*, a next installation step may typically include at least partial connection of leveling foot 110 to a support structure or other hardware via a fastener, bolt, lag screw, nail, pin, hook, stud, or the like, such as fastener 106. In some embodiments leveling foot 110 may be connected directly to a flashing device, such as one of the flashing devices described in U.S. patent application Ser. No. 13/673,985 entitled: "Solar Panel Attachment System", filed approximately Nov. 9, 2012. In other embodiments leveling foot 110 may be connected directly to a roof or other support structure such as a ground mount rack, a rail, a profile, a beam, a wall, or a land/water/air/space vehicle, such as a boat. In still other embodiments, as be described below, leveling foot 110 may be connected to a tile flashing mount, or similar structure(s).

With module 100*a* connected to a leveling foot and attached to a support structure (not shown), PV module 100*b* may also be connected to coupling 120. Module 100*b* may be first placed on top of coupling 120 at approximately 90 degrees (usually between 80-110 degrees) relative to module 100*a* as shown in FIG. 6. Ribs 182 and 183 may provide a resting place for a portion of frame 104*b*. Subsequent rotation of module 100*b* down (clockwise), as shown in FIG. 7 by dashed lines at an intermediate position and solid lines at a final position for module 100*b*, demonstrates how a slot between rib 183 and upper catch 184 serves to at least partially retain an upper lip of groove 105*b* and thus help to guide module 100*b* down and into the final position.

As shown in FIGS. 6-8, coupling 120 engages lower jaw 106*b* of frame 104*b* in a pivot-fit action as module 100*b* is rotated into position. Specifically, as module 100*b* rotates approximately 2-30 degrees from horizontal, a bottom surface of frame 104*b* may engage with and begin to roughly pivot on an edge 129 of tail 123. This pivoting action may force edge 103*b* upward and cause it to press against a bottom portion 190 of tongue side 122. Thus two offset bearing portions (lower portion 190 and edge 129) effectively connect coupling 120 to lower jaw 106*b* of frame 104*b*. Offset bearing portions 190, 129 create a pivot-fit connection as understood in the art, and as shown and described in other patents or patent applications of at least one common inventor or common assignee. The length of tongue portion (left to right in FIG. 6) is such that a final position of module 100*b* may be adjusted left to right to take up tolerances at the module level as an array of modules 100 are being assembled. Lower bump or catch 186 serves to tighten the pivot-fit between coupling 120 and lower jaw 106*b* as module 100*b* is moved horizontally, without rotating significantly out of plane with module 100*a*, such as when fully installed yet under a heavy wind load that causes uplift forces on module 100*b*. Upper catch 184 may also act to at least partially resist tongue side 122 from being pulled out, while module 100*b* is still approximately planar with module 100*a*, by contacting an inside surface of an upper lip of groove 105*b*.

FIG. 8 shows a close-up of the circled region in FIG. 7. This figure shows how tail 123 may flex downward effectively lowering edge 129 and increasing a vertical distance between bearing portions 190, 129 (the dashed lines indicate a nominal position of tail 123 prior to installation of module 100*b*).

Thus, tail 123 may spring open to take up tolerance. One of skill in the art will note that the spring rate on tongue side 122 may not need to be as low as on key side 121 since the spring on tongue side 122 is being opened by a lever arm consisting of the width (or length) of module 101*b*, whereas the spring on key side 121 is being opened by hand with substantially less leverage. Therefore, a double spring action may not be required on tongue side 122, though some embodiments do comprise a double spring action on both sides.

Support 189 may provide support to module 100*a* under heavy downward loads. Since upper jaw 187 is a spring, heavy loads may push module 100*a* down slightly until it contacts support 189.

In other embodiments a distance between edge 129 and lower portion 190 is increased such that the entire module frame 104*b* is locked between the bearing portions 190, 129 upon rotation. In other embodiments a horizontal distance between edge 129 and lower portion 190 is increased or decreased to change an optimum angle of insertion and/or to change an amount of interference between edge 103*b* and lower portion 190 when rotated down near zero degrees (module 100*b* is shown as approximately planar with module 100*a*).

Coupling 120 may be constructed from extruded material such as aluminum or plastic, though other materials or composites are suitable as well and explicitly disclosed herein. Base 140 may be made from cast or machined metal or plastic or other suitable materials or composites and are explicitly disclosed herein.

Some benefits of leveling foot 110 may include:

More consistent and smoother feel while connecting to a range of different groove 105 dimensions within a tolerance range thereof;

Improved installation process via provision of inclusion of various ribs, catches, and/or slots to guide coupling 120 into groove 105*a* and/or groove 105*b* into final engagement with coupling 120.

Figure 9:
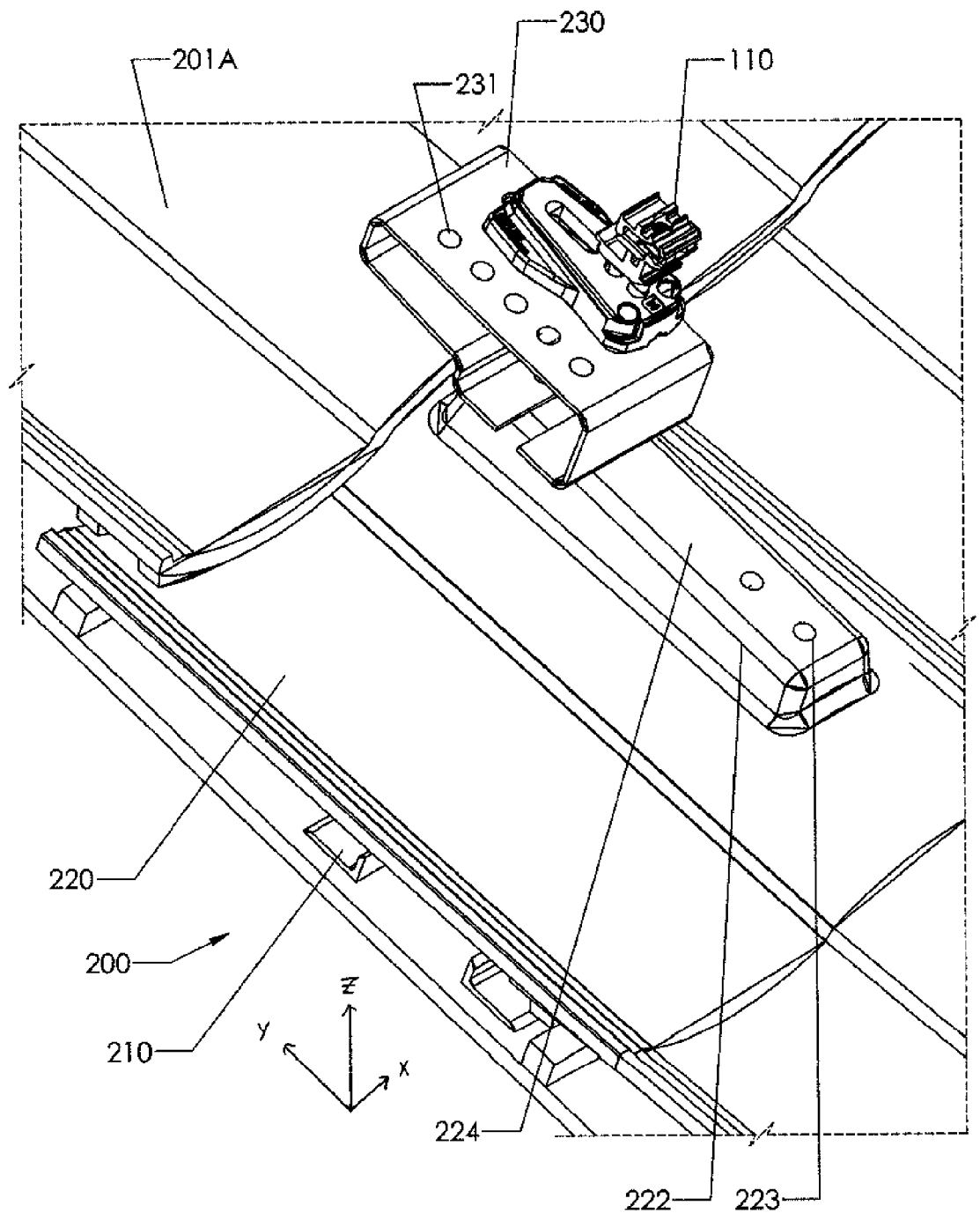
FIG. 9 is an isometric view of a replacement tile installed on a roof with a top arm and leveling foot installed.
Figure 10:
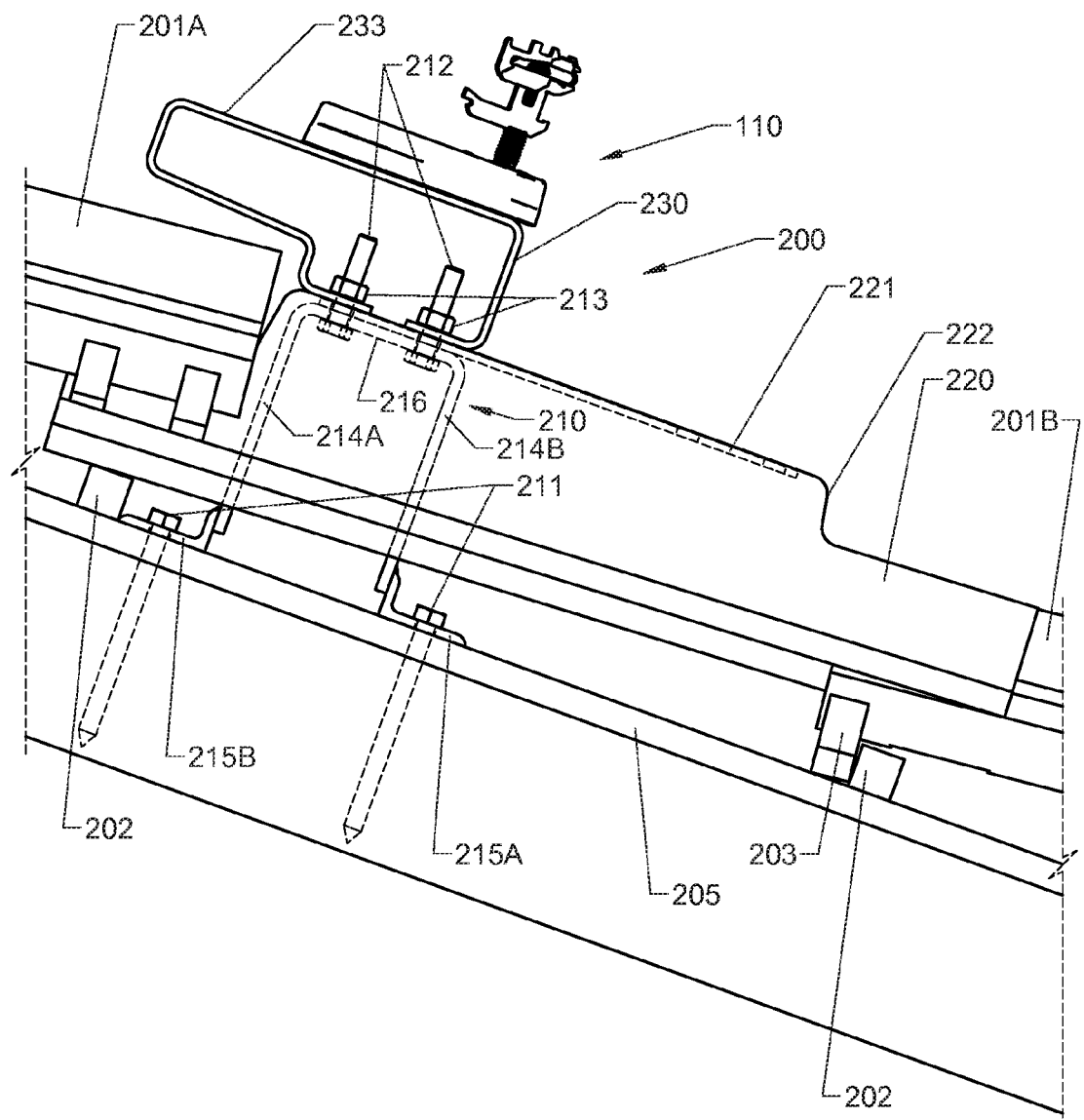
FIG. 10 is an orthogonal view of the installation shown in FIG. 9 where hidden components are detailed with dashed lines.

FIGS. 9-16 show an embodiment of a tile flashing mount 200. FIG. 9 shows a perspective view of a device for replacing a tile on a tile roof with hardware that connects to a support structure below and a PV module above, such as tile flashing mount 200. FIG. 9 shows the x, y, and z axes in the lower left corner. For purposes of this disclosure "up", "vertical", "above", etc. shall reference or refer to the direction of the arrow along the z-axis, which is approximately perpendicular to the roof; "lateral", "side-side", etc. shall reference or refer to the direction of the arrow (or its opposite) along the x-axis; and "up-roof", "down-roof", etc. shall reference or refer to the direction of the arrow (or its opposite) along the y-axis. The view in FIG. 9 shows a tile at the edge of a roof being replaced by tile flashing mount 200, yet it may replace any of, or multiples of, the tiles on a roof. Typically, tile flashing mount 200 may be used to replace a tile that is over a rafter, purlin, or other structural member so that tile flashing mount may be attached to such structural member. FIG. 10 shows a side view of tile flashing mount 200.

Tile flashing mount 200 may comprise: a rigid structural portion for resting on and connecting to a roof in the area where a tile has been removed, such as base 210; a relatively thin flashing portion formed to mate with surrounding tiles and base 210 and/or to shed water away from the inside of the building, such as flashing 220; and an upper portion for receiving a PV module, coupling, connecting bracket, or leveling foot and connecting to base 210 in a substantially watertight or water resistant manner, such as upper pedestal 230. Each of these elements will be described in more detail below.

Figure 12:
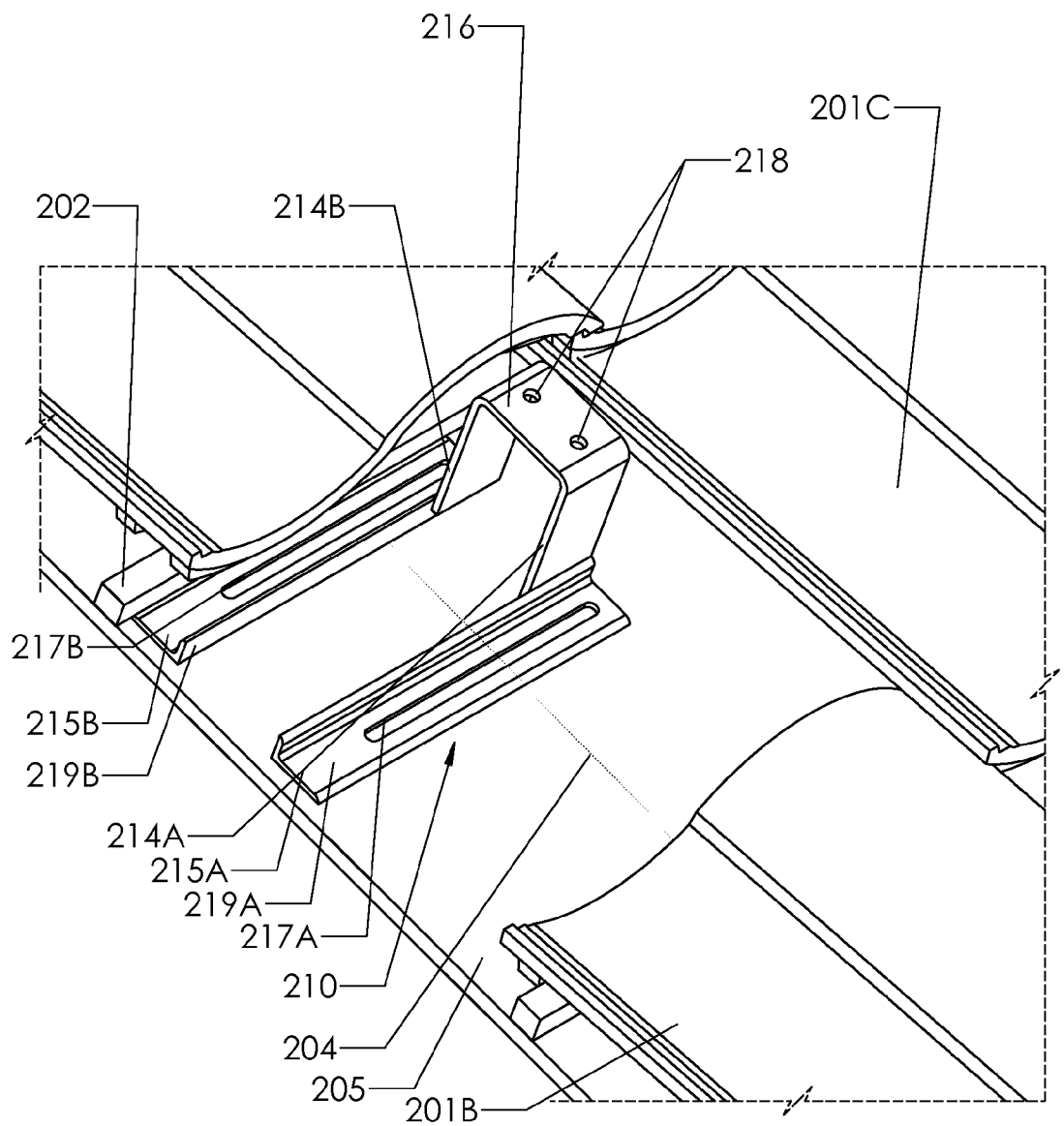
FIG. 12 is an isometric view of a roof with a roof tile removed and a support structure installed.

Referring to FIGS. 9-10 and with particular reference to FIG. 12, a perspective view of base 210 installed on a tile roof, base 210 may comprise one or more flanges with a substantially flat bottom surface in the x-y plane, such as flanges 215a, 215b. Flanges 215a, 215b may further comprise holes, slots, grooves, indentations, or the like, such as slots 217a, 217b for allowing a lag screw 211 to pass through and secure base 210 to a rafter, purlin, beam, or the like, such as rafter 204, or directly to roof sheathing material 205. Slots 217a, 217b are intentionally not shown running the entire length of flanges 215a, 215b in order to leave a tail portion 219a, 219b for resisting upward loads. For example, the distance between lag screw 211 and the end of flange 215a may provide a resistive moment when a force (such as wind) effectively pulls upward on upper portion 216. Preventing lag screws 211 from being inserted in close proximity to an end ensures that tail portion 219a may provide significant resistive moment to counteract upward forces. This novel feature may eliminate or minimize the need for additional screws elsewhere in base 210.

Base 210 may further comprise vertical portions 214a, 214b sized to bring upper portion 216 into mating relation with an underside of a flashing. Upper portion 216 may comprise holes 218 for receiving a fastener 212. In some embodiments fastener 212 is a carriage bolt with a square feature on the underside of the bolt head that may be press-fitted or swaged into square-shaped holes 218, thereby enabling base 210 to include integral fasteners when being deployed to or in the field. In other embodiments holes 218 may be threaded. Flanges 215a, 215b may be welded onto vertical portions 214a, 214, or entire base 210 may be a single unitary (for example, a cast or formed) piece. Other embodiments contemplate other materials and methods of manufacturing as will be understood by one of skill in the art.

One of skill in the art will recognize that base 210 may be variably positioned within the space revealed when a standard tile is removed. For example, base 210 may be slid down-roof from the position shown in FIG. 10 to a position just above lower tile 201b. Flanges 215a, 215b may also be wide enough laterally to reach all or most rafter positions within the revealed space once upper portion 216 is aligned with the peak of tile 201a, as will be discussed in more detail below.

Figure 13:
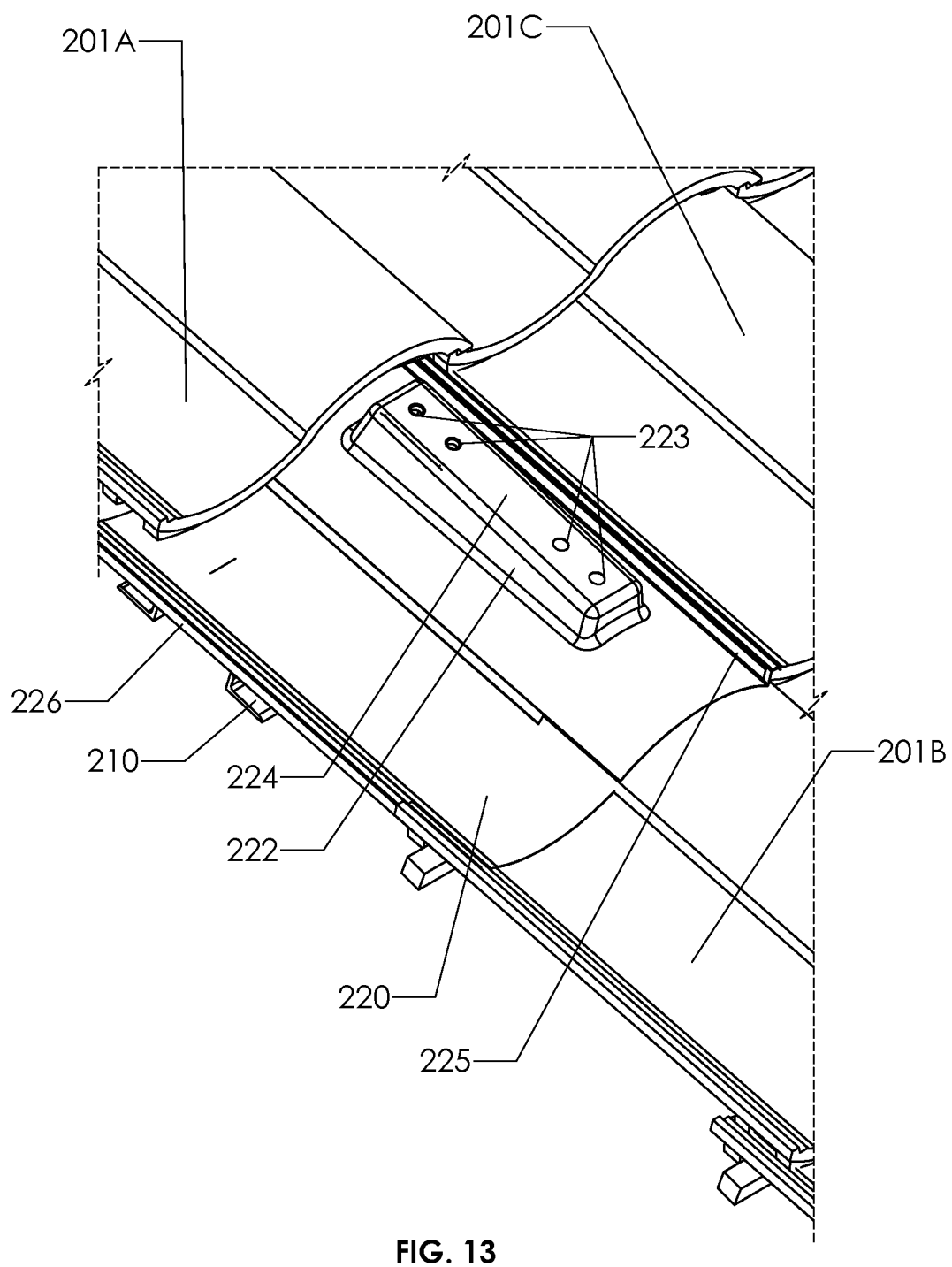
FIG. 13 is an isometric view of a roof with a roof tile removed and a replacement tile installed atop a support structure.

Expanding consideration to include FIG. 13, which is a perspective view of flashing 220 and base 210 installed on a tile roof, flashing 220 of the instant embodiment may be manufactured as a formed piece of thin sheet metal or molded plastic and is generally shaped similar to the surrounding tiles except for the thickness of the material(s). In some embodiments flashing 220 comprises rolled edges, is a hollow form of the same thickness as a tile, or is molded as a solid piece of material of the same thickness as a tile. While flashing 220 comprises the same approximately "S" shape as the surrounding tile(s) in the regions where flashing 220 mates therewith, flashing 220 further comprises a raised and substantially flat portion, such as platform 224 with walls 222, that may be located inward from the mating edges and generally positioned to align with upper portion 216 of base 210 such that upper portion 216 may fit at least partially inside of the cavity formed on the underside of platform 224. Two pairs of holes 223 may be provided to receive screws 212, thereby enabling base 210 to be located beneath the upper pair of holes 223 or the lower pair of holes 223. The underside of platform 224 may also comprise a means, method, apparatus or structure for inhibiting or preventing water ingress through holes 223 in flashing 220, such as rubber seal 221. In some embodiments holes 223 may further comprise adhered tabs or plugs, so that only the holes 223 that are needed or actually utilized are uncovered or unplugged. As is typical with tiles, flashing 220 of the current embodiment may slip under tile 201a and over tiles 201b and 201c as shown in FIG. 13. An overlapping portion 225 may be provided for mating with tile 201c. If there was a fourth (4th) tile, as would be typical in a middle area of a roof, flashing 220 would at least partially slip under it. In this manner the standard method of interleaving and channeling water, as is commonly used for tiles, may not be interrupted, and may be assisted, by flashing 220. Platform 224 is shown in FIG. 13 near tile 201a, though other embodiments contemplate location(s) of platform 224 further down-roof and closer to tile 201b.

Figure 10A:
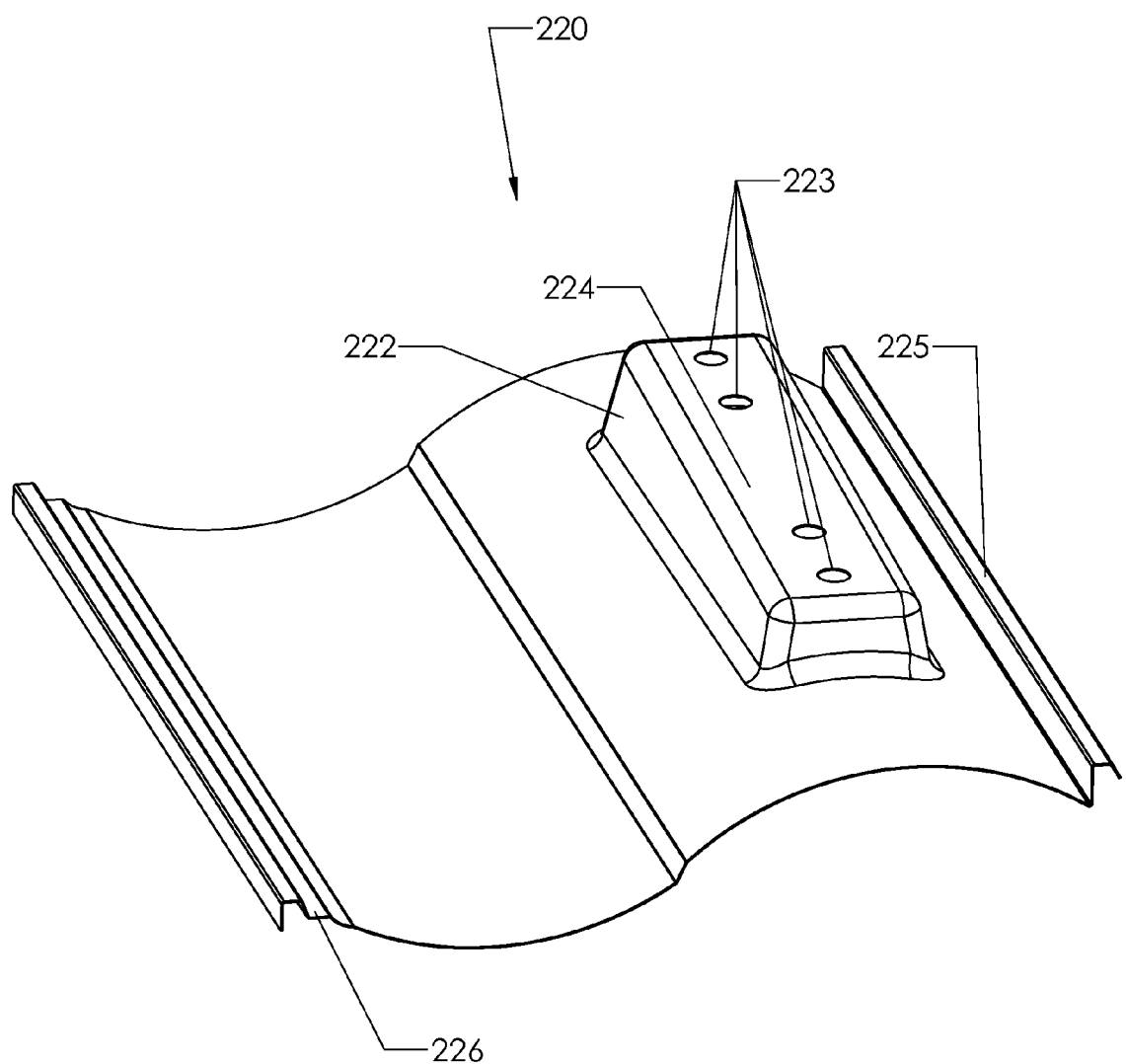
FIG. 10A is an isometric view of a replacement tile.

FIG. 10A shows a perspective view of flashing 220 with platform 224, overlapping portion 225 and side interleaving portion 226.

Figure 14:
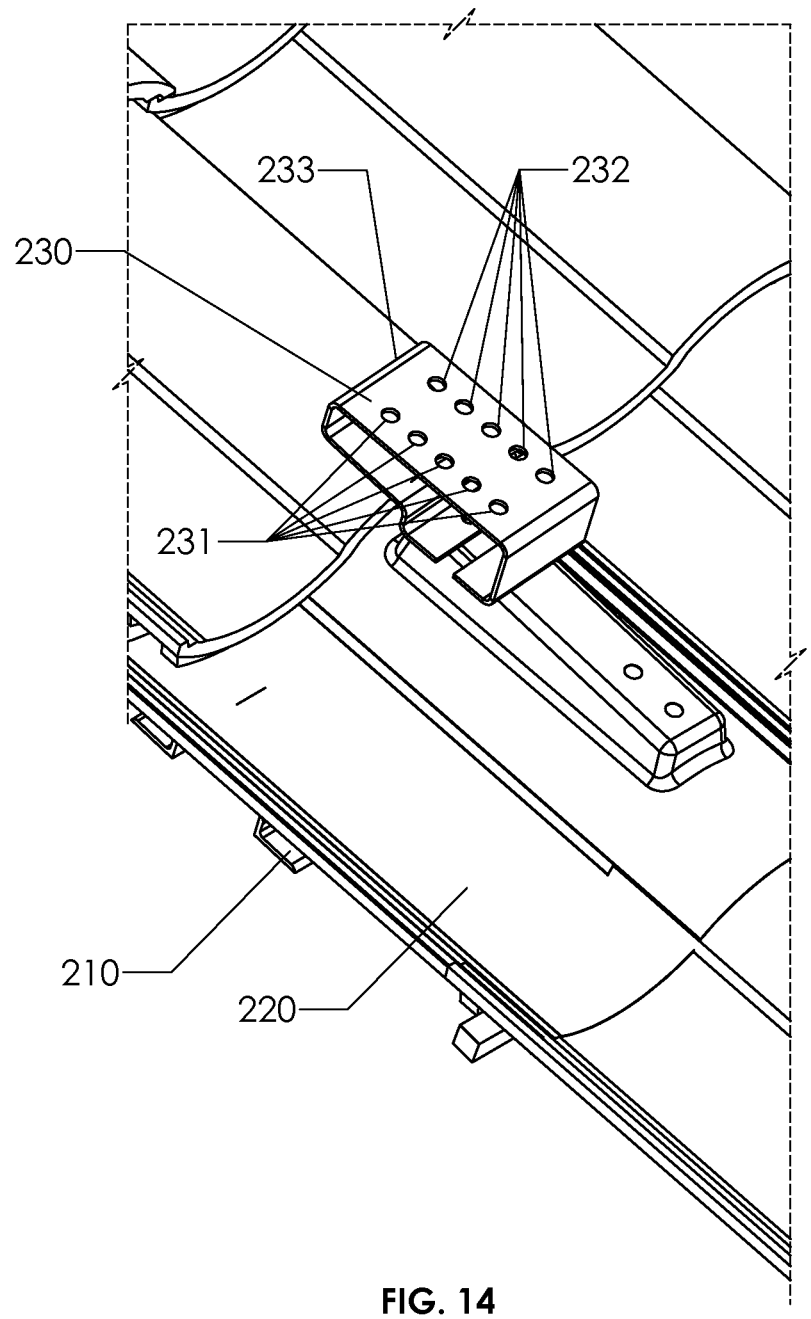
FIG. 14 is an isometric view of a roof with a roof tile removed and a replacement tile installed atop a support structure with a top arm installed atop the replacement tile and support structure.

Expanding consideration to further include FIG. 14, a perspective view of tile flashing mount 200 installed on a tile roof, upper pedestal 230 is shown located above or on top of flashing 220 and connected to base 210 via fasteners 212 and nuts 213. Tightening of nuts 213 may compress flashing 220 and seal 221 between upper pedestal 230 and base upper portion 216, securing the separate parts of tile flashing mount 200 together and providing a tight seal to inhibit or prevent water ingress through holes 223. Risk of water intrusion though holes 223 is further minimized by the fact that platform 224 is raised above the rest of flashing 220 surface thereby resulting in walls 222 channeling water away from holes 223. As discussed above, upper pedestal 230 may be attached via either the upper or lower pair of holes 223, depending on the location of base 210. Upper pedestal 230 may also be attached rotated 180 (usually between 170 to 190) degrees from the orientation shown in FIG. 14, as will be discussed in more detail below.

Upper pedestal 230 may comprise a series of holes, such as holes 231, 232, which may be threaded, or in other embodiments may be through-holes. As shown in FIG. 14, the present embodiment comprises two rows of holes 231, 232 running up-roof for the purpose of providing various connecting locations for a PV module, coupling, connecting bracket, rail, leveling foot, or the like. The row of holes 231 may be separated by a lateral distance, such as 0.5 to 10 (often 0.5-2, 2-4, 4-6, 6-10 or 1-5) inches, from holes 232 so that a conflict or blockage between a leveling foot and another device that connects to a PV module frame (such as an interlock as shown and described in other patents or patent applications of at least one common inventor or common assignee) may be avoided, ameliorated or minimized. For example, if an interlock is located in groove 105a on module 100a in the same lateral position as a desired position for leveling foot 110 (when connecting to hole 231), then leveling foot 110 may be moved to the corresponding hole 232 to avoid interference with the interlock. In other embodiments, one or more holes 231, 232 may be replaced by slots. In still other embodiments leveling foot 110 may snap, press-fit, lock, rotate, or slide onto upper pedestal 230 without requiring conventional fasteners.

Figure 11:
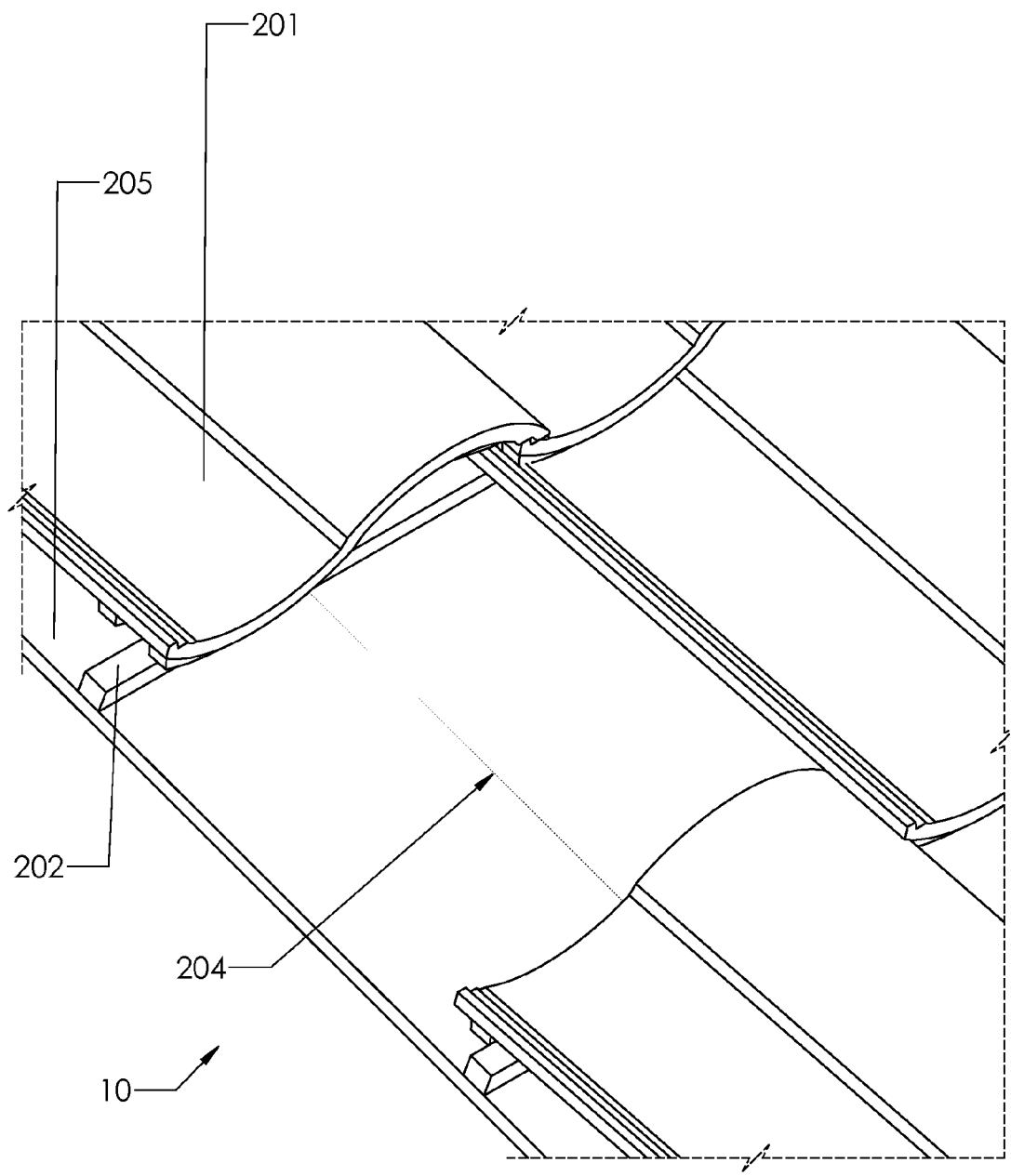
FIG. 11 is an isometric view of a roof with a roof tile removed in anticipation of the installation of a replacement tile and related components.

Referring now more particularly to FIGS. 11-14, a series of installation steps are shown or illustrated. FIG. 11 shows a typical, non-limiting tile roof 10 with tiles 201 hanging on battens 202. Battens are shown on top of roof sheathing 205, such as plywood, Oriented Strand Board (OSB), or the like which may be supported by rafters 204 (centerline of rafter shown as a single dotted line). Since the instant embodiment is adapted for installation approximately in the space of a single tile, one tile is shown removed from the leftmost column of tiles 201 (when looking up-roof). Any tile in the array of tiles could have been removed, but a leftmost tile is shown as removed for greater visual clarity for the purposes of this disclosure. Tiles 201 are shown here in a common "S" tile type, which is similar to a "Capistrano" tile made by Eagle Roofing Products of Rialto Calif. In other embodiments tiles 201 are of a "W" tile type, which is similar to "Malibu" tiles made by Eagle Roofing Products of Rialto, Calif. In still other embodiments tiles 201 are of an essentially flat tile type, which is similar to "Ponderosa" tiles made by Eagle Roofing Products of Rialto, Calif. In still other embodiments tiles 201 are of other commonly available shapes and styles. With tile types not shown in the instant drawings, only minor changes are needed to the exact shape of flashing 220 in order to mate with the surrounding tiles, as will be understood by one of skill in the art, and explicitly contemplated and disclosed herein. Therefore, all generally available tile types and geometries fall within the scope of the present disclosure.

FIG. 12 shows a first installation step after removing a tile 201. Base 210 may be placed or located on sheathing 205, such that upper portion 216 is approximately aligned with a peak 206 of tile 201a and at least a portion of slots 217a, 217b cross over rafter 204. If rafter 204 is on the other side of peak 206 than shown, the base 210 may be rotated approximately 180 degrees around the z-axis, at least partially tucking flanges 215a, 215b under tile 201c (battens may hold tiles above a sheathing, so there is space in which to run or otherwise locate flanges 215a, 215b).

Placement of a base along the y-axis may be determined in consideration of the other mounting hardware in the system. In the instant embodiment, a rail-free mounting system is shown, therefore tile flashing mount 200 may be connected directly to leveling foot 110 (see below). This should provide that there are a series of discrete points along the y-axis (approximately in the location of each seam between two PV modules 100 and one each at the up-roof and down-roof edges of the PV array) where each leveling foot may be located. Tile flashing mount 200 is specifically designed to make up for the lack of y-axis flexibility inherent in a rail-free mounting system, as by including multiple methods for positioning one or more components relative to each other: (a) base 110 may be located in the position shown in FIG. 12, or further, such as any location all the way down roof to just above tile 210b, (b) upper pedestal 230 may be connected to base 210 through either the lower pair or upper pair of holes 223 in flashing 220 and then oriented with elongated portion 233 facing either up-roof or down-roof, and (c) leveling foot 110 may be connected to any one of multiple holes 231, 232 in upper pedestal. It should also be noted that leveling foot base 140 may be rotated with respect to coupling 120, so base 140 can swing up-roof and/or down-roof to align slot 143 with hole 231, 232 and thus fine-tune its exact connection location. Therefore, the process of determining exactly where to place base 210 along the y-axis may involve determining where, within the area of the removed tile, the edge of module 100 is likely to be, then placing base 210 within a predetermined range of distances above or below that edge. In other embodiments base 210 may be aligned with other features on the tile, such as the valley, edge, or other locations. In still other embodiments there is no roof sheathing, but rather empty space, insulation, and/or non-structural material between rafters 204. In such embodiments base 210 may be located or placed directly on rafter 204. Once the final position of base 210 has been determined, as discussed and described above, base 210 may be attached to rafter 204, as with lag screws 211 (not shown in FIG. 12, see FIG. 10) or the like.

FIG. 13 shows an embodiment of the next step in the process of installing tile flashing mount 200. Flashing 220 may be interleaved with the surrounding tiles 201a, 201b, and 201c, as by being tucked under tile 201a along its up-roof edge and lapping over tiles 201c and 201b along its right lateral edge (looking up-roof) and down-roof edge. Platform 224 may be located or placed over upper portion 216 of base 210 such that at least one, but usually two of holes 223 align with holes and/or pre-installed bolts 212 projecting upward from upper portion 216 (bolts 212 not shown in FIG. 13, see FIG. 10).

FIG. 14 shows a final step in the installation of tile flashing mount 200. Upper pedestal 230 may be positioned onto bolts 212 (see FIG. 10) and nuts 213 may be used to secure upper pedestal to base 210. As discussed above, the orientation of upper pedestal may be determined in consideration of the direction that elongated portion 233 will need to face (up-roof or down-roof) in order to result in at least one hole 231, 232 aligning with slot 143 in leveling foot 110.

Figure 15:
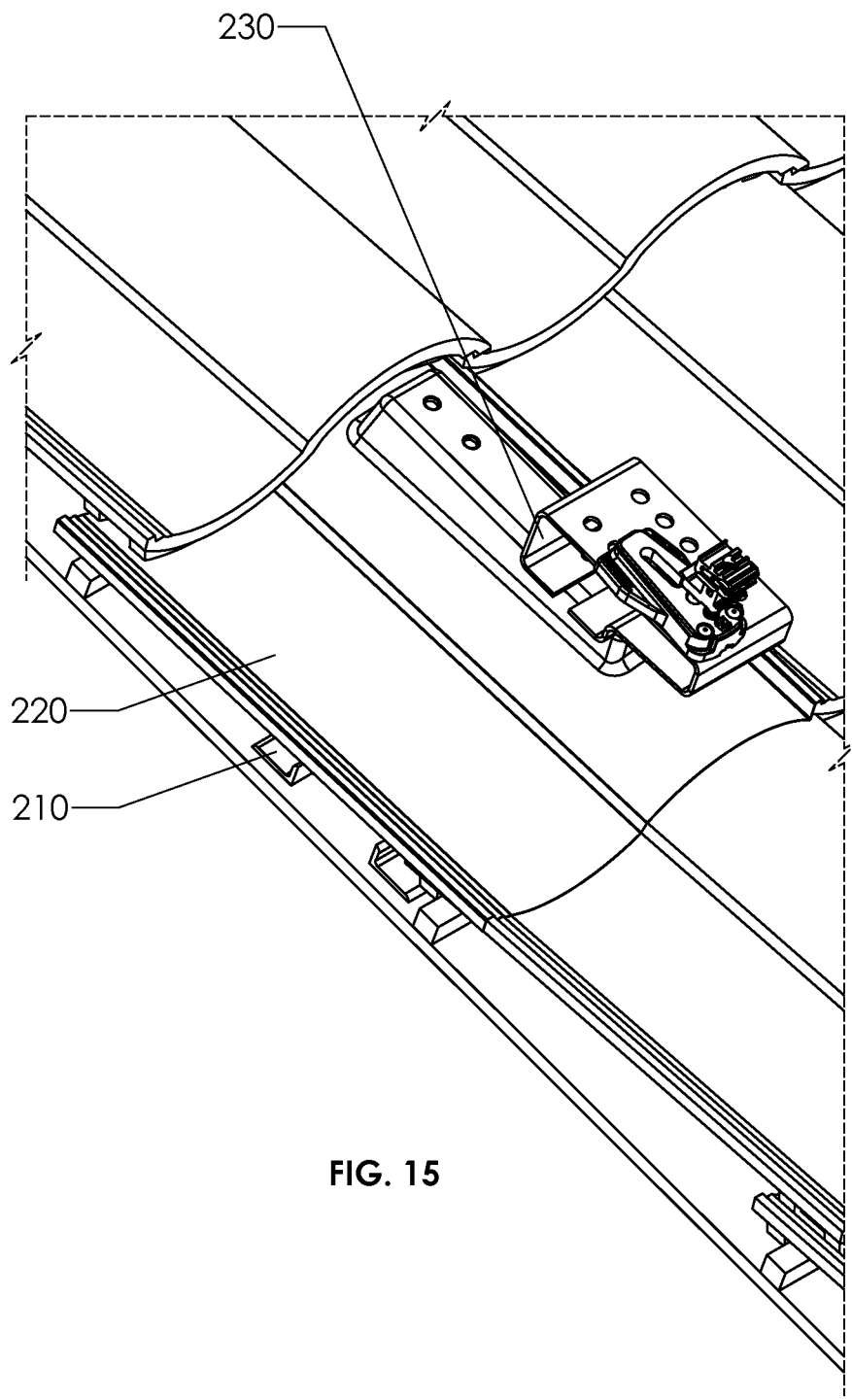
FIG. 15 is an isometric view of a roof with a roof tile removed and a replacement tile installed atop a support structure with a top arm installed atop the replacement tile and support structure and a leveling foot installed atop the top arm.

FIG. 15 is the a view similar to FIG. 14 except that base 210 has been moved down-roof and upper pedestal 230 has been rotated approximately 180 degrees around or about the z-axis and connected to base 210 through lower pair of holes 223 in flashing 220, and a leveling foot 110 has been placed above or on-top of upper pedestal, in a position that aligns with at least one hole 231, 232 (bolt from foot to upper pedestal not shown).

Figure 16:
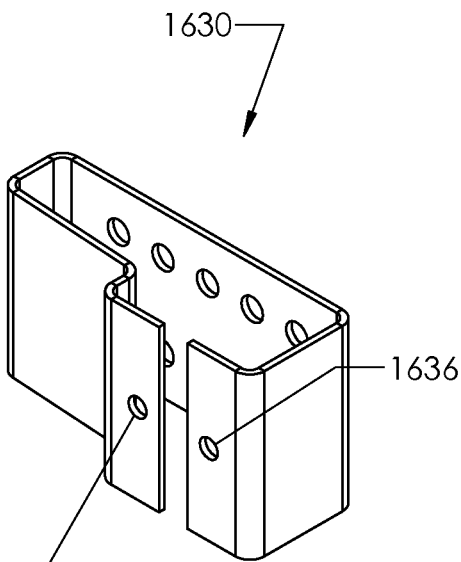
FIG. 16 is an isometric view of a top arm.

FIG. 16 shows a perspective view of an alternate embodiment of an upper pedestal, upper pedestal 1630 which is similar to upper pedestal 230. Pedestal 1630 is similar to pedestal 230 except that it further comprises specially shaped slots that may allow pedestal 1630 to be rapidly connected to base 210. The substantially cylindrical portions of slots 1635, 1636 may be positioned and/or sized such that nuts 213 fit through slots 1635, 1636. Installation may be performed as follows, in the following steps or procedures. Nuts 213 may be rotated such that there is a gap between nuts 213 and flashing 220 or such that a gap appears after pressing downward on flashing (due to seal 221 compressing). Pedestal 1630 may then be located or placed above or on-top of flashing 220, such that nuts 213 pass through circular portions of at least one of slots 1635, 1636. Pedestal 1630 may then be pushed downward and rotated so that the shanks of bolts 212 move into the skinnier portions of slots 1635, 1636. Release of downward pressure will then cause seal 221 to expand, pushing flashing and pedestal 1630 back up and into engagement with nuts 213. This embodiment has an advantage of not requiring tools for the installation of the upper pedestal 1630.

Figure 17:
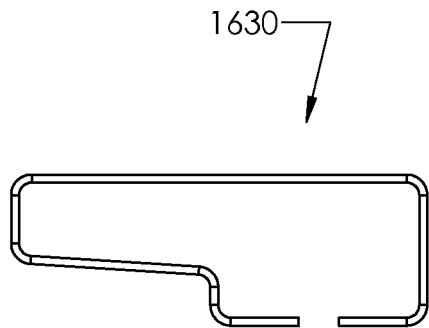
FIG. 17 is an orthogonal view of a top arm.
Figure 18:
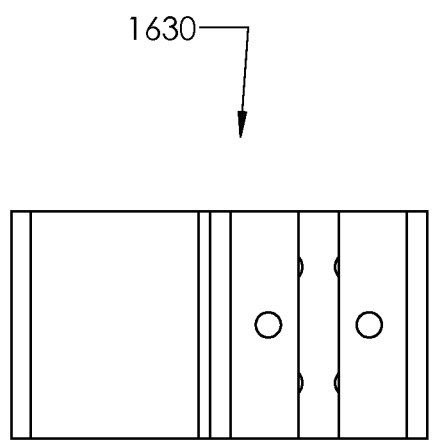
FIG. 18 is a bottom view of a top arm.

FIGS. 17-18 show side and bottom views of upper pedestal 1630, respectively.

Figure 19:
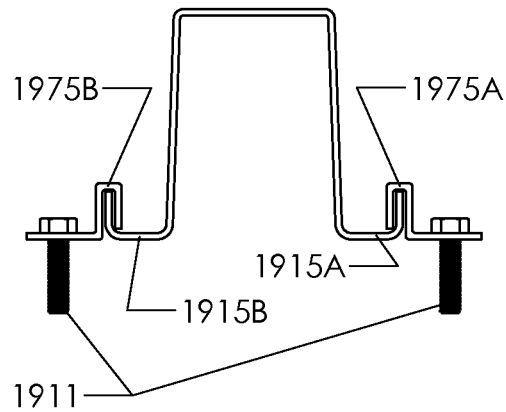
FIG. 19 is an orthogonal view of components of an embodiment of a support structure.

FIG. 19 shows a side view of base 1910, which is similar to base 210 except it comprises a different embodiment for attaching to a roof. Flanges 215a, 215b of base 210 may be replaced by or with channels 1915a, 1915b and hold-down brackets 1975a, and 1975b. Channels 1915a, 1915b may be approximately the same length as flanges 215a, 215b but they will commonly not contain any slots, thereby increasing strength thereof. Hold-down brackets 1975a, 1975b may be only slightly wider than a head of lag screw 1911 and may be positioned substantially along the whole length of channels 1915a, 1915b. Hold-down brackets 1975a, 1975b may further comprise a hole for lag screws 1911 and sealing washers 1980a, 1980b.

Figure 20:
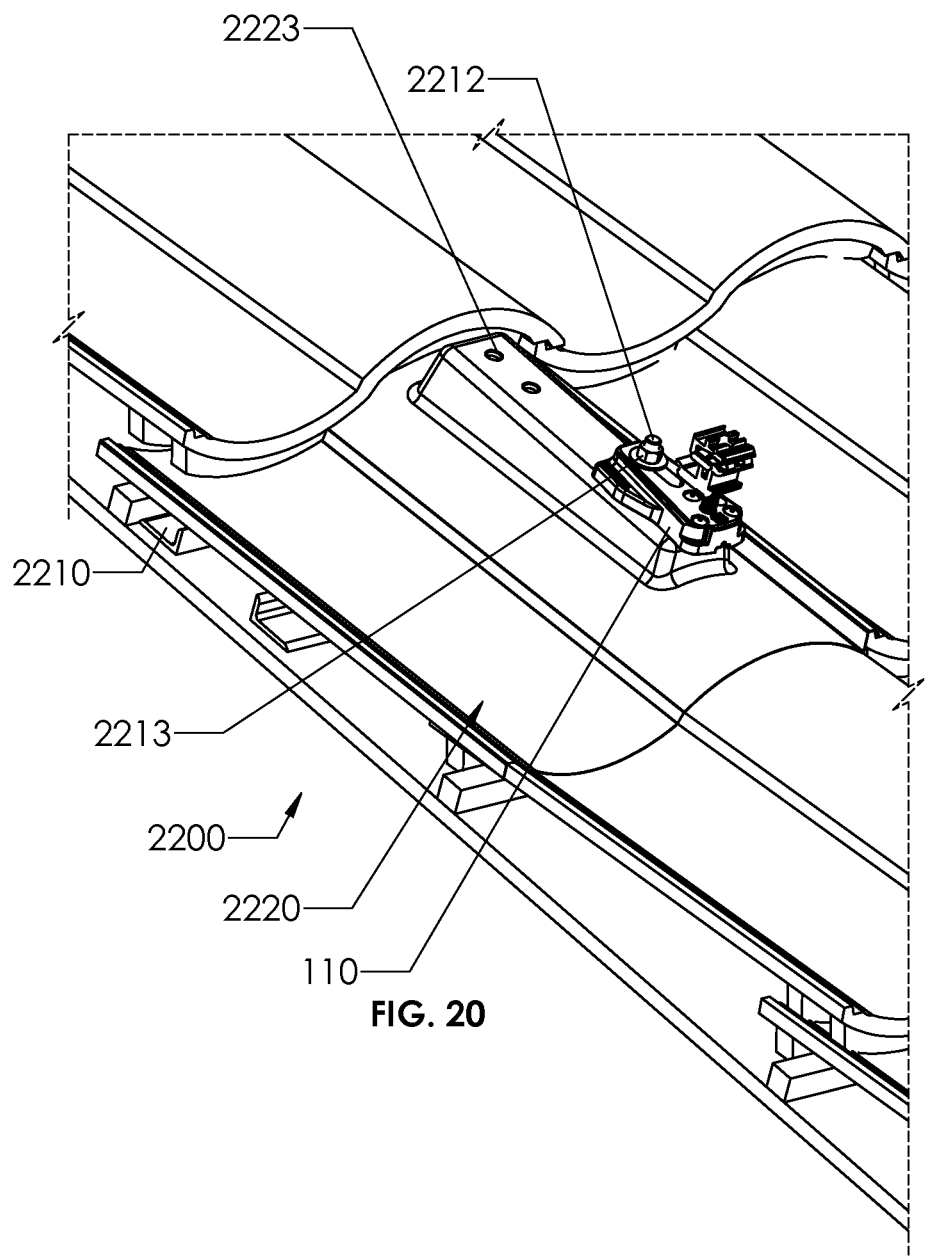
FIG. 20 is an isometric view of a roof with a roof tile removed and a replacement tile installed atop a support structure with a leveling foot installed atop the replacement tile and support structure.

FIG. 20 shows a perspective view of an embodiment of a tile flashing mount, such as tile flashing mount 2000. Tile flashing mount 2000 may be similar to tile flashing mount 200 except that upper pedestal 230 may be eliminated and leveling foot 110 may connect directly to base 2210 via bolt 2212 and nut 2213. In other embodiments tile flashing mount 2000 may comprise more or fewer holes 2223 for connection to leveling foot 110.

FIGS. 21-32 show an embodiment of a tile flashing mount 2100. Tile flashing mount 2100 is similar to tile flashing mount 200 in that it comprises a base, a flashing, and an upper pedestal and performs similar functions. However, the structural elements differ in certain ways as described below. In general, tile flashing mount 2100 may provide faster installation time relative to tile flashing mount 200, for example, due to requiring fewer fasteners.

Figure 21:
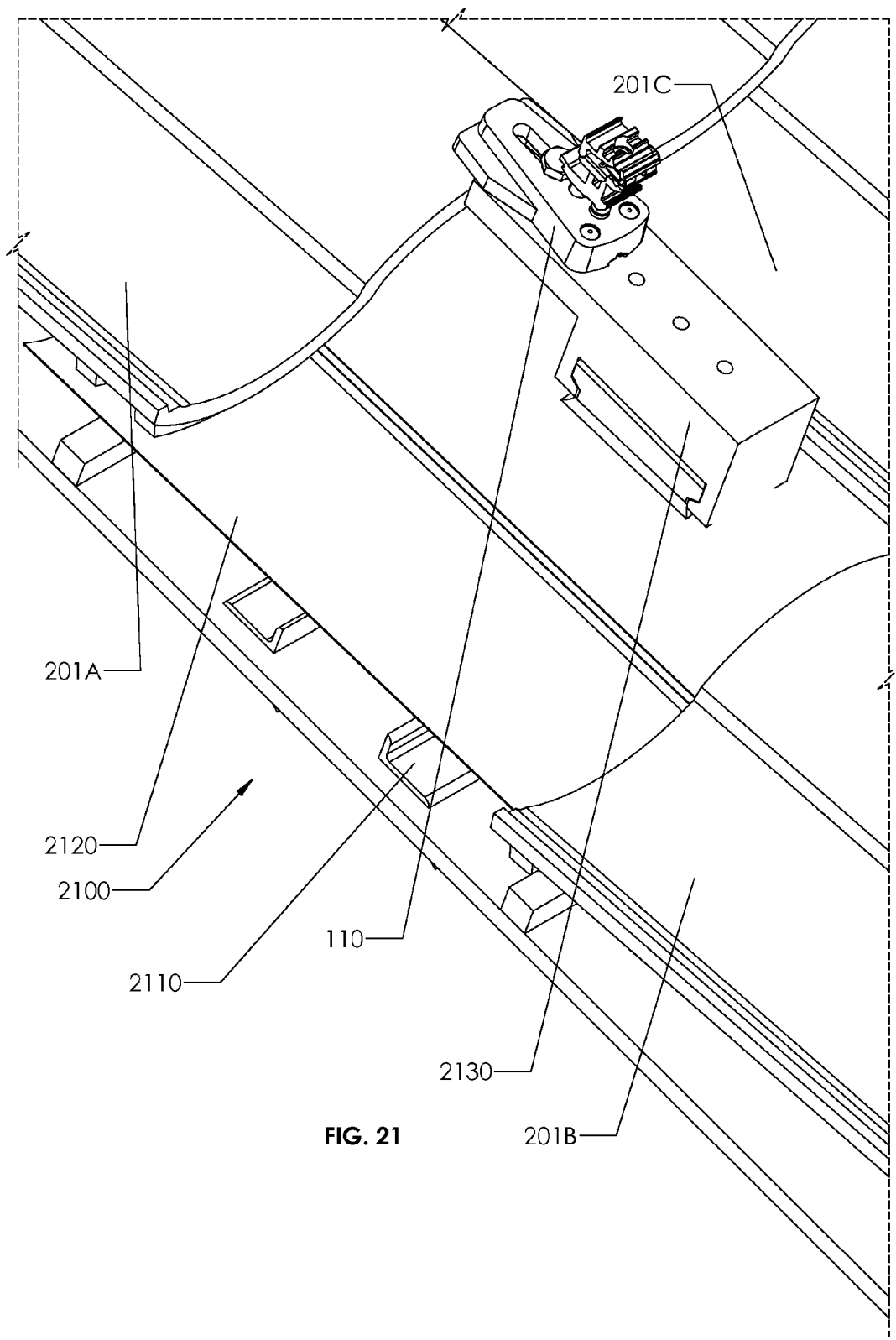
FIG. 21 is an isometric view of a roof with a roof tile removed and a replacement tile installed atop a support structure with a top arm installed atop the replacement tile and support structure and a leveling foot installed atop the top arm.

FIG. 21 shows a perspective view of tile flashing mount 2100 installed on tile roof 10 as described for a similar arrangement above. Tile flashing mount 2100 replaces the tile (located above) 201b and interleaves with the surrounding tiles similar to tile flashing mount 200 described above. Tile flashing mount 2100 comprises a base 2110, a flashing 2120, and an upper pedestal, crossbar, or top arm 2130 as will be described in more detail below. Leveling foot 110 is shown attached to upper pedestal 2110.

Figure 22:
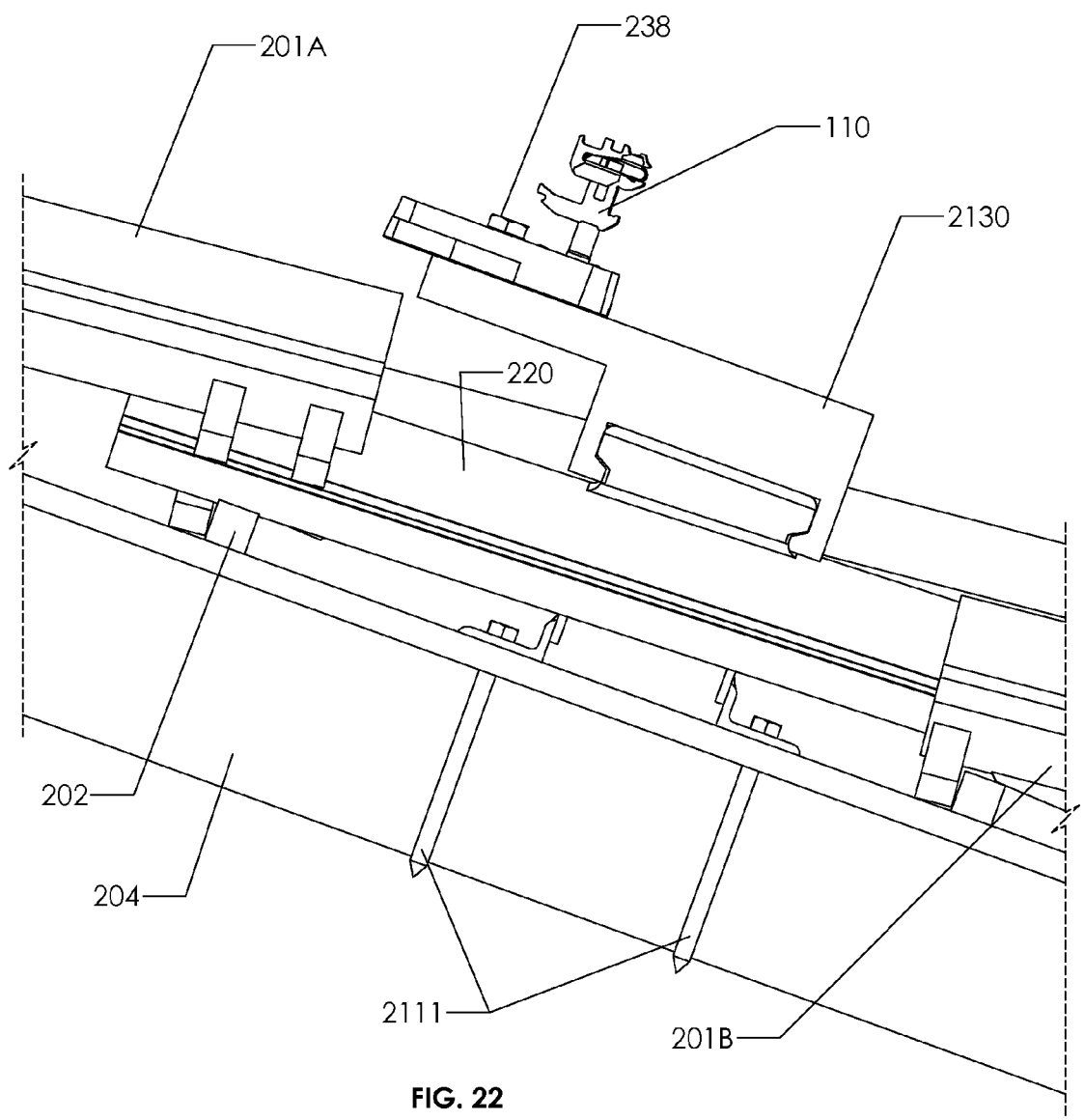
FIG. 22 is an orthogonal view of a roof with a roof tile removed and a replacement tile installed atop a support structure with a top arm installed atop the replacement tile and support structure and a leveling foot installed atop the top arm.

FIG. 22 shows a side view of tile flashing mount 2100 installed on roof 10. Upper pedestal 2130 has been shown as installed in a down-roof facing direction, whereas FIG. 21 shows it in an up-roof facing direction.

Figure 29:
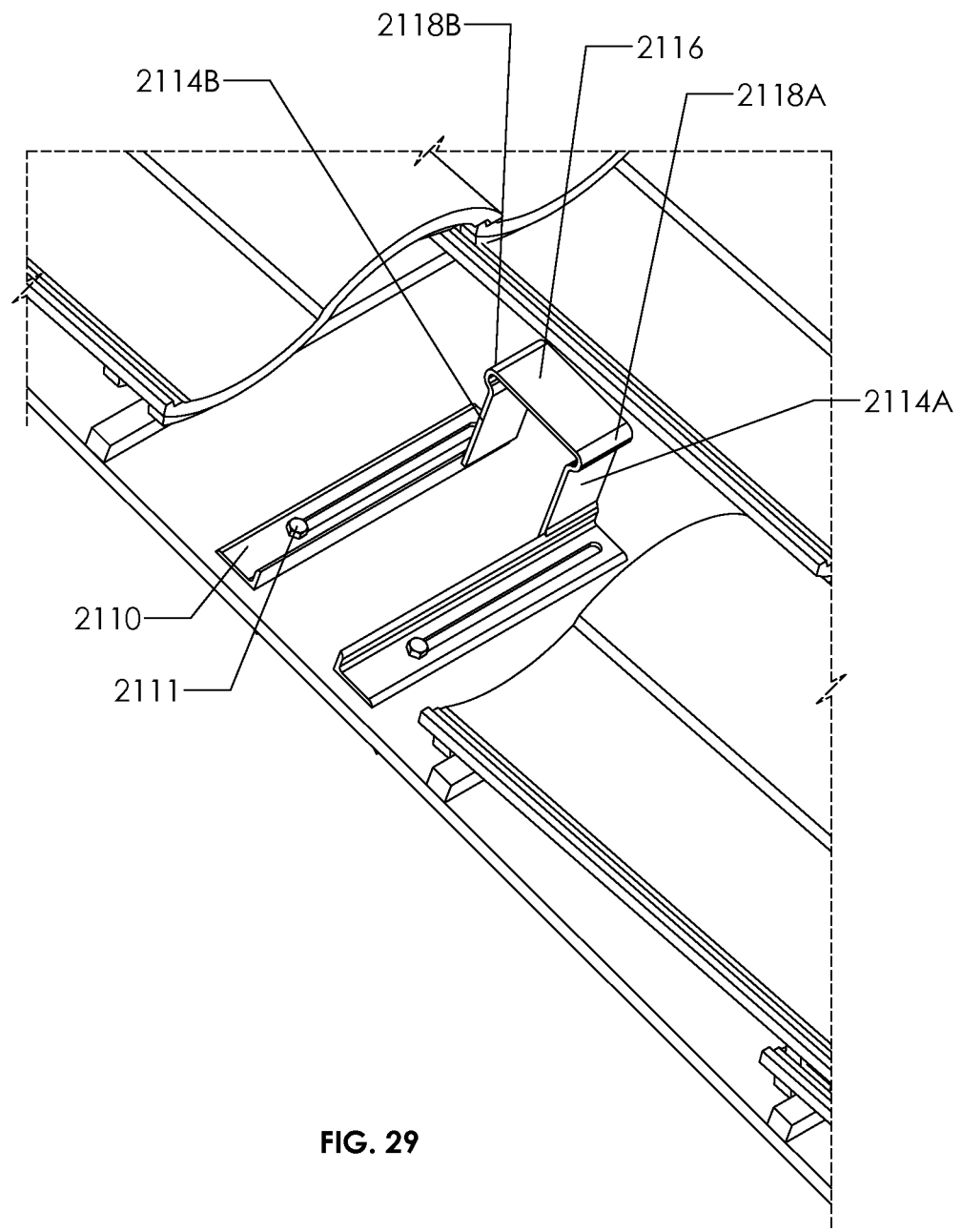
FIG. 29 is an isometric view of a roof with a roof tile removed and a support structure installed.

FIG. 29 shows a perspective view of tile flashing mount 2100 installed on roof 10. This view further reveals details of base 2110. Base 2110 may comprise slotted or perforated flanges for attachment via lag screw 2111, similar to mount 200. However, instead of an upper portion with holes 204, base 2110 comprises male features 2118a, 2118b for mating with pedestal 2130 as will be described below.

Figure 23:
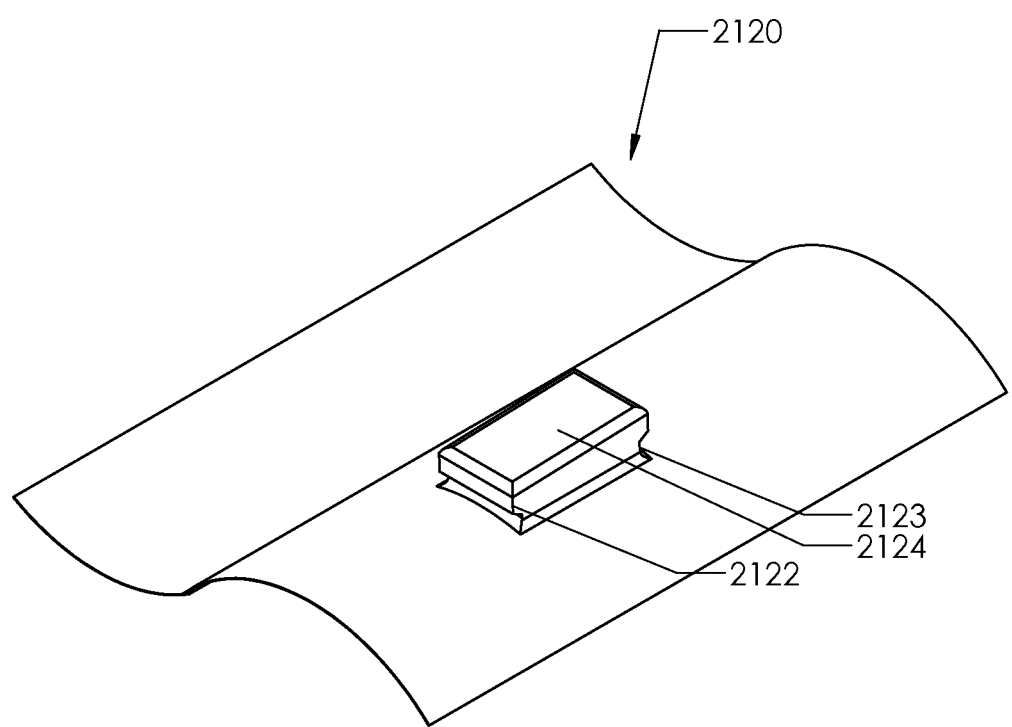
FIG. 23 is an isometric view of a replacement tile.

FIG. 23 shows a perspective view of flashing 2120 with platform 2124 and walls 2122. Flashing 2120 may be formed as a one-piece stamped or molded part. Walls 2122 comprise a waist portion 2123 that allows male features 2118a, 2118b to snap up into the underside of platform 2124 during installation. Since there are no required through-holes in flashing 2120, the underside of platform 2120 may not require use of a seal as described above for flashing 220.

FIGS. 24-27 provide different views of upper pedestal 2130: FIG. 24 shows a perspective view, FIG. 25 shows a top view, FIG. 26 shows a side view, FIG. 27 shows a bottom view, and FIG. 28 shows an end view. Upper pedestal 2130 may slide onto flashing 2120 and base 2110 during installation, as by inserting platform 2124 into sliding pedestal 2130 laterally. Pedestal 2130 may comprise a tapered slot, channel, groove, or the like, such as groove 2134. Groove 2134 may comprise tapered walls 2135a, 2135b that enable a press-fitting action of pedestal 2130 as it is slid into place. Tapered walls 2135a, 2135b present a wider opening to groove 2134 at one end, thereby allowing pedestal 2130 to be easily started or otherwise positioned onto platform 2124 with little or no interference. As force is applied laterally to slide pedestal 2130 into position, the interference may increases effectively, causing pedestal 2130 to squeeze flashing 2120 around base 2110 to create a tight fit between all three components. In other embodiments tapered walls 2135a, 2135b may be augmented or replaced with beveled, ribbed, toothed, or the like portions. It should be noted that solar panels do not typically provide very large loads to mounting hardware in the lateral direction, except during an earthquake, so pedestal 2130 is unlikely to slide back off once installed in a solar array. In some embodiments pedestals 2130 may be installed in opposite directions within the PV array thereby preventing lateral slippage even under significant lateral loads. Pedestal 2130 is shown as only comprising a single row of holes 2131 (instead of two rows as with pedestal 230) since pedestal 2130 may be variably positioned laterally, thereby still enabling conflicts between other frame-connecting components and leveling foot 110 to be resolved by sliding pedestal 2130 along the x-axis. Variations, such as a pedestal of the pedestal 2130 variety with more than one row of holes, and the pedestal 230 variety with only one row of holes, is hereby disclosed.

Figure 30:
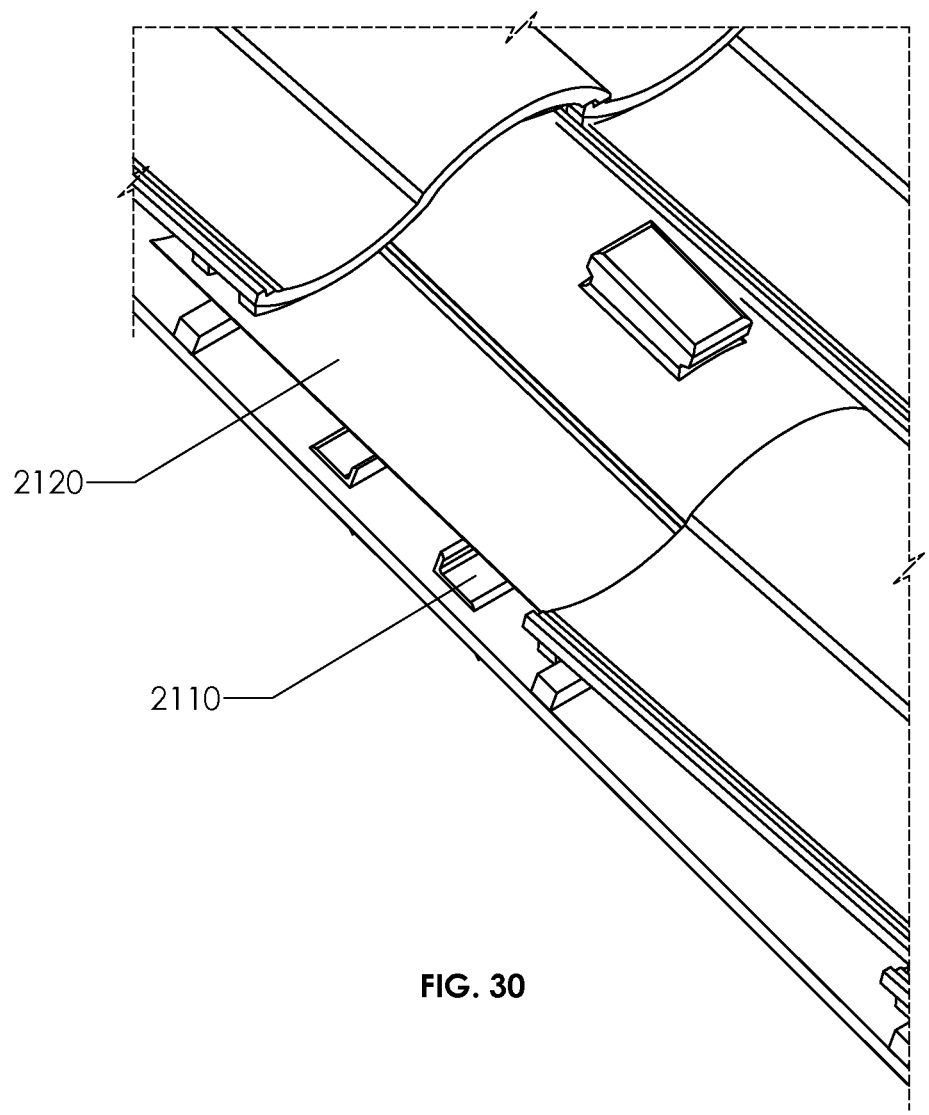
FIG. 30 is an isometric view of a roof with a roof tile removed and a replacement tile installed atop a support structure.
Figure 31:
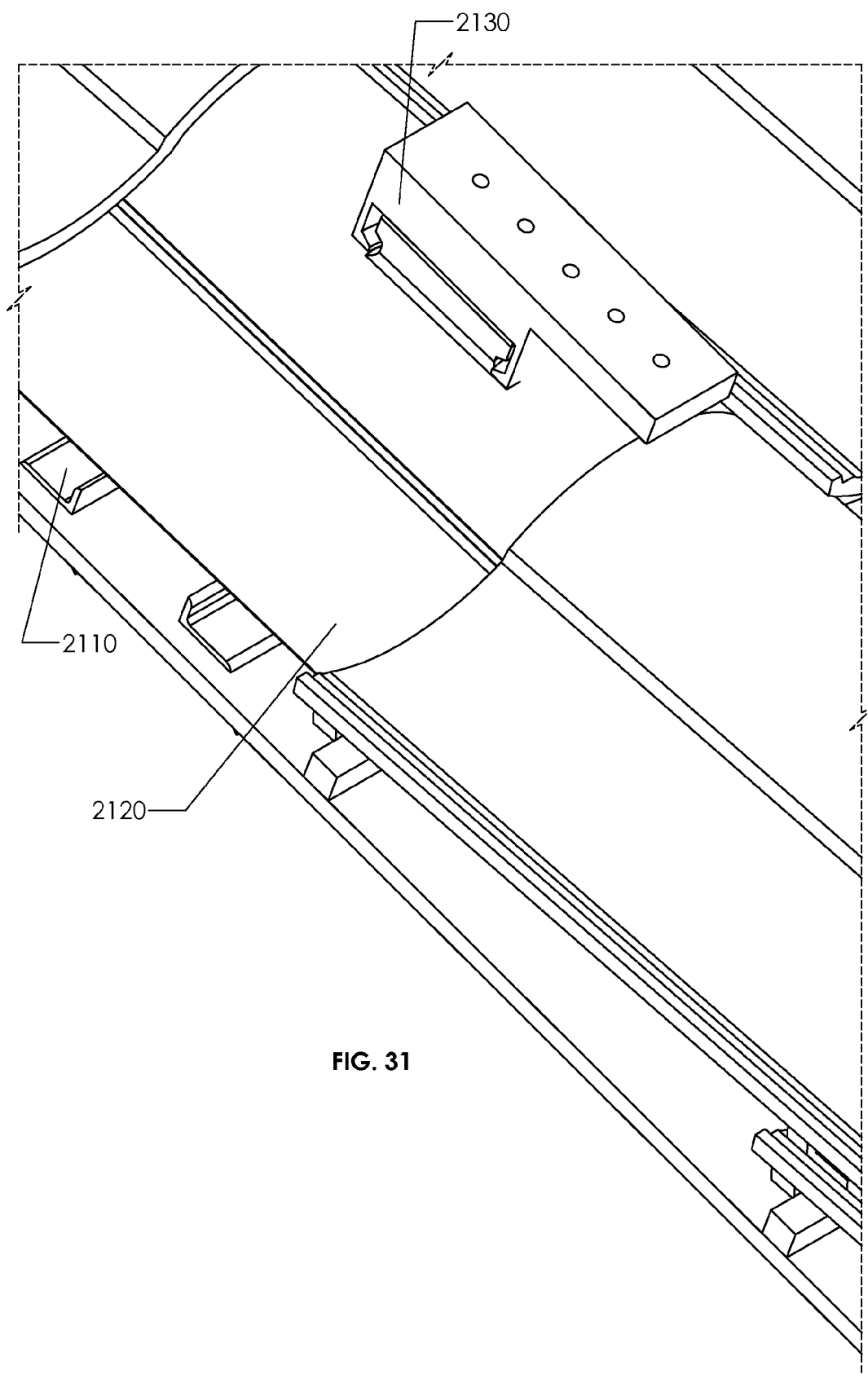
FIG. 31 is an isometric view of a roof with a roof tile removed and a replacement tile installed atop a support structure with a top arm installed atop the replacement tile and support structure.
Figure 32:
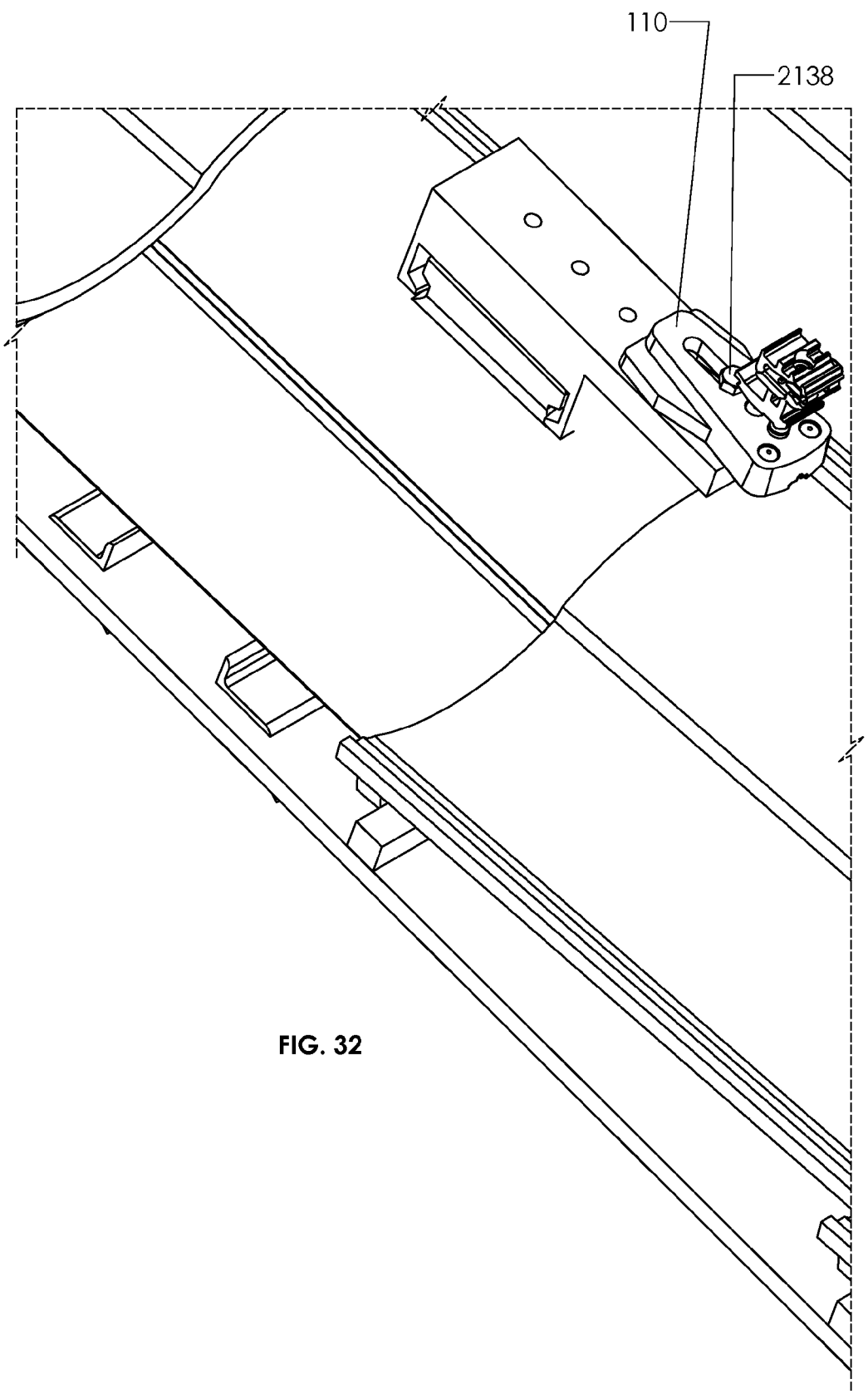
FIG. 32 is an isometric view of a roof with a roof tile removed and a replacement tile installed atop a support structure with a top arm installed atop the replacement tile and support structure and a leveling foot installed atop the top arm.

FIGS. 29-32 show a perspective view of a typical, non-limiting installation sequence for tile flashing mount 2100. FIG. 29 shows roof 10 with base 2110 connected to rafters via lag screws 2111. Positioning of base 2110 is similar to base 210. FIG. 30 shows the next step where flashing 2120 has been snapped onto base 2110. FIG. 31 shows pedestal 2130 having been slid into position in the direction of the arrow. FIG. 32 shows the final step of connecting leveling foot to pedestal 2130 with bolt 2138.

FIGS. 33-39 show an embodiment of a tile flashing mount 3300. Tile flashing mount 3300 is similar to tile flashing mount 200 in that it comprises a base, a flashing, and an upper pedestal and performs similar functions. However, certain structural elements differ in various ways as described below. In general, tile flashing mount 3300 may provide increased lateral flexibility relative to tile flashing mount 200 due to a rotating design.

Figure 33:
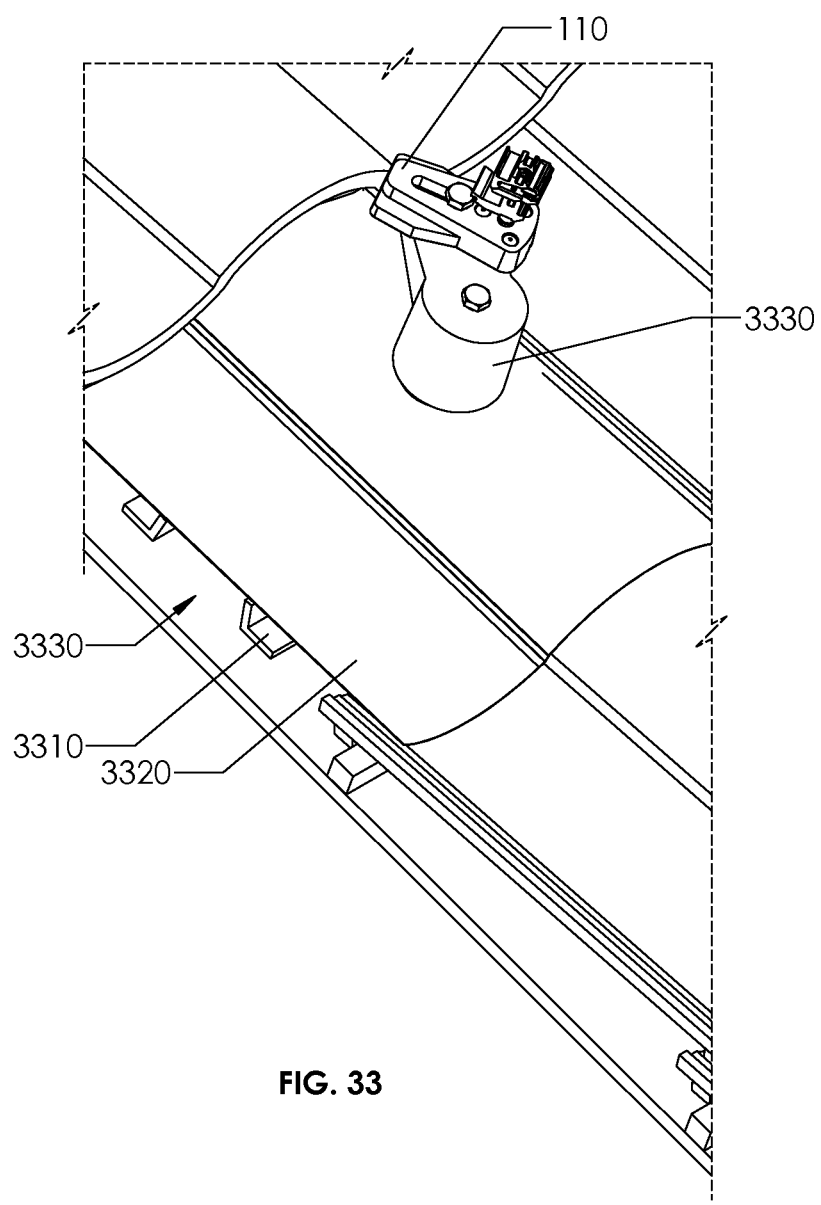
FIG. 33 is an isometric view of a roof with a roof tile removed and a replacement tile installed atop a support structure with a top arm installed atop the replacement tile and support structure and a leveling foot installed atop the top arm.

FIG. 33 shows a perspective view of tile flashing mount 3300 installed on tile roof 10 as described above. Tile flashing mount 3300 replaces the tile above 201b and interleaves with the surrounding tiles similar to tile flashing mount 200 above. Tile flashing mount 3300 comprises a base 3310, a flashing 3320, and an upper pedestal 3330 as will be described in more detail below. Leveling foot 110 is shown attached to upper pedestal 3330 and upper pedestal 3330 is shown rotated approximately 30 (usually between 10-50, 15-45, or 25-35) degrees clockwise from the fully up-roof position.

Figure 34:
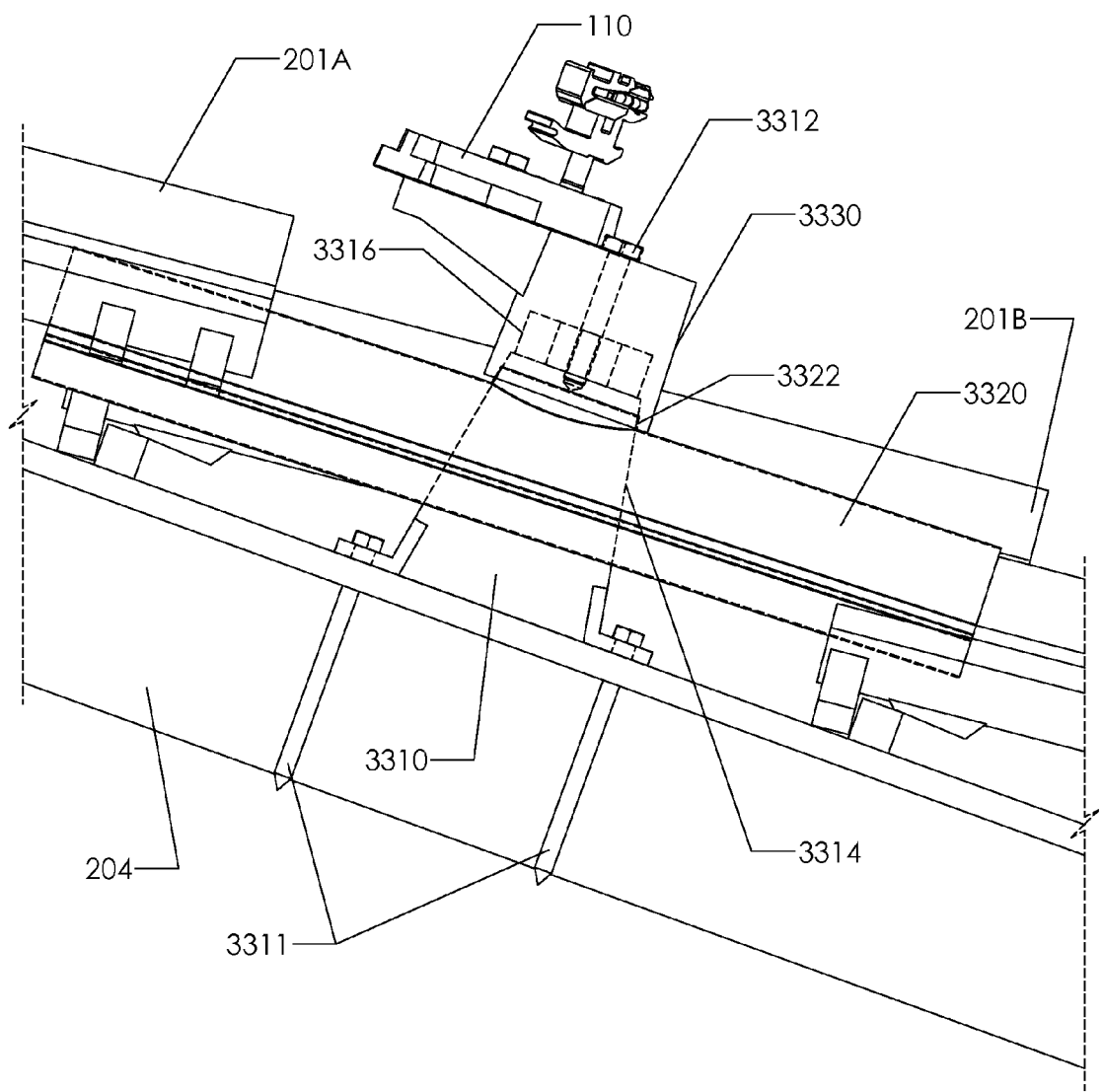
FIG. 34 is an orthogonal view of a roof with a roof tile removed and a replacement tile installed atop a support structure with a top arm installed atop the replacement tile and support structure and a leveling foot installed atop the top arm.

FIG. 34 shows a side view of tile flashing mount 3300 installed on roof 10 (for clarity, dashed lines are only shown where base 3310 is hidden by flashing 3320 and where flashing 3320 is hidden by pedestal 3330; other hidden portions are not revealed with dashed lines). With additional reference to FIG. 36, which shows a perspective view of tile flashing mount 3300 installed on roof 10, further details of base 3310 will be discussed below. Base 3310 may comprise slotted or perforated flanges for attachment via lag screw 3311, similar to mount 200. However, instead of vertical portions 214a, 2214b, base 3310 may comprise a cone-shaped riser portion 3314 with a male hexagonal portion 3316 for mating with a corresponding female hexagonal portion on the inside of pedestal 3330, as will be described below in greater detail. Hexagonal portion 3316 may further comprise a threaded hole 3318 for receiving a fastener.

Figure 34A:
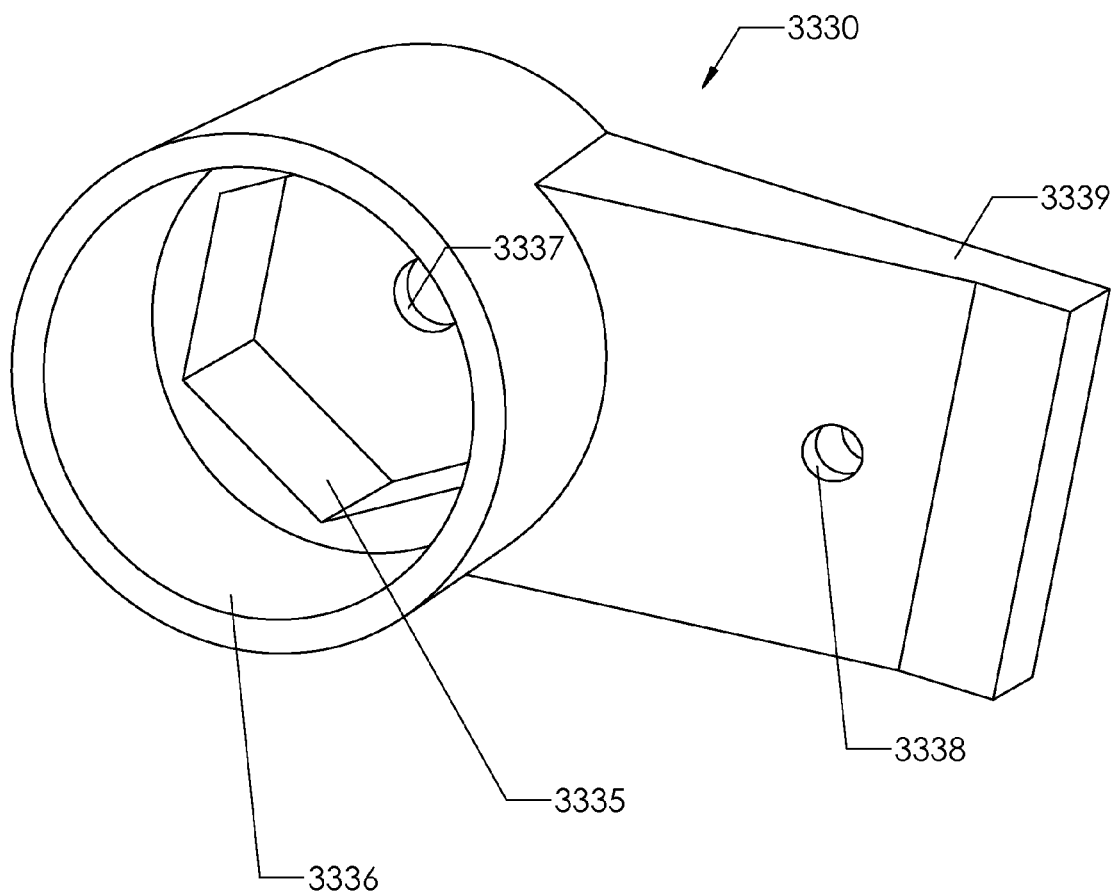
FIG. 34A is a view of the underside of a top arm.

FIG. 34A shows a perspective view of pedestal 3330 looking from the underside. Pedestal 3330 may comprise a female conical portion 3336 for mating with riser portion 3314 and aperture 3322 and a female hexagonal portion 3335 for mating with male hexagonal portion 3316. Pedestal 3320 may further comprise a through-hole 3337 for receiving bolt 3312 and a hole 3338 which may be tapped for receiving a threaded bolt or a through-hole for receiving a bolt that is secured by other means such as a nut.

Figure 35:
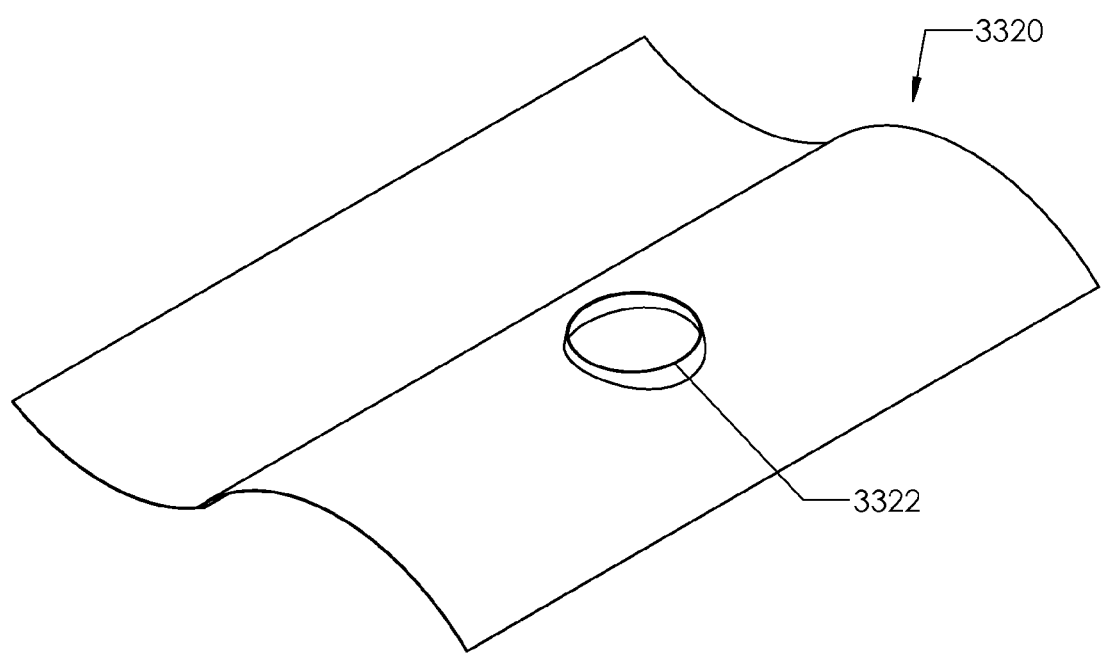
FIG. 35 is an isometric view of a replacement tile.

FIG. 35 shows a perspective view of flashing 3320 with conical aperture 3322. Flashing 3320 may be formed as a one-piece stamped or molded part. Aperture 3322 may be sized to slide over and mate with riser portion 3314 during installation. Instead of a resilient seal as described above for flashing 220, aperture 3322 may be at least partially sealed by compression, when female conical portion 3336 located on the inside of pedestal 3320 may be pulled downward by tightening of bolt 3312. The height of the walls of aperture 3322 may also channel water away from aperture 3322.

FIGS. 36-39 show a perspective view of a typical, non-limiting installation sequence for tile flashing mount 3300.

Figure 36:
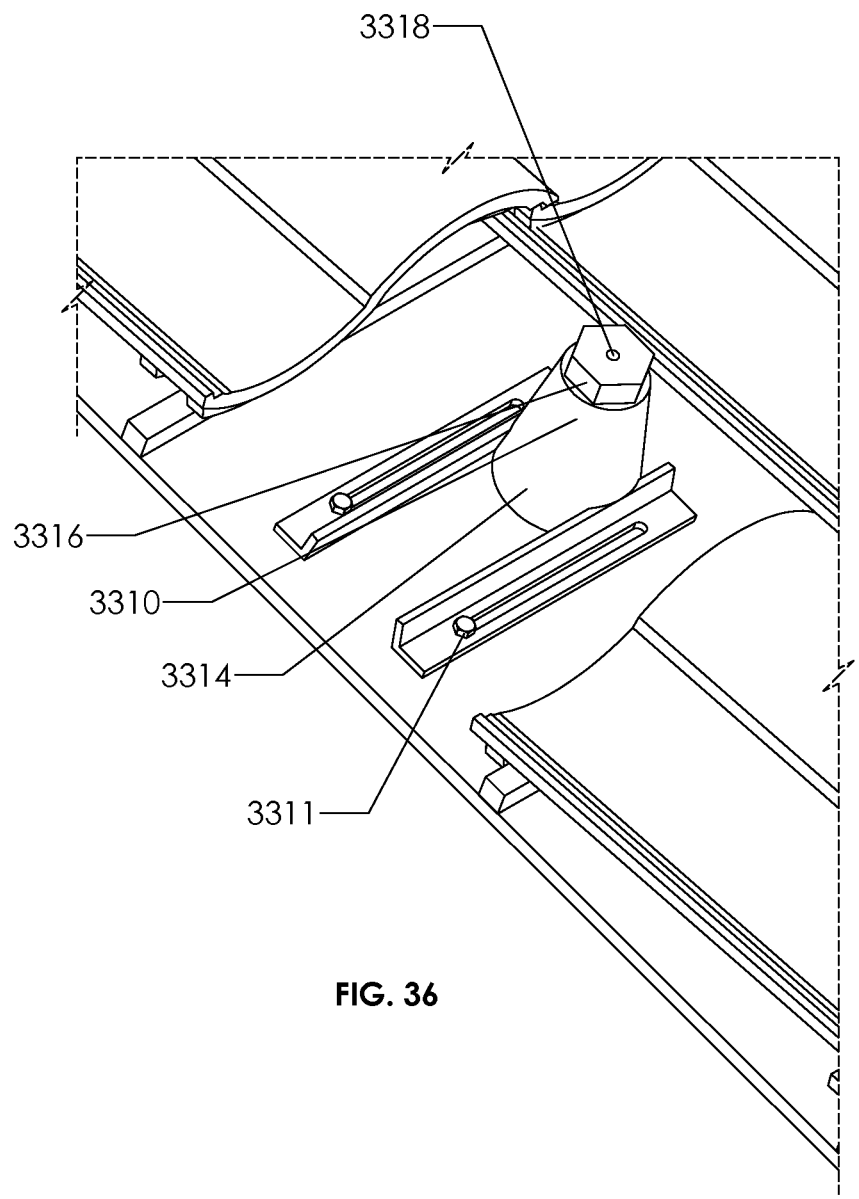
FIG. 36 is an isometric view of a roof with a roof tile removed and a support structure installed.
Figure 37:
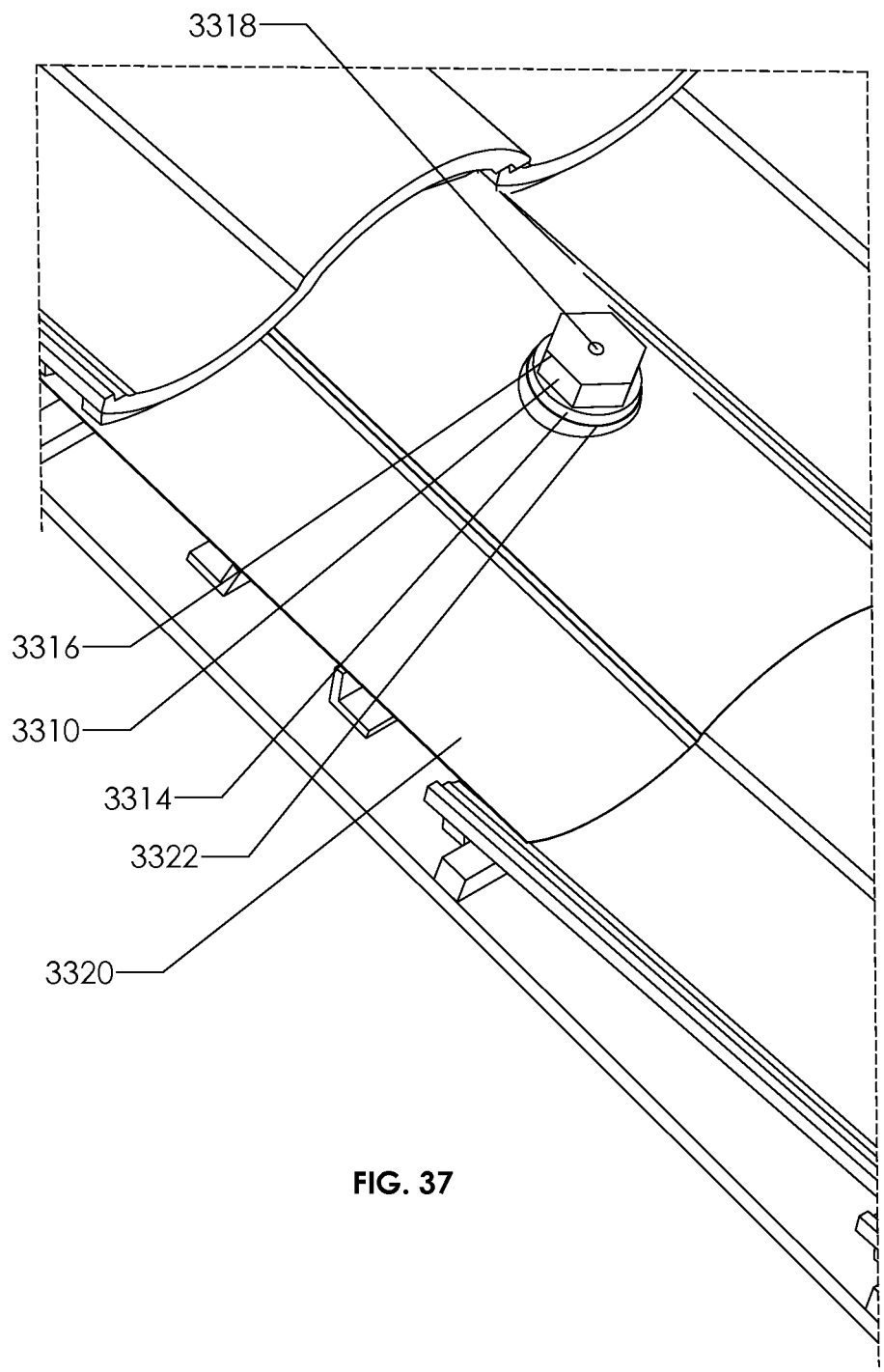
FIG. 37 is an isometric view of a roof with a roof tile removed and a replacement tile installed atop a support structure.
Figure 38:
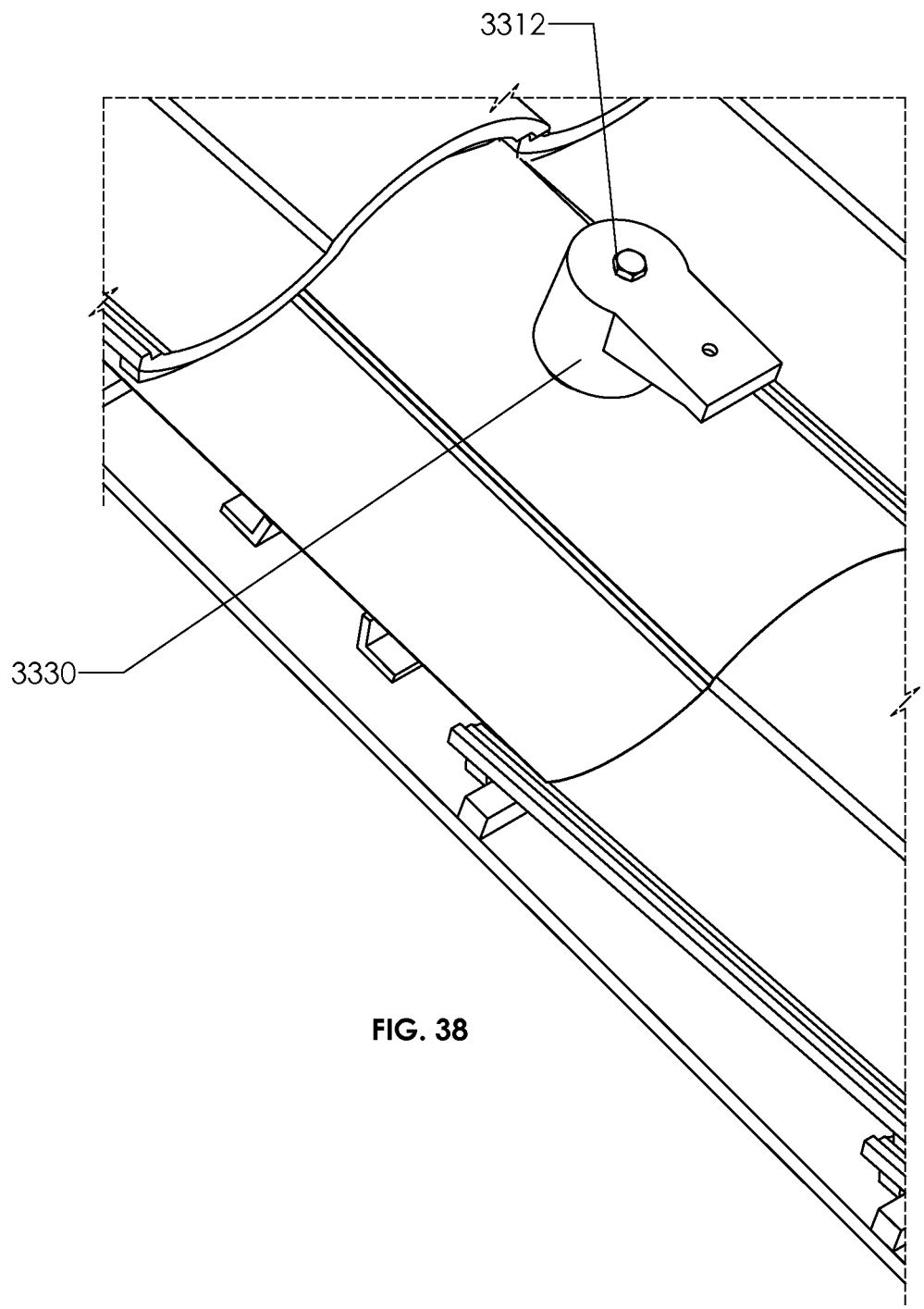
FIG. 38 is an isometric view of a roof with a roof tile removed and a replacement tile installed atop a support structure with a top arm installed atop the replacement tile and support structure.
Figure 39:
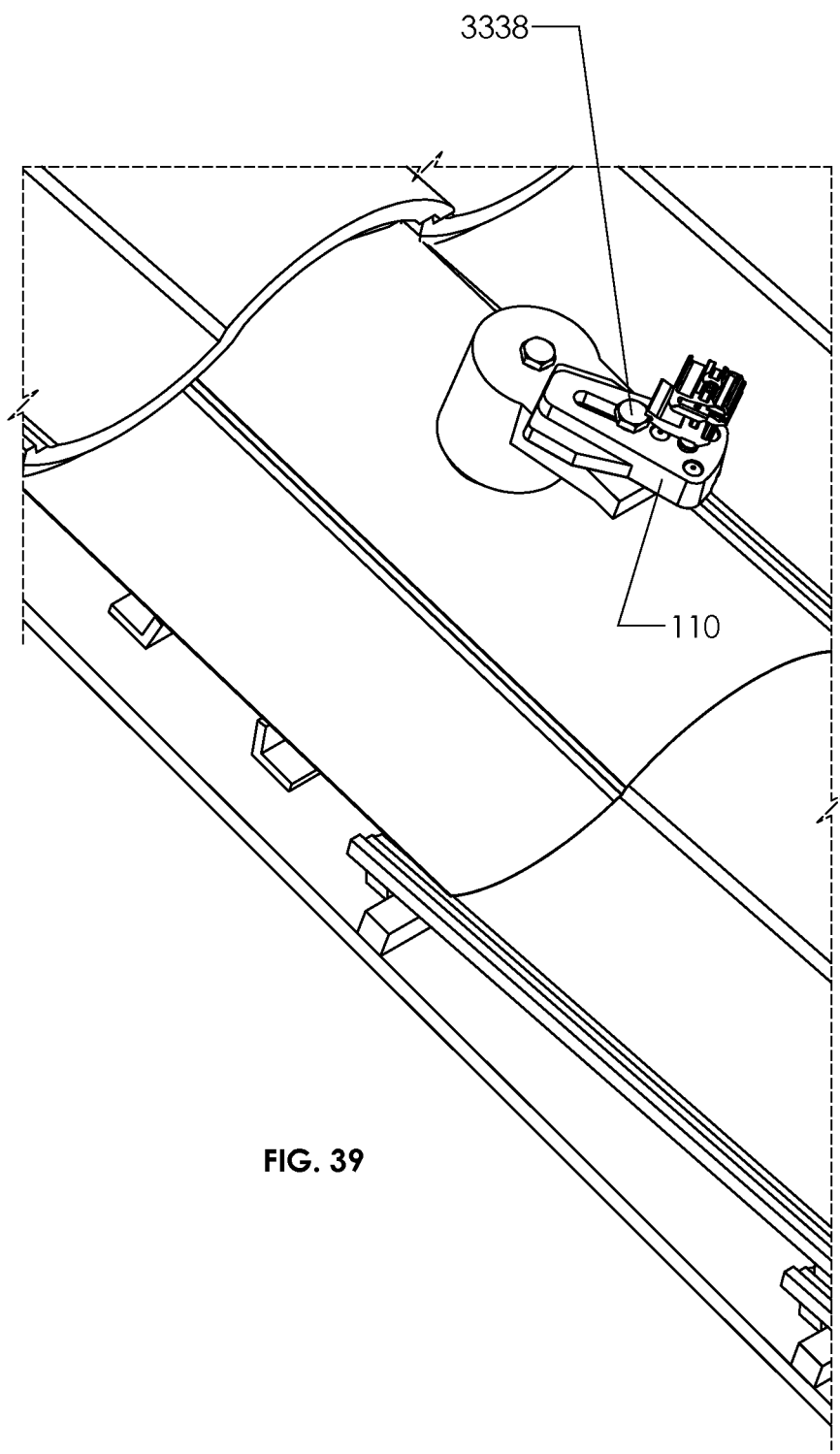
FIG. 39 is an isometric view of a roof with a roof tile removed and a replacement tile installed atop a support structure with a top arm installed atop the replacement tile and support structure and a leveling foot installed atop the top arm.

FIG. 36 shows roof 10 with base 3310 that is conical, substantially conical, or conical with one or more deviations connected to rafters via lag screws 3311. Positioning of base 3310 is similar to base 210. FIG. 37 shows the next step where flashing 3320 has been slipped over base 3310, conical aperture 3322 walls are shown mating with the upper portion of riser 3314 and male hexagonal portion 3316 is left protruding above the surface of flashing 3320. FIG. 38 shows pedestal 3330 having been slipped over both the walls of aperture 3322 and riser portion 3314, rotated to align female hexagonal portion 3335 with male hexagonal portion 3316, and then secured with bolt 3312. FIG. 39 shows the final step of connecting leveling foot 110 to pedestal 3330 with bolt 3338.

The six available rotational positions allowed by the hexagonal engagement of pedestal 3330 provides increased mounting flexibility along the x-axis. In some cases, for example where a rafter is located near the seam between two tiles, this flexibility may allow the connection of a leveling foot closer to the rafter, thereby reducing the length of a horizontal moment arm acting on lag screw 3311 under load. In other embodiments more or less rotational positions are available by changing the number of sides from hexagonal (6) to pentagonal (5), octagonal (8), and other numbers of sides and/or using small teeth. In still other embodiments essentially infinite rotational positions are enabled by relying on clamping force and friction resulting from tightening of bolt 3312 to prevent rotation of pedestal 3330 under load.

FIGS. 40-45 show an embodiment of a tile flashing mount 4000. Tile flashing mount 4000 is similar to tile flashing mount 200 in that it comprises a base, a flashing and performs similar functions. However, the structural elements may differ as described below. In general, tile flashing mount 4000 is simpler in that it does not comprise an upper pedestal 230, but rather achieves similar functionality by, among other things, increasing the size and raising the height of the flashing platform and increasing the size of the upper portion on the base.

Flashing mount 4000 replaces the tile above 201b and interleaves with the surrounding tiles in a manner similar to the description for tile flashing mount 200 above. Tile flashing mount 4000 comprises a base 4010 and a flashing 4020 as will be described in more detail below.

Figure 40:
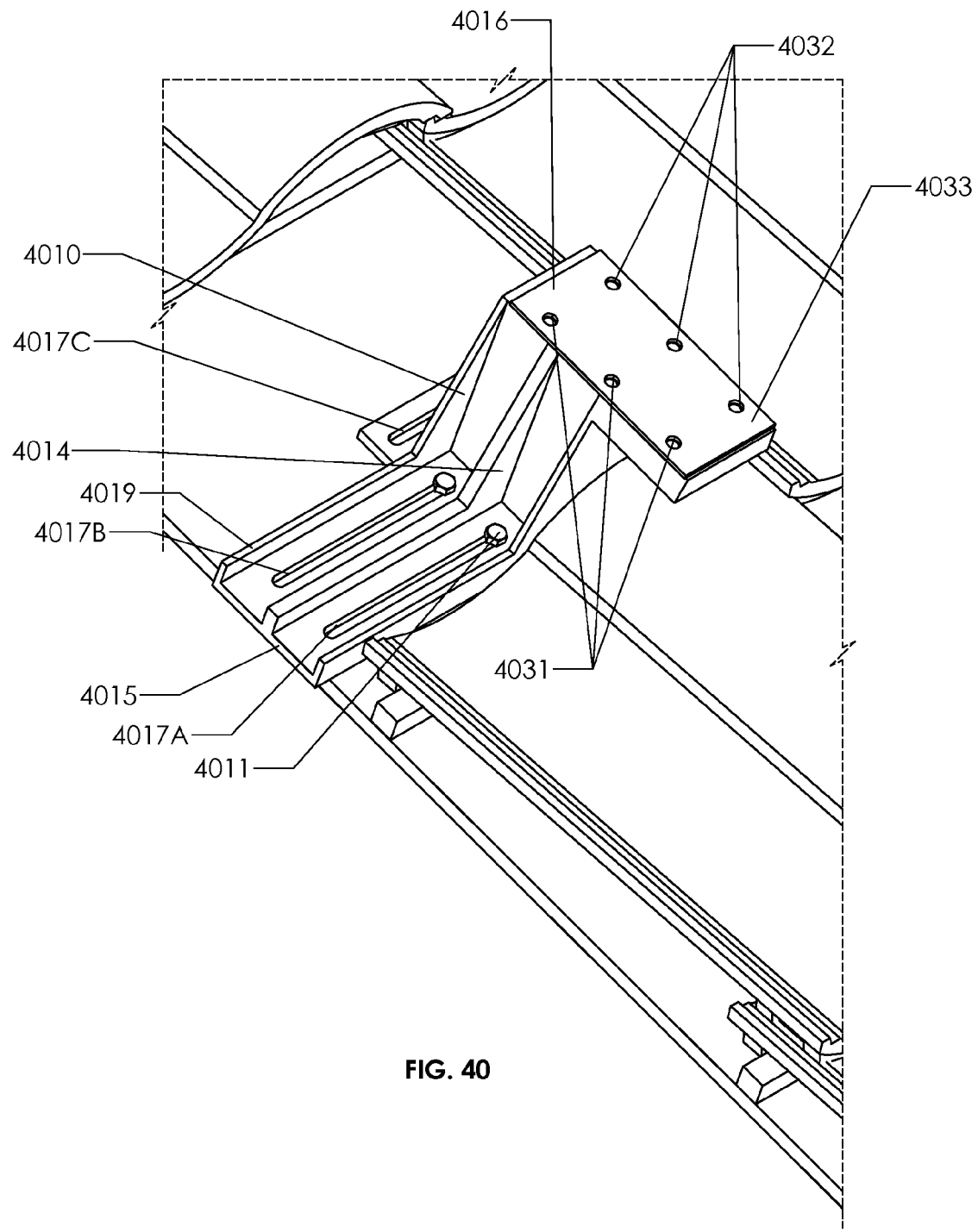
FIG. 40 is an isometric view of a roof with a roof tile removed and a support structure installed.

FIG. 40 shows a perspective view of base 4010 installed on tile roof 10. Base 4010 may comprise: a lower portion 4015 having generally flat shape with optional stiffening ribs 4019 and slots 4017a, 4017b, 4017c for lag screws 4011; a vertical riser portion 4014 with optional stiffening ribs; and an upper portion 4016 having a generally flat shape and comprising holes 4031, 4032. Since there is no upper pedestal disclosed in the instant embodiment, upper portion 4016 may further comprise a cantilevered portion 4033 for providing connecting points located out over or above the tile below. Such additional connecting points may be required in a rail-free mounting system where it is desirable to always have a connecting point near each laterally running PV module 100 edge.

Figure 41:
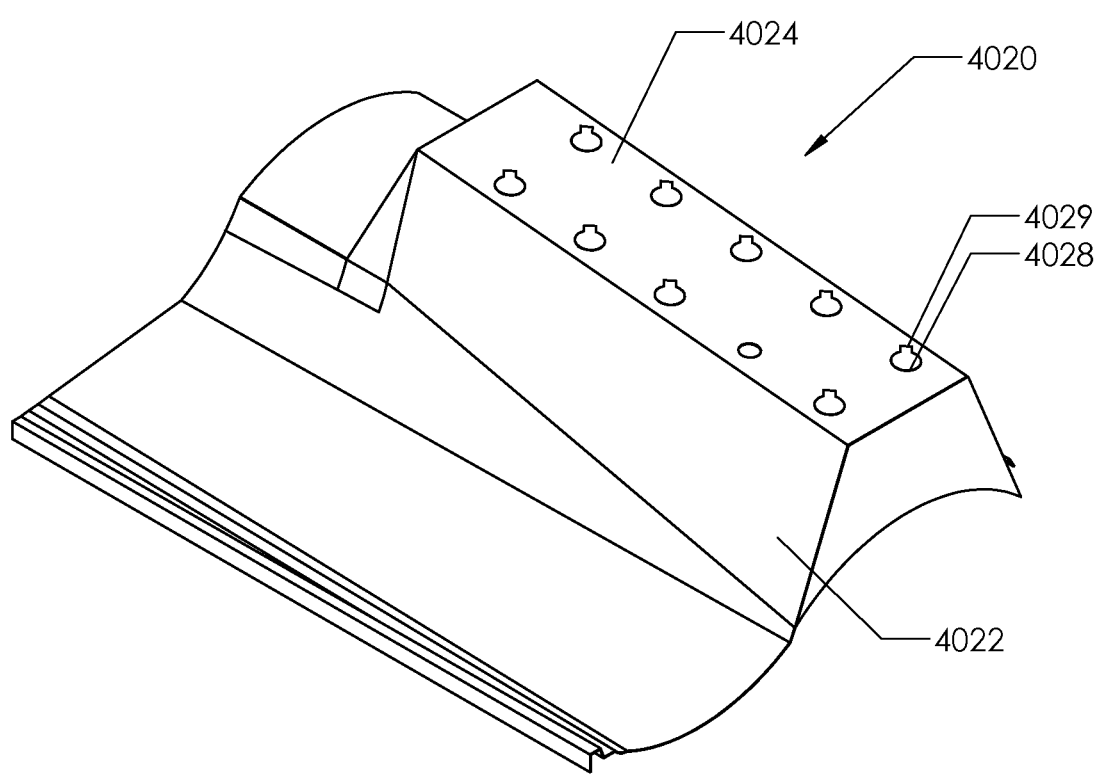
FIG. 41 is an isometric view of a replacement tile.
Figure 42:
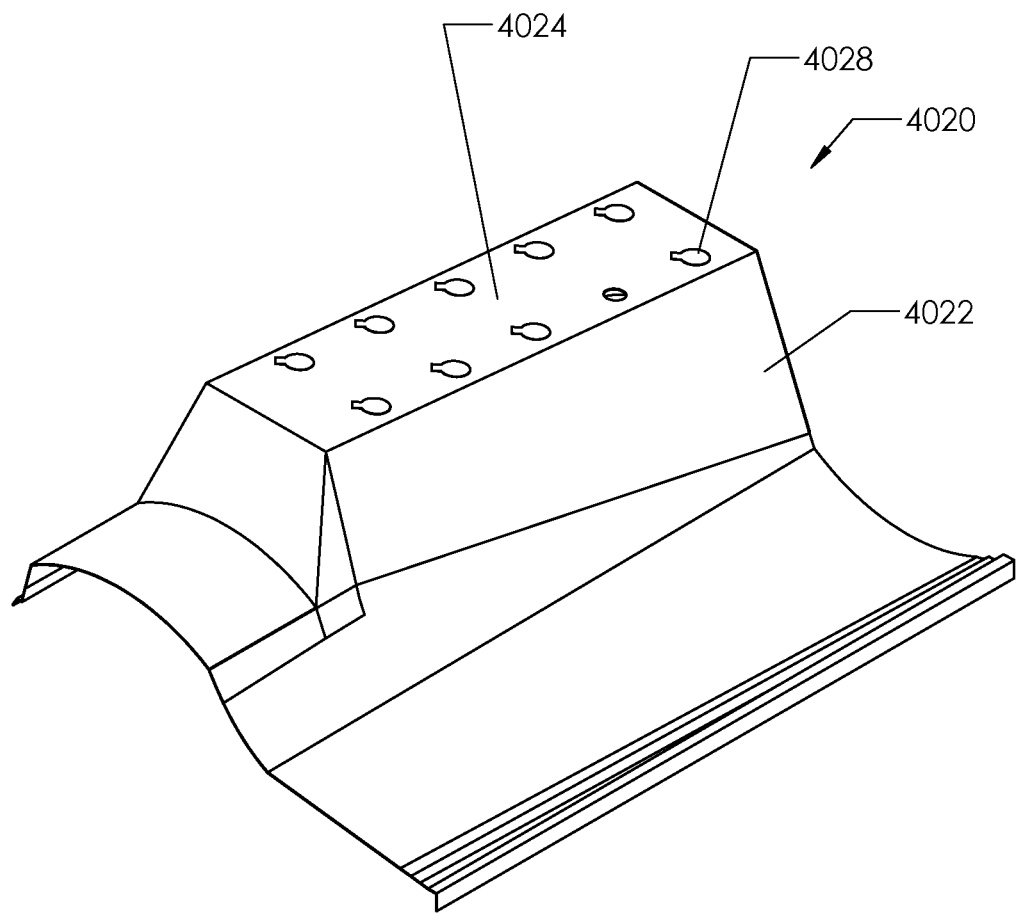
FIG. 42 is an alternate view of a replacement tile.
Figure 44:
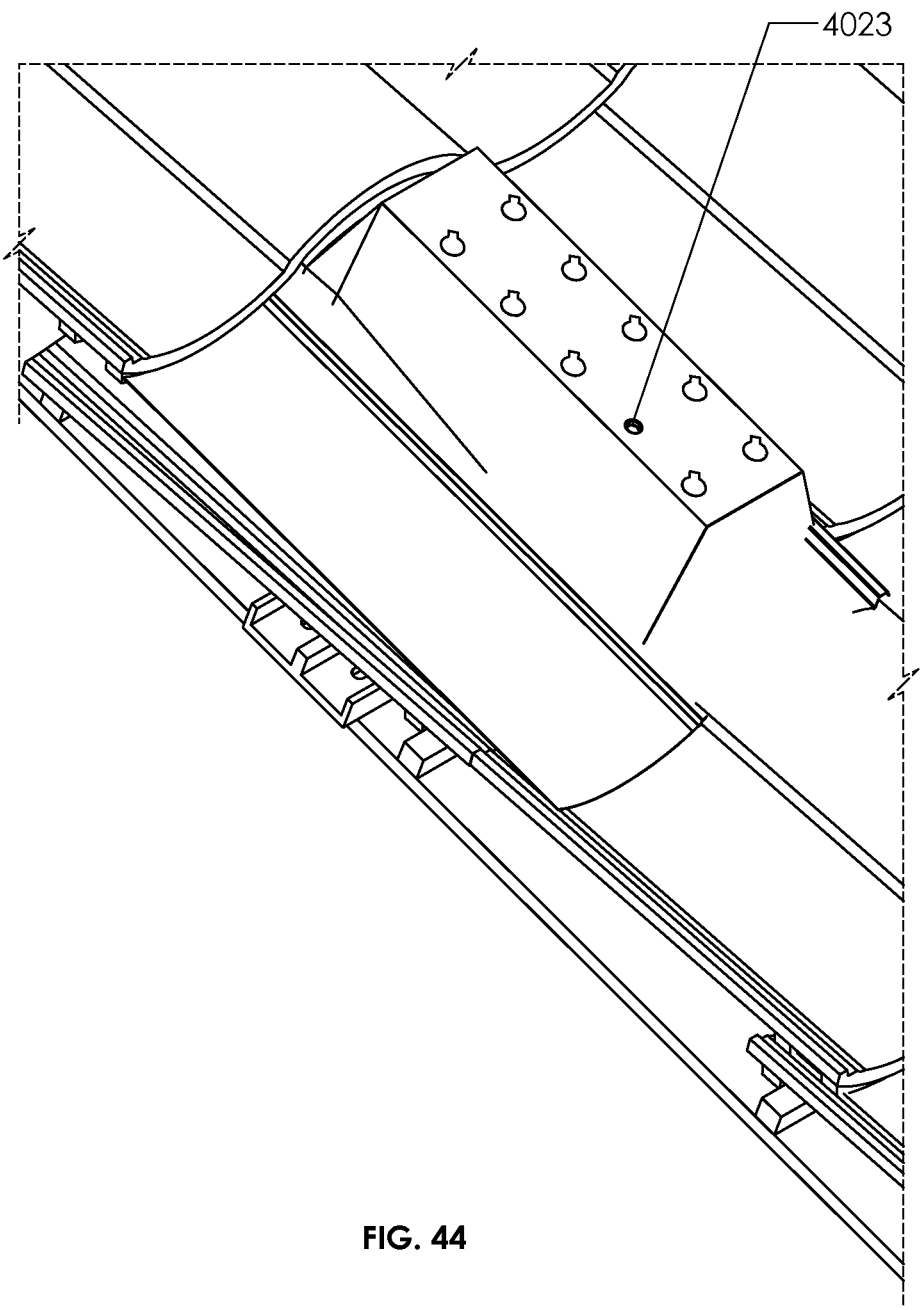
FIG. 44 is an isometric view of a roof with a roof tile removed and a replacement tile installed atop a support structure where one cap has been removed to reveal an aperture.

FIGS. 41-42 show perspective views of flashing 4020 with sealing covers 4028 covering holes 4023 (see FIG. 44). Sealing covers 4028 may comprise a semi-rigid sheet with a tab portion 4029 and an adhesive on the underside (not shown). Covers 4028 may be factory-adhered, permitting the installer (in the field) to utilize tab portion 4029 to remove a single cover 4028 (or more covers) required for any or each specific hole that may be utilized for connection. In other embodiments, devices or structures other than or in combination with tabs may be employed or used to enable easy removal of cover 4028, such as slots, ridges, bumps, handles, grips and other mechanisms which may be easily actuated by hand or with a hand-held tool. In still other embodiments, covers 4028 may comprise a plastic or rubber plug for easy removal and a fluid-tight seal. Walls 4022 rise upward towards platform 4024, which is larger than platform 224 since there is no upper pedestal in this embodiment.

Figure 43:
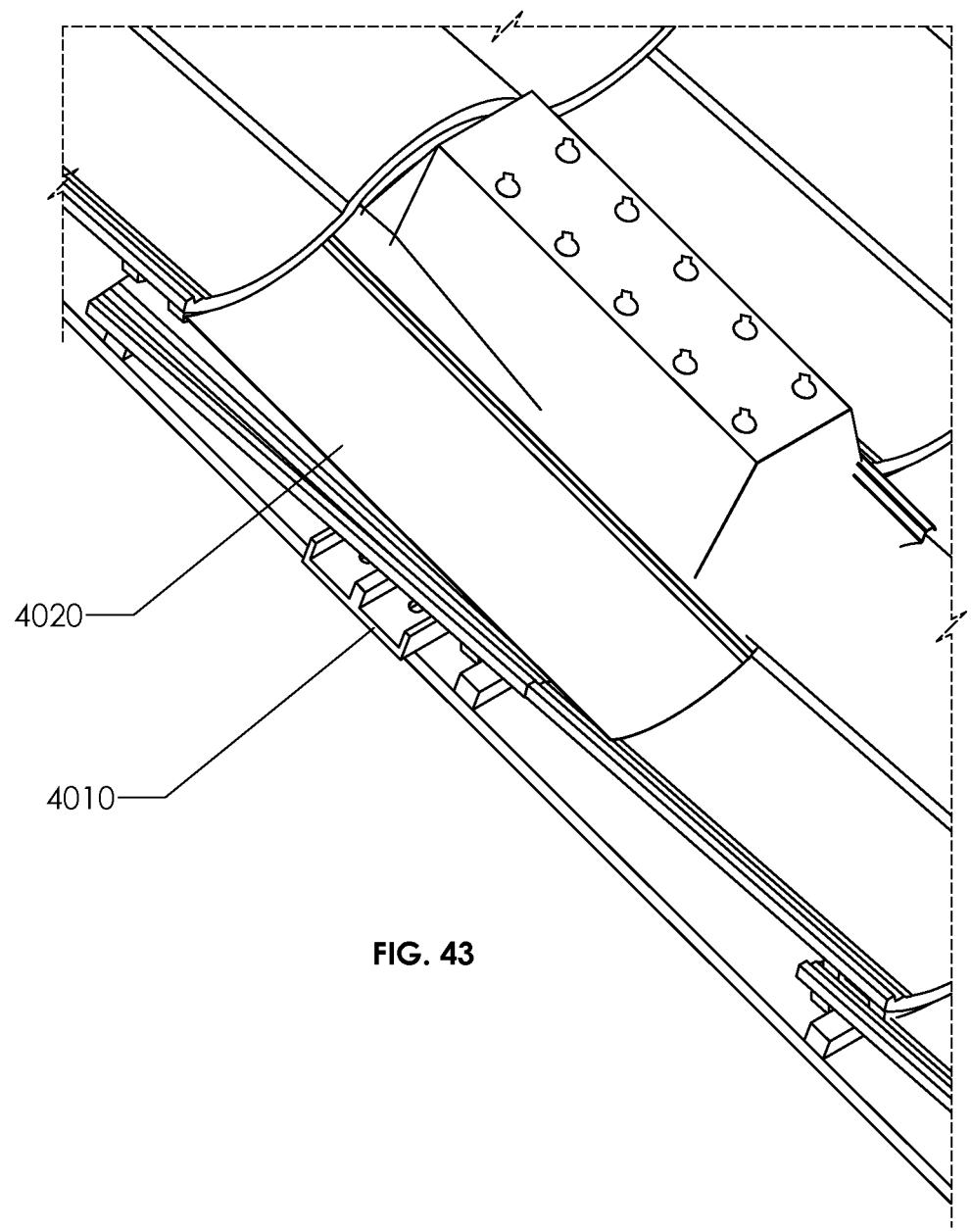
FIG. 43 is an isometric view of a roof with a roof tile removed and a replacement tile installed atop a support structure.
Figure 45:
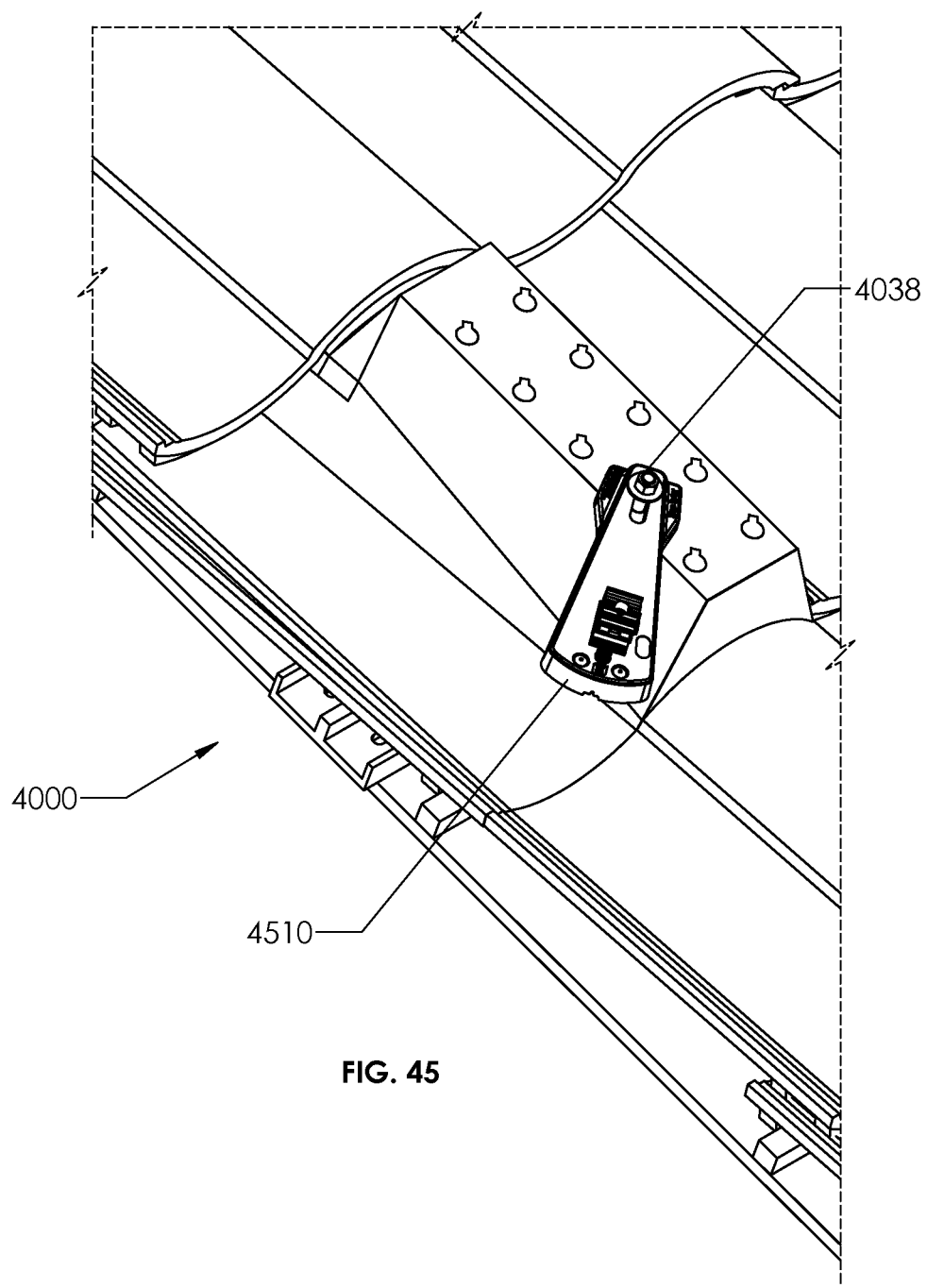
FIG. 45 is an isometric view of a roof with a roof tile removed and a replacement tile installed atop a support structure with a leveling foot installed atop the replacement tile and support structure.

FIGS. 40, 43, 44, 45 shows a perspective view of a typical, non-limiting installation sequence for tile flashing mount 4000. FIG. 40 shows roof 10 with base 4010 connected to rafters via lag screws 4011. Positioning of base 4010 is similar to base 210. FIG. 43 shows the next step where flashing 4020 has been slipped over base 4010. In some embodiments, a bolt protruding skyward, such as a carriage bolt, may be installed in base 4010 prior to installing flashing 4020, thereby making it easy to determine which hole 4028 in flashing 4020 will be used. FIG. 44 shows flashing 4020 with one cover 4028 removed and ready for a fastener (not shown) to be installed through hole 4023. FIG. 45 shows the final step of connecting leveling foot 4510 to base 4010 with bolt 4038. Leveling foot 4510 is similar to leveling foot 110 except that it is longer, which may provide more mounting positions along the x-axis.

FIGS. 46-52 show an embodiment of a tile flashing mount 4600. Tile flashing mount 4600 is similar to tile flashing mount 200 in that it comprises a base, a flashing, and an upper pedestal and performs similar functions. However, the structural elements differ in certain ways as described below. In general, tile flashing mount 4600 provides the potential to reduce uplift moments more than with other embodiments disclosed above, as will be described below.

Figure 46:
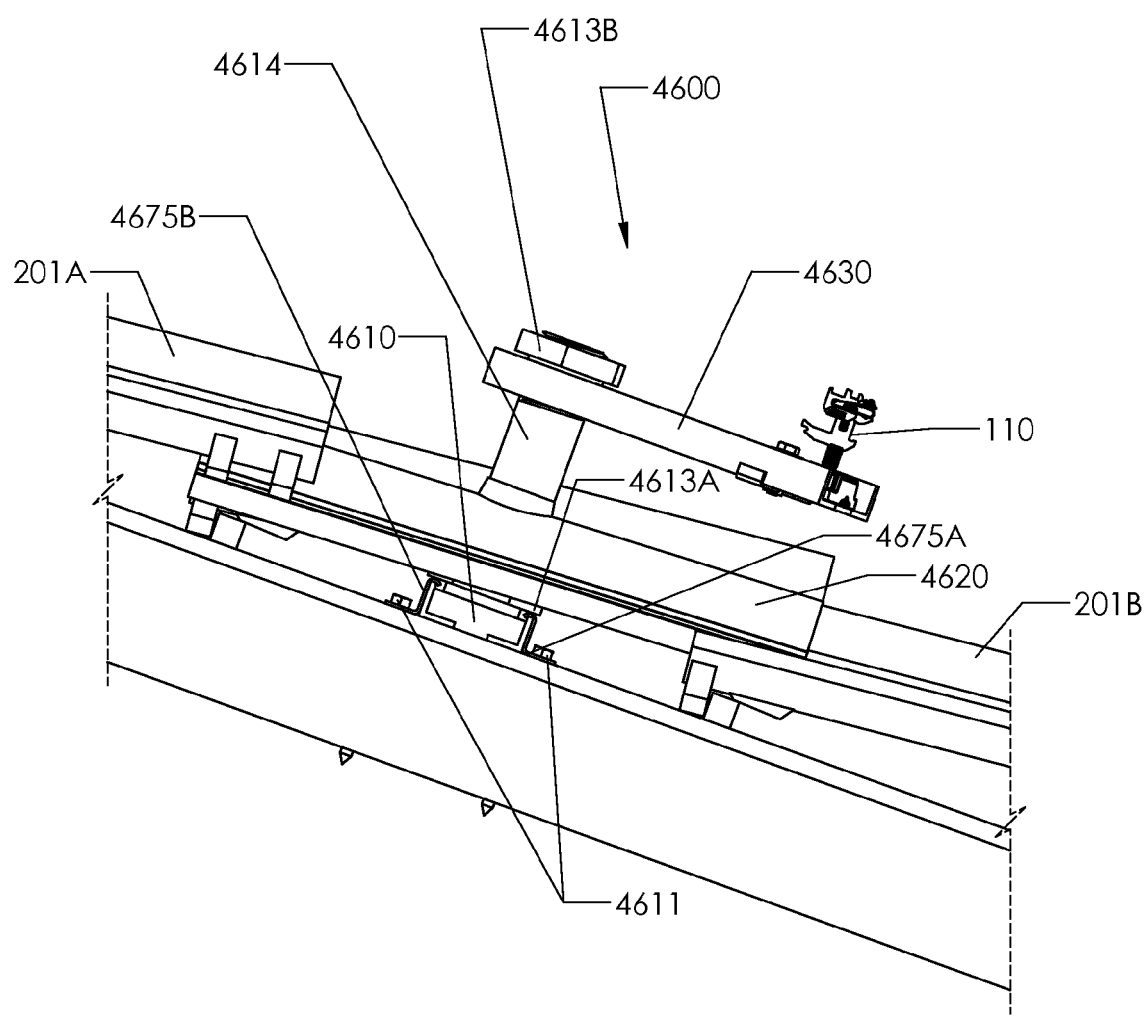
FIG. 46 is an orthogonal view of a roof with a roof tile removed and a replacement tile installed atop a support structure with a top arm installed atop the replacement tile and support structure and a leveling foot installed atop the top arm.

FIG. 46 shows a side view of tile flashing mount 4600. Tile flashing mount 4600 replaces the tile above 201b and interleaves with the surrounding tiles similar to tile flashing mount 200 above. Tile flashing mount 4600 comprises a base or lower arm 4610, a flashing 4620, and an upper arm or pedestal 4630. Lower and upper arms 4610 and 4630 may be identical parts or similar in construction. Lower arm 4610 may further comprise hold-down clamps 4675a, 4675b for receiving lag screws 4611 and clamping lower arm 4610 to roof 10. A cylindrical (or other cross-sectionally shaped elongated member) pipe or rod may connect between lower arm 4610 and upper arm 4630, such as pipe 4614. Pipe 4614 may be externally threaded at one or both ends. Lower and upper arms 4610 and 4630 respectively may each comprise a threaded hole of approximately the same size as pipe threads on pipe 4614 and are connected to pipe 4614 by threading onto pipe 4614 then securing with retaining nuts 4613a, 4613b. In some embodiments, nuts 4613a, 4613b may comprise cutting teeth or protrusions that cut in lower and upper arms respectively, thereby creating a reliable ground bond there between. In other embodiments pipe 4614 is not threaded but rather comprises a retaining ring or protrusion in combination with a nut for coupling arms 4610 and 4630 to pipe 4614. In still other embodiments pipe 4614 and arms 4610, 4630 may mate via tapered or splined features, or by a sleeve fitting, or by other means known to one of skill in the art. Arms 4610 and 4630 may be cast, extruded, molded, or otherwise fashioned metal, plastic, composite, or other reasonably rigid material.

Figure 47:
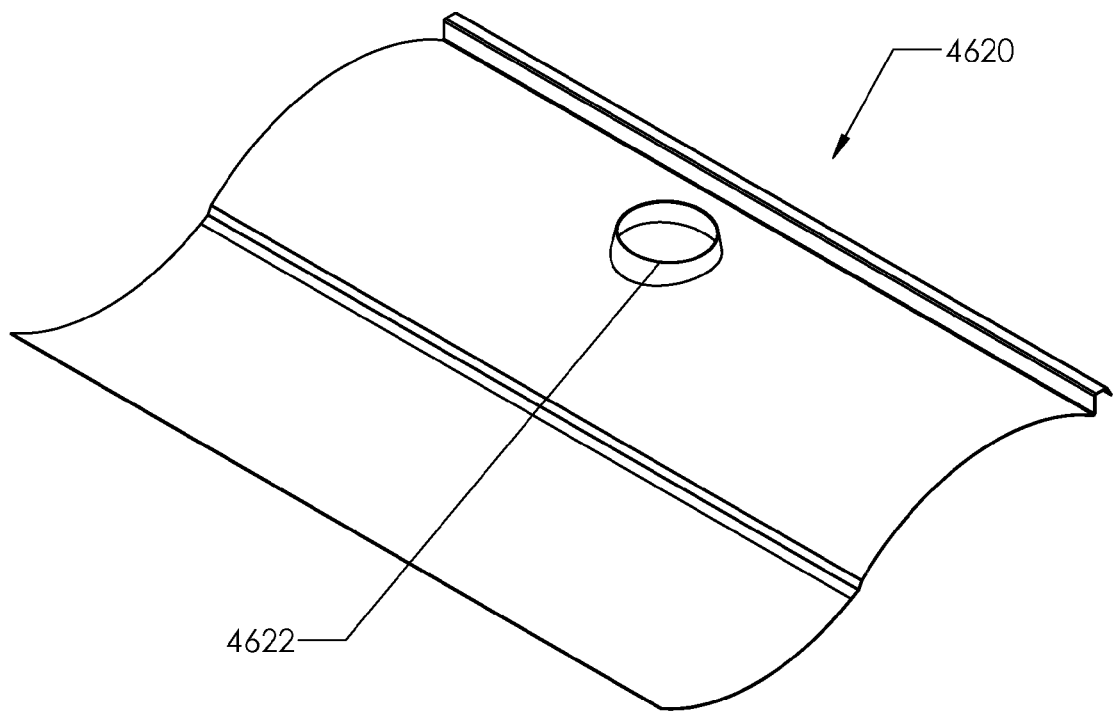
FIG. 47 is an isometric view of a replacement tile.

FIG. 47 shows a perspective view of flashing 4620 with conical aperture 4622. Flashing 4620 may be formed as a one-piece stamped or molded or otherwise formed part. Aperture 4622 may be sized to slide over pipe 4614 during installation. Aperture 4622 may substantially prevent or inhibit water ingress through flashing 4620 via the height of its walls (which channel water away) and/or by a seal such as rubber, caulk, sealant, or the like (not shown) between pipe 4614 and aperture 4622.

Figure 48:
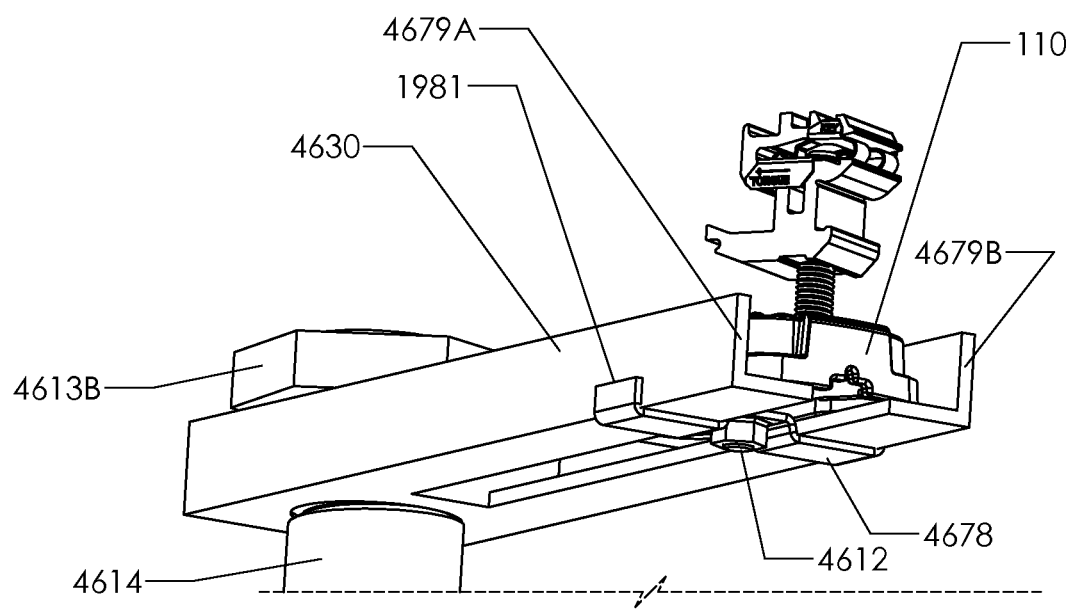
FIG. 48 is a bottom view of a leveling foot engaging a top arm.

FIG. 48 shows a perspective view from the underside of upper arm 4630 with leveling foot 110 installed thereto. Upper arm 4630 may comprise two extensions projecting away from pipe 4614, such as L-shaped extensions 4679*a*, 4679*b*. Extensions 4679*a*, 4679*b* may be separated by a slot or gap as shown and a nut portion 4678 may be partially positioned within the gap to help resist torque loads applied to nut 4678. Nut portion 4678 may further comprise upturned portions 1981 to further resist torque loads on nut portion 4678. Extensions 4679*a*, 4679*b* may provide a channel for resting leveling foot 110 during installation before leveling foot 110 is fully secured to upper arm 4630. In other embodiments upper arm 4630 comprises a T-shaped slot for capturing the head of a standard bolt or nut thereby eliminating the need for a more custom nut, such as nut portion 4678. In still other embodiments leveling foot 110 may be connected to upper arm 4630 by a set screw, clamping mechanism, press-fit, snap-on, or other means of connection. In still other embodiments PV module 100 may rest directly on upper arm 4630 and may be clamped thereto without the need or requirement for a leveling foot. In such embodiments the leveling functionality provided by a leveling foot may instead be handled by upper arm 4630, which may be variably positioned on pipe 4614, as by rotating and moving up and down the threaded portion thereof. Additional leveling functionality may also be provided by adjusting the height of pipe 4614 relative to lower arm 4610 via the lower threads on pipe 4614.

Figure 49:
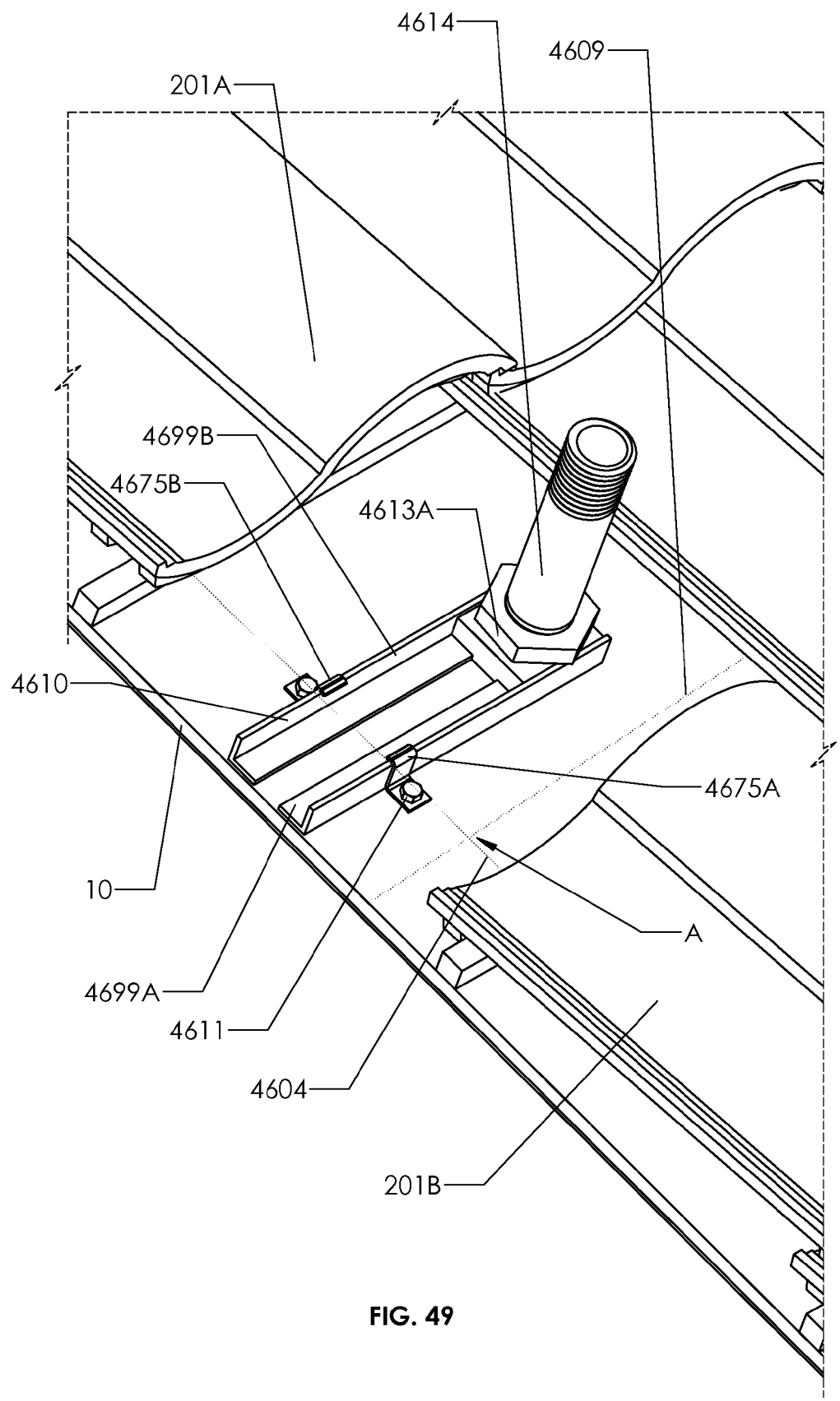
FIG. 49 is an isometric view of a roof with a roof tile removed and a support structure installed.

FIGS. 49-52 show a perspective view of a typical, non-limiting installation sequence for tile flashing mount 4600. FIG. 49 shows roof 10 with base 4610 connected to rafters via lag screws 4611 running through hold-down clamps 4675*a*, 4675*b*. Since lower arm 4610 and/or upper arm 4630 may rotate relative to pipe 4614, aperture 4622 in flashing 4620 may be positioned so that it may be aligned in its final position approximately with the centerline between the lower edge of tile 201*a* and the upper edge of tile 201*b*. With this alignment scheme, a first installation step may be to remove a tile and install lower arm 4610 so that pipe 4614 will approximately line-up along the x-axis with a peak 206 of tile 201*a* and will be approximately centered between tiles 201*a* and 201*b* along the y-axis. Extensions 4699*a*, 4699*b* may run approximately parallel to the x-axis, as shown in FIG. 49, in order to minimize the distance required to reach a rafter (which could exist anywhere in the space between two tiles). However, in order to minimize moments around the x-axis, lower arm 4610 may be rotated either clockwise or counterclockwise from the orientation shown in order to end up falling or otherwise being located essentially beneath the final location of leveling foot 110, as will be discussed further below. It should also be noted that hold-down clamps 4675*a*, 4675*b* may be positioned anywhere along the length of lower arm 4610, including the region beside pipe 4614, enabling connection to a rafter even if it falls beneath or below pipe 4614.

Figure 50:
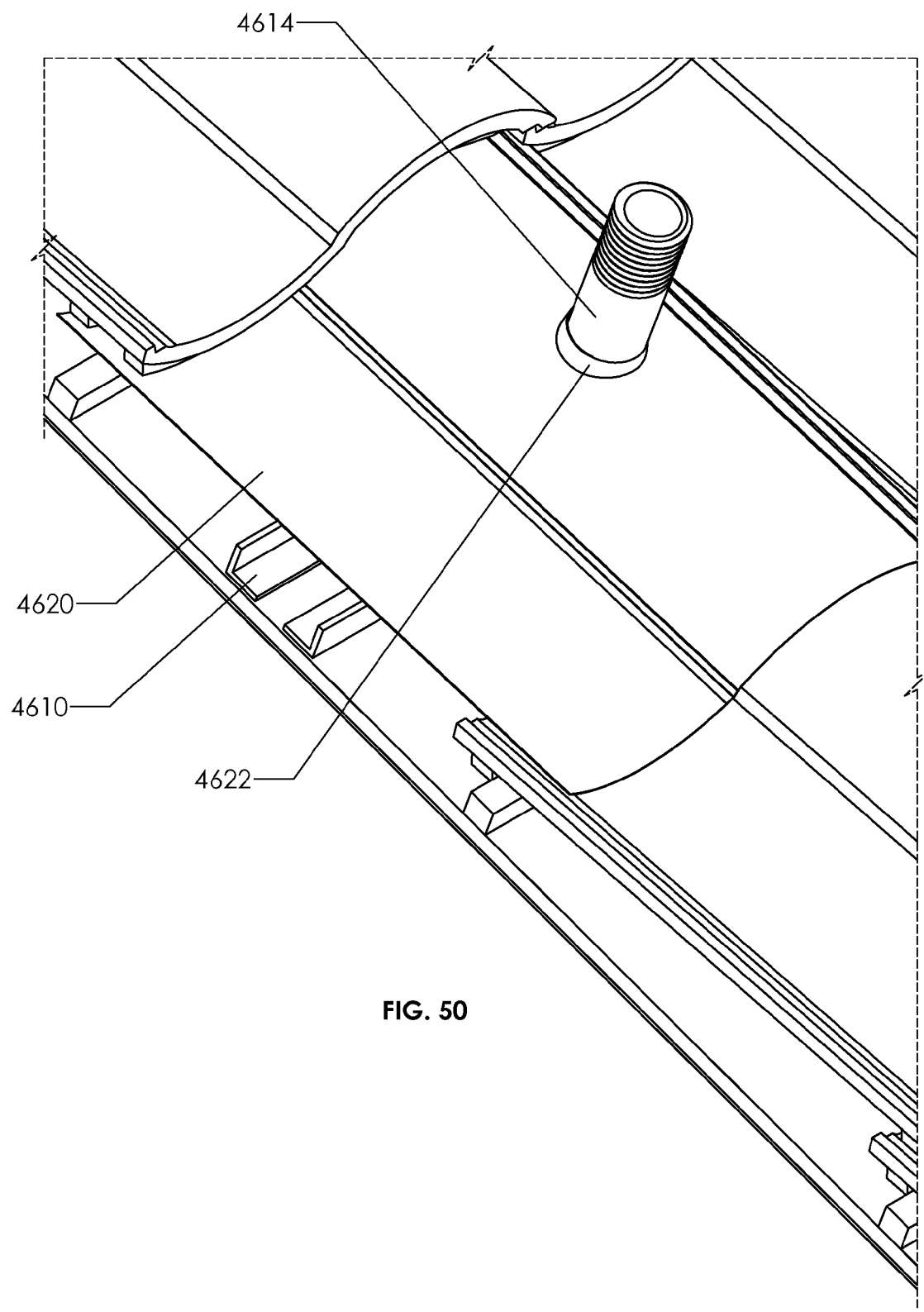
FIG. 50 is an isometric view of a roof with a roof tile removed and a replacement tile installed atop a support structure.

FIG. 50 shows the next step where flashing 4620 has been slipped over base 4610. In some embodiments the space between aperture 4622 and pipe 4614 may be sealed with caulk or sealant or the like (not shown) at this stage; in other embodiments this seal may be obtained by an integral rubber (or other suitable) seal in aperture 4622 as is common in the art.

Figure 51:
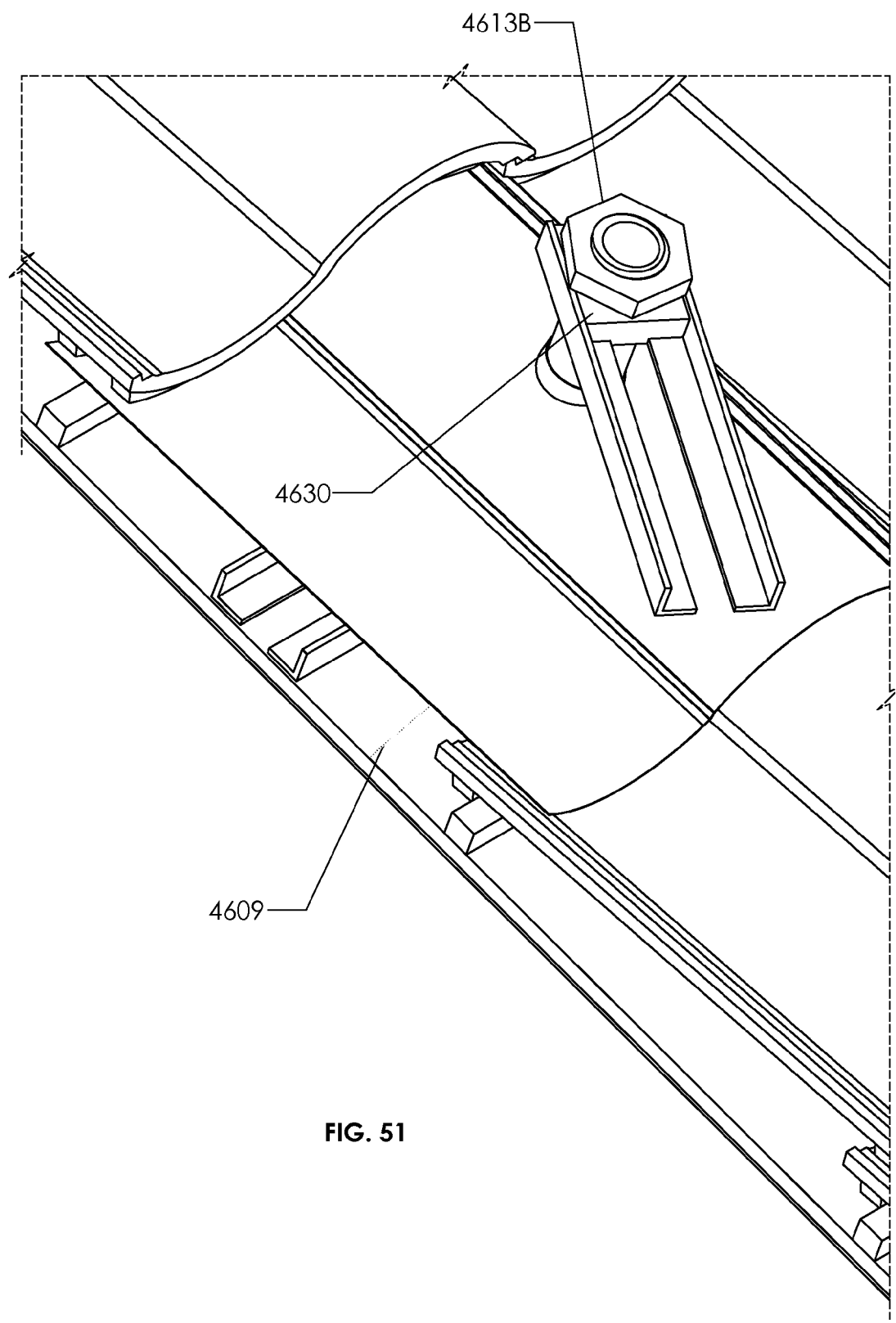
FIG. 51 is an isometric view of a roof with a roof tile removed and a replacement tile installed atop a support structure with a top arm installed atop the replacement tile and support structure.

FIG. 51 shows upper arm 4630 having been threaded onto pipe 4614 and further secured by retaining nut 4613*b*. Nut 4613*b* is shown here as a typical hexagonal nut, though in other embodiments a nut may comprise other shapes, such as square, pentagonal, octagonal, and the like, or may be knurled so that it may be easily rotated by hand, or may comprise notches so that it may be rotated by tapping, nudging, torqueing, or similarly applying force to the notches. Upper arm 4630 in the instant embodiment is shown as rotated around pipe 4614 until it reaches both a desired height off of (above) roof 10 and is at a desired rotational position, such as a position that would allow optimum placement of leveling foot 110 relative to PV module 100 and to lag screws 4611. Once the desired height and/or rotational position have been achieved, retaining nut 4613*b* may be tightened to resist further rotation of upper arm around pipe 4614.

As a non-limiting example, an installer may determine that an edge of a PV module 100 will approximately align (once installed) with the line marked 4609 in FIG. 49. Since leveling foot 110 may be variably positioned along module frame 104 with respect to the x-axis, a preferred rotational position for upper arm 4630 may be in a position that results in leveling foot 110 being substantially close to position A (in FIG. 49). Position A may be preferred since this would place leveling foot 110 directly over rafter 4604, substantially reducing or eliminating a moment about the y-axis that would result in a prying force (during uplift) at lag screw 4611, if leveling foot 110 was positioned to the right of A (as in FIG. 49). One of skill in the art will recognize that the ability of upper arm 4630 to rotate around or about pipe 4614, for example, in order to reduce or eliminate prying forces on lag screws 4611, may reduce the cost and/or simplify the installation of tile flashing mount 4600.

Figure 52:
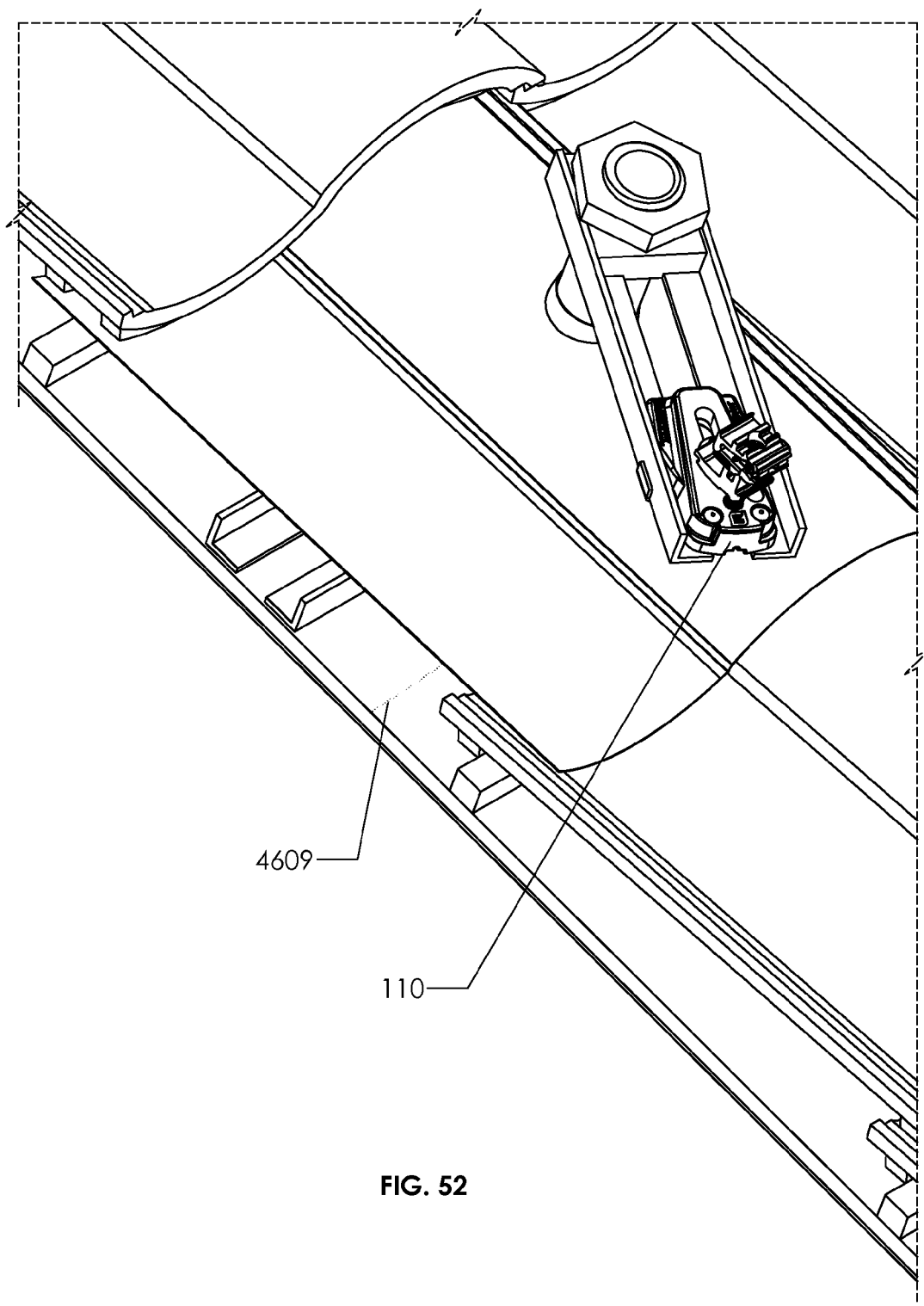
FIG. 52 is an isometric view of a roof with a roof tile removed and a replacement tile installed atop a support structure with a top arm installed atop the replacement tile and support structure and a leveling foot installed atop the top arm.

FIG. 52 shows the step of placing leveling foot 110 onto upper arm 4630. Though PV module 100*a* is not shown here for clarity, leveling foot 110 may typically be connected to module 100*a* first and then the assembly of module 100*a* and leveling foot 110 may be lowered down such that leveling foot 110 rests within extensions 4679*a*, 4679*b* (as shown in more detail in FIG. 48). Extensions 4679*a*, 4679*b* may temporarily hold or retain leveling foot 110 until leveling foot 10 is further secured via nut portion 4678.

Upper and lower arms may be manufactured from ductile iron casting, though other methods such as aluminum, steel, other metals, plastics, composites and the like formed by casting, extruding, molding, machining, and the like may be suitable.

FIGS. 53-56 describe an embodiment of a shingle flashing mount suitable for use when mounting PV module arrays to shingle roofs.

Figure 53:
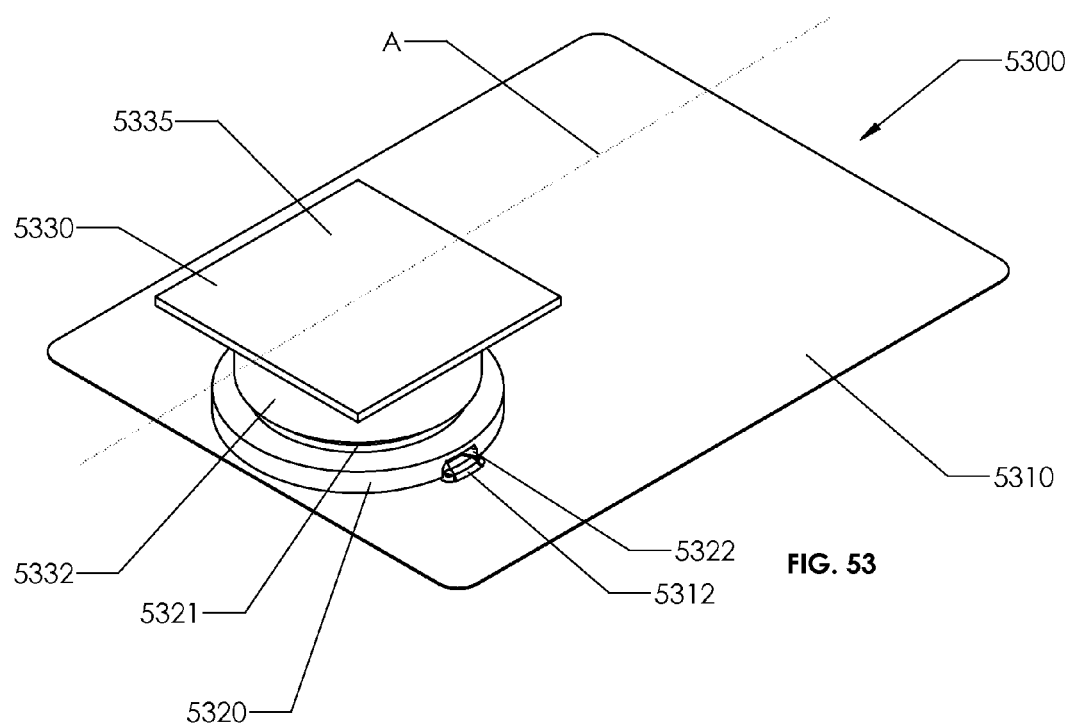
FIG. 53 is an isometric view of a flashing mount.

FIG. 53 shows a perspective view of a shingle flashing mount, such as shingle flashing mount 5300. Shingle flashing mount 5300 may comprise a substantially thin, flat plate for interleaving with shingles, such as flashing 5310; a cylindrical (or other cross-sectionally shaped elongated member), externally threaded block or base, such as base 5320; and an internally threaded upper portion for threading onto base 5320 and supporting a PV module, such as pedestal 5330.

Figure 54:
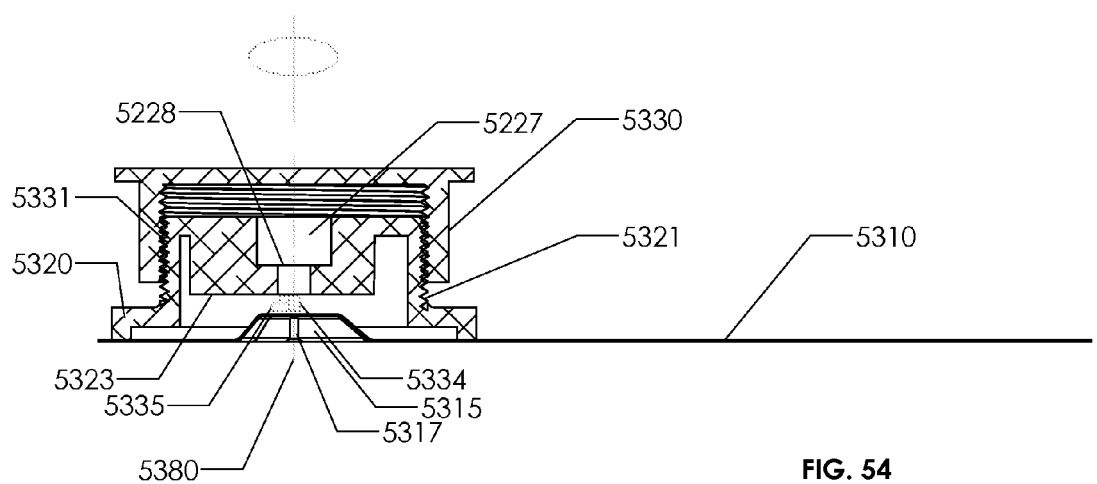
FIG. 54 is a cross section orthogonal view of a bisected flashing mount.

Expanding the discussion to include FIG. 54, which provides a section view along line A-A, further details of flashing mount 5300 are disclosed. Flashing 5310 may comprise raised platform 5315 comprising hole 5317 centered on centerline 5380 and raised anti-rotation bumps 5312.

Base 5320 may comprise anti-rotation notches 5322 for aligning with bumps 5312 in order to prevent rotation of base 5320 relative to flashing 5310 during installation, as will be described below. Base 5320 may further comprise a centered hole 5228 and counter-bore 5227 for receiving a lag screw (not shown) and a rubber seal 5334 positioned at least partially within hole 5228 and comprising a lower portion 5335 for sealing engagement between a lower surface 5323 of base 5320 and platform 5315 when base 5320 is tightened down against flashing 5310, as via a lag screw through base 5320 and into a support structure below. The outside of base 5320 may comprise threads 5321 for receiving and/or connecting to pedestal 5330 in a height adjustable manner.

Pedestal 5330 may comprise a lower portion 5332 comprising internal threads 5331 for threading onto base 5320. Pedestal 5330 may further comprise a substantially flat platform 5335 that at least partially cantilevers beyond lower portion 5332 and may be adapted to support a PV module, such as PV module 1000.

Figure 55:
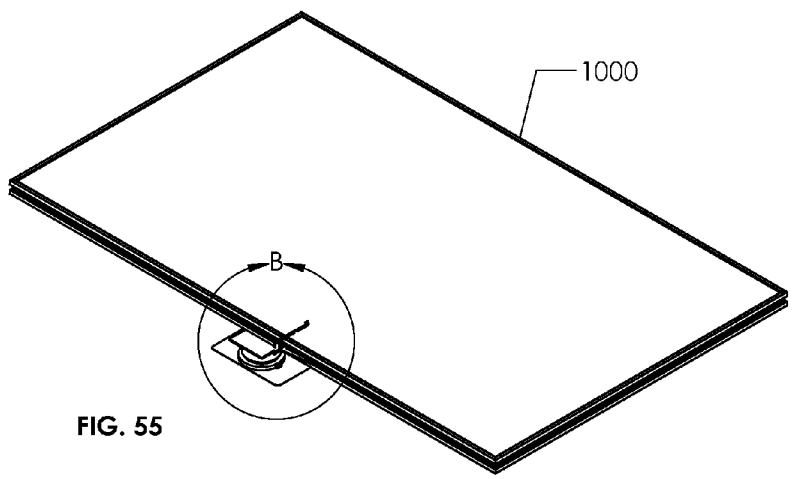
FIG. 55 is an isometric view of a PV module connecting to a flashing mount.
Figure 56:
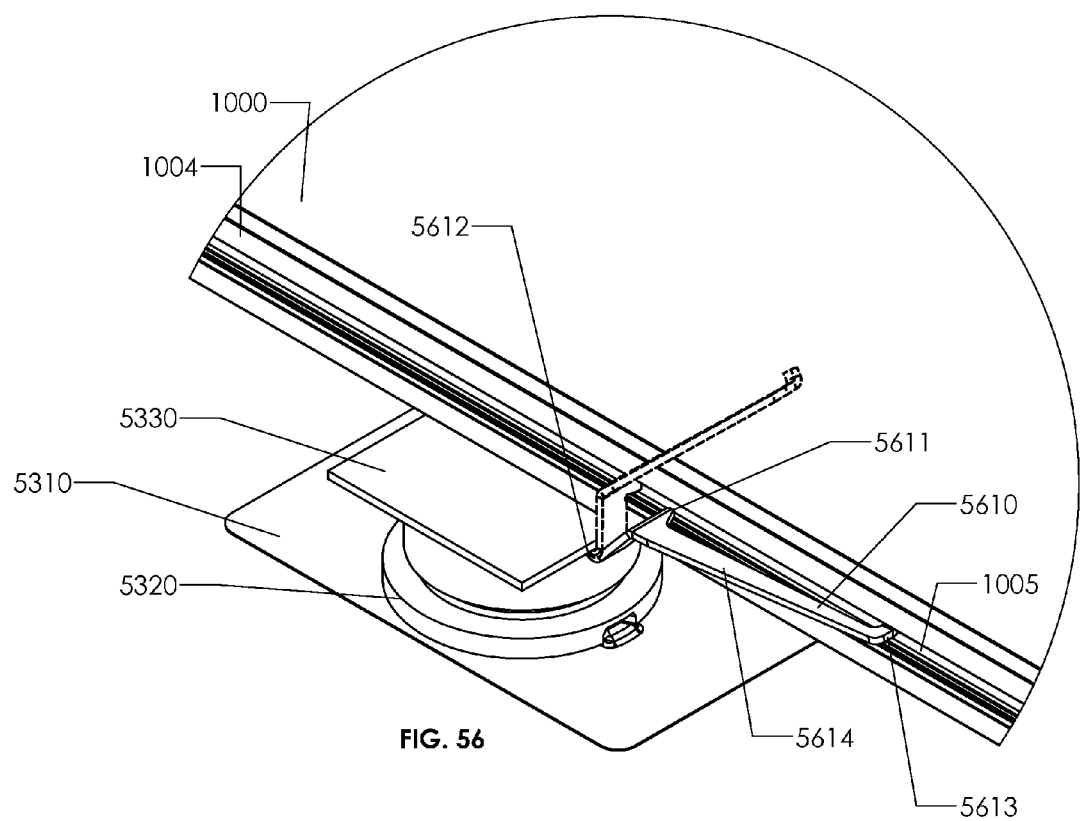
FIG. 56 is an enlargement of section B of FIG. 55.

FIGS. 55-56 show a perspective view of shingle flashing mount 5300 connected to a PV module, such as PV module 1000. The steps to mount PV module 1000 with shingle flashing mount 5300 may be as follows. The installer first may determine where the ultimate point of structural connection (such as a rafter) is located, then positions flashing 5300 partially underneath such shingle, or shingles, such that hole 5317 approximately aligns with the rafter and an edge of PV module 1000 to be supported by flashing 5300. A hole, down through rafter directly underneath hole 5317, may be optionally drilled at this time if the structure below requires a pre-drilled hole. Next base 5320 is placed on top of flashing, so that hole 5228 approximately aligns with hole 5317 and anti-rotation notches 5322 approximately align with bumps 5312. A lag screw (not shown) may then be screwed through base 5320 and flashing 5310, and into the structure below. Next pedestal 5330 may be threaded onto base 5320 until a desired height for PV module 1000 is reached. Pedestal 5330 may be maintained or left in a rotational position that results in at least one side of platform 5335 running approximately perpendicular to the engaging side of PV module 1000. The previous step may not be required if limited adjustability in the direction normal to module 1000 frame is permitted. With platform 5335 rotated to the desired height, the next step is to place PV module 1000 on top of or above platform 5335, as shown in FIGS. 55-56, such that an edge of PV module 1000 falls somewhere onto or above platform 5335. The final mounting step may be to secure PV module 1000 to a cantilevered edge of platform 5335 with a clamping device, such as clip 5610, as will be described in more detail below.

Clip 5610 may be a bracket, spring clip, "dream clip", lock, spring arm device, spring bracket, pivot-lock clip, lever clamp, lever clip, and/or similar to other clips disclosed and shown in U.S. Provisional Patent Applications: 61/656,240 entitled "Rail Mounted PV Apparatus, Method and System" filed approximately Jun. 6, 2012 and 61/698,292 entitled "Module Attachment System and Module Support System", each of which is incorporated by reference herein in its entirety. Clip 5610 may be installed and/or operate as follows. First, clip 5610 may be oriented approximately as shown in dashed lines in FIG. 56, then clip 5610 may be moved toward PV module 1000, inserting upper lip 5611 into groove 1005 while lower lip 5612 is positioned underneath a cantilevered portion of platform 5335. In some embodiments PV module 1000 does not comprise a side groove 1005, so upper lip 5611 may be located or moved into a position just above the top surface of frame member 1004 in this step. Once clip 5610 is located in the position shown by dashed lines, clip 5610 may be then rotated in the direction of the arrow until tab 5613 aligns with an opening of groove 1005 or is located just below frame 1004. However, before reaching this position, it should be noted that lip 5611 may begin to engage with frame 1004 and lip 5612 may begin to engage with underside of platform 5335, thereby resulting in a bending of spring arm 5614 as rotation continues. Once tab 5613 is low enough, it may be pushed or otherwise located in the direction towards frame 1004 until tab 5613 is located at least partially in groove 1005 or at least partially under frame 1004, then clip 5610 may be released. The action of releasing clip 5610 may result in tab 5613 exerting a spring force in a direction approximately opposite the arrow and effectively resulting in clip 5610 resting in a stabilized state due to being engaged with frame 1004. In some embodiments lips 5611 and 5612 may be cut into frame 1004 and platform 5335 respectively, thereby creating a ground bond connection between frame 1004 and platform 5335.

In other embodiments a shingle flashing mount is not height-adjustable and therefore integrates the cantilevered platform portion into base 5320, eliminating platform 5330 as a separate piece. In still other embodiments additional slots, channels, grooves, or the like are added to platform 5335 to enhance the engagement of clip 5610.

Figure 57:
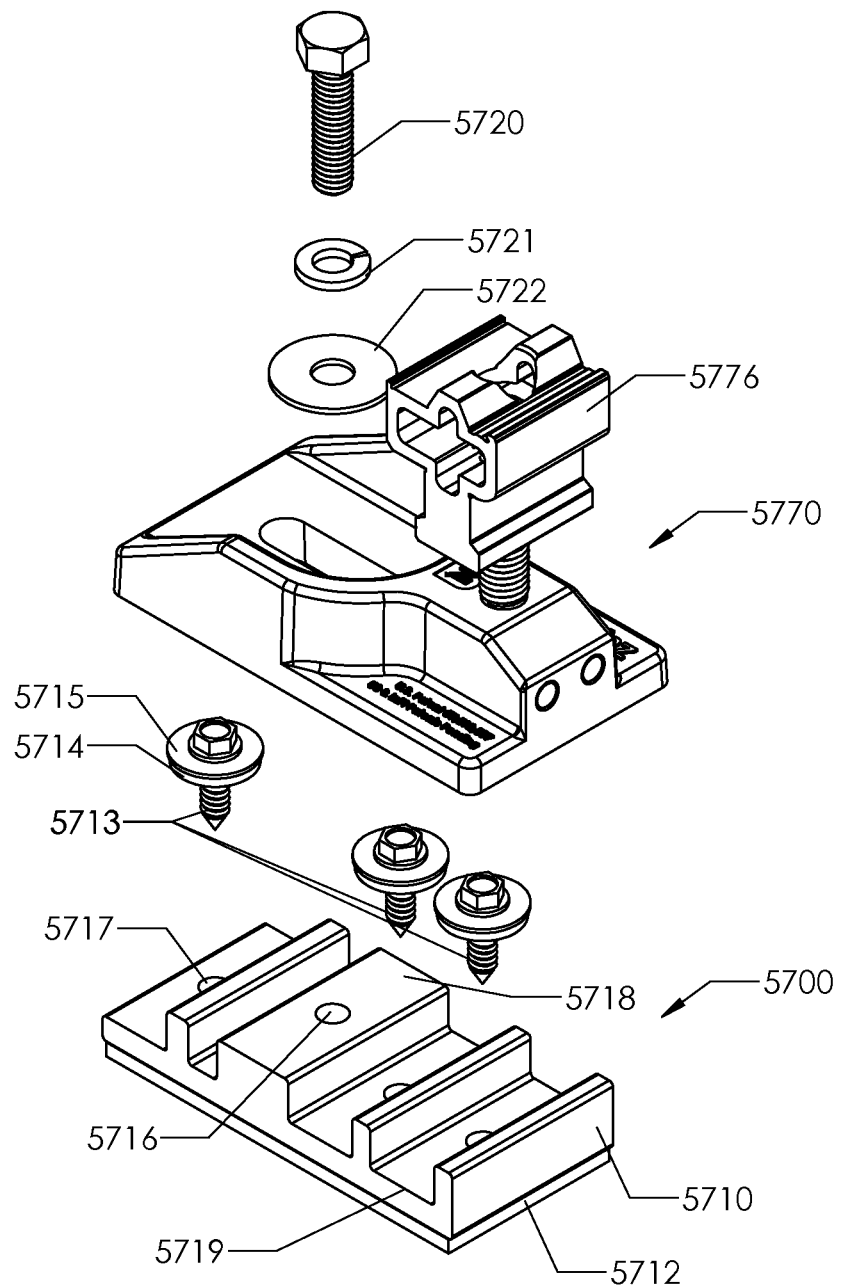
FIG. 57 is an exploded view of a leveling foot and a coupling for a trapezoidal roof.
Figure 58:
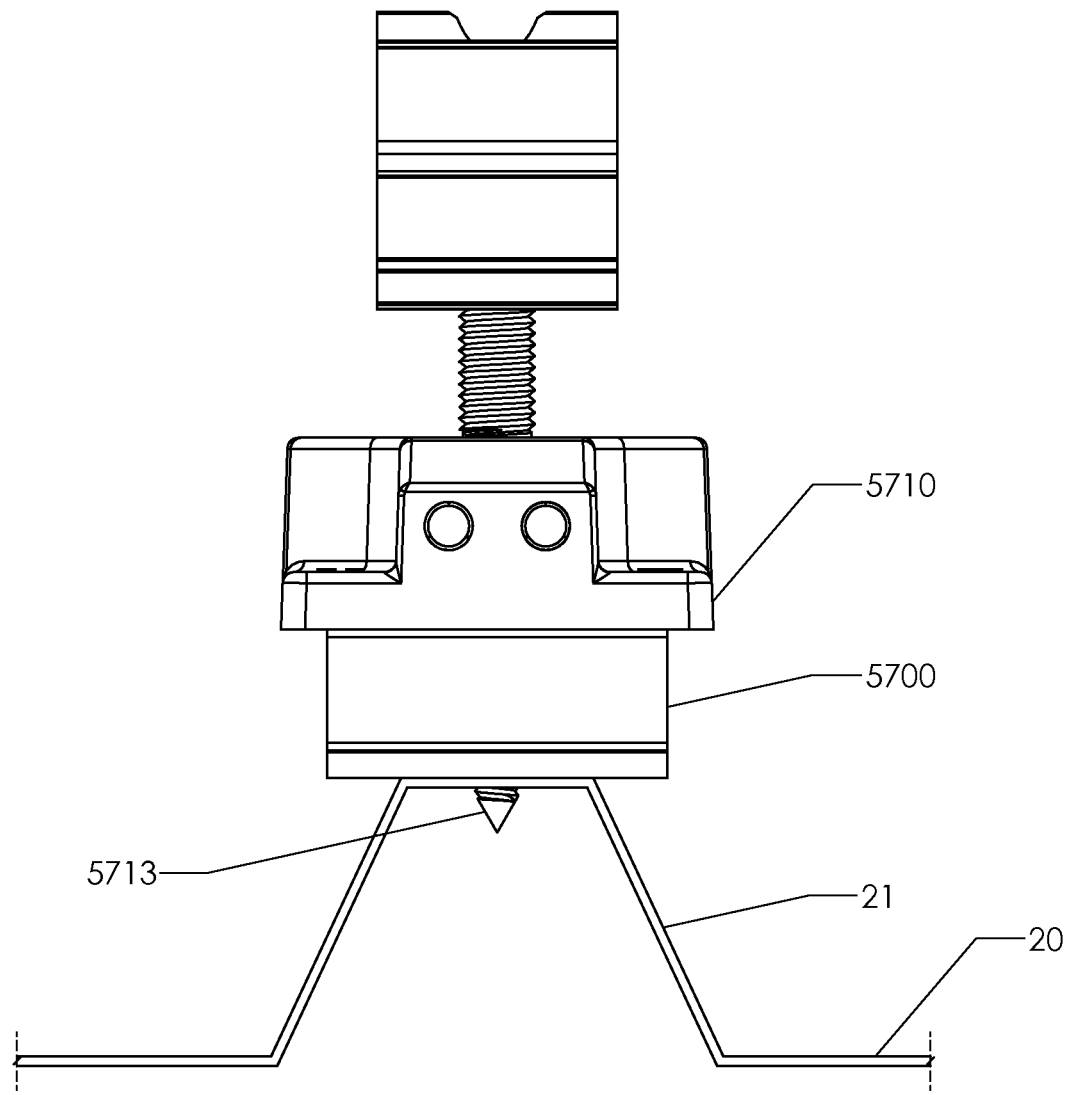
FIG. 58 is a rear orthogonal view of a leveling foot connected to a trapezoidal roof using a coupling.
Figure 59:
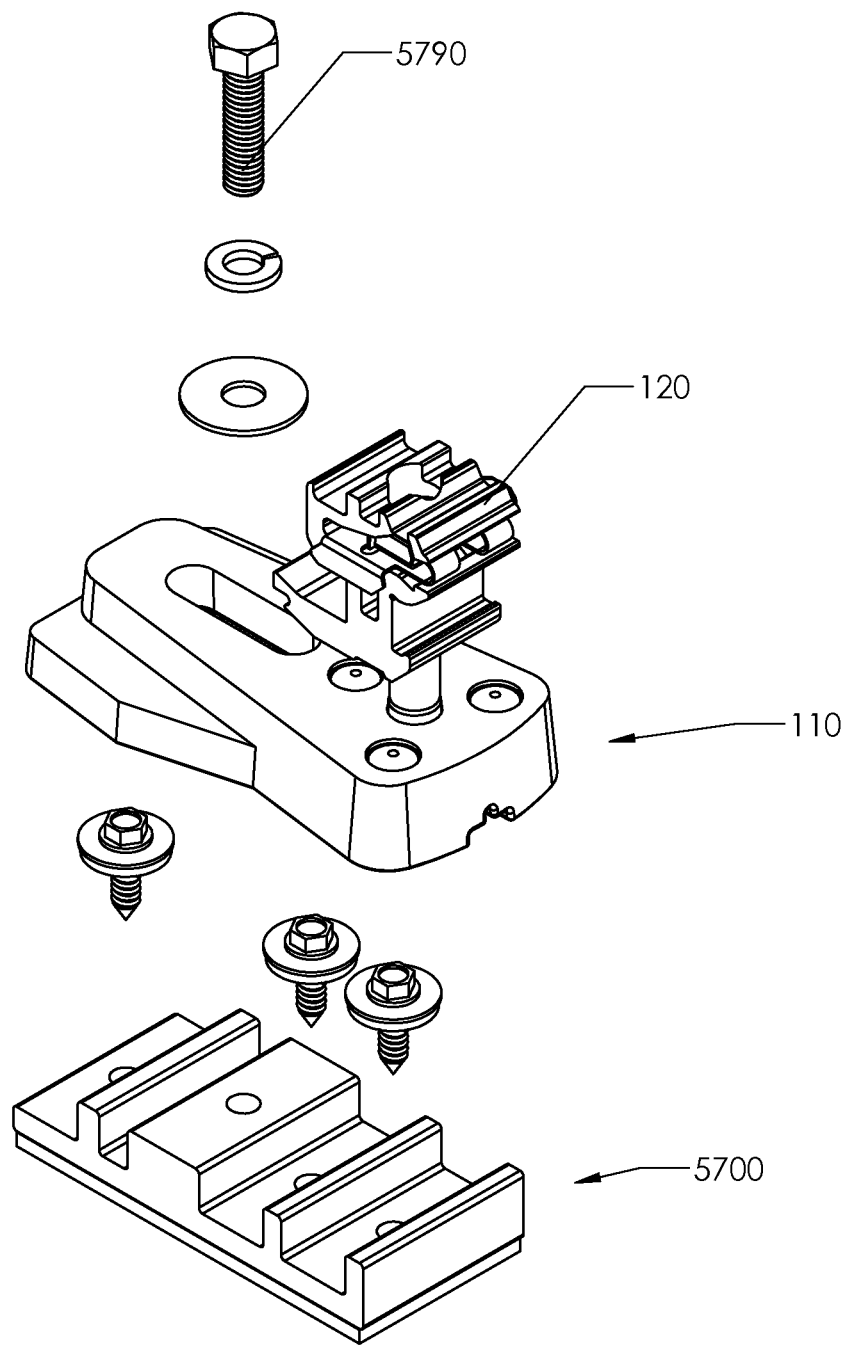
FIG. 59 is an exploded view of a leveling foot and a coupling for a trapezoidal roof.

FIGS. 57-59 disclose an embodiment of metal roof mount 5700. Metal roof mount 5700 may comprise a base 5710 and a sealing layer 5712. A top surface 5718 of base 5710 may comprise a series of channels 5719 for recessing the heads of sheet metal screws 5713 which may be inserted through holes 5717 located within channels 5719. Top surface 5718 may comprise a threaded hole 5716 for receiving a bolt, such as bolt 5720 that may be used to attach a leveling foot 5770 to base 5710. Sheet metal screws 5713 may be screwed through holes 5717 and into a raised portion 21 of a sheet metal roof, such as trapezoidal metal roof 20. Sealing layer 5712 may at partially prevent water ingress through holes created in metal roof 20 for sheet metal screws 5713.

An installation sequence for metal roof mount 5700 may go as follows. First, metal roof mount 5700 is screwed to metal roof 20 via screws 5713 in locations that approximately line up with where the edges of PV modules will be, taking care to install screws 5713 on raised portions. Next, as PV modules are being installed, leveling feet 5770 are attached to PV modules via couplings 5776, and then connected to base 5710 via bolts 5720 threading into holes 5716. Bolts may further comprise lock washers 5721 and washers 5722. An advantage of metal roof mount 5700 may be that such enables installation of PV modules onto trapezoidal metal roofs without requiring the use of rails.

FIG. 59 discloses a metal roof mount 5700 being used with leveling foot 110 as discussed above.

FIGS. 60-64 show an embodiment of a tile flashing mount 6000 that is similar to tile flashing mount 4600, as shown in FIGS. 46-52, except there are some minor changes in order to allow upper arm to receive a bracket, spring clip, clamp, "dream clip", lock, spring arm device, spring bracket, pivot-lock clip, lever clamp, lever clip, or clip similar to clip 5610, such as clip 6098. Changes to upper arm 4630, shown in the instant embodiment as upper arm 6030, may include: flipping upper arm 4630 over so that the vertical walls project downward instead of upward, positioning nut 4613b, shown here as nut 6013b, underneath upper arm 4630 instead of on top of it, and providing a number of holes 6031, 6032 along extensions 6079a, 6079b for receiving clip 6098.

Figure 60:
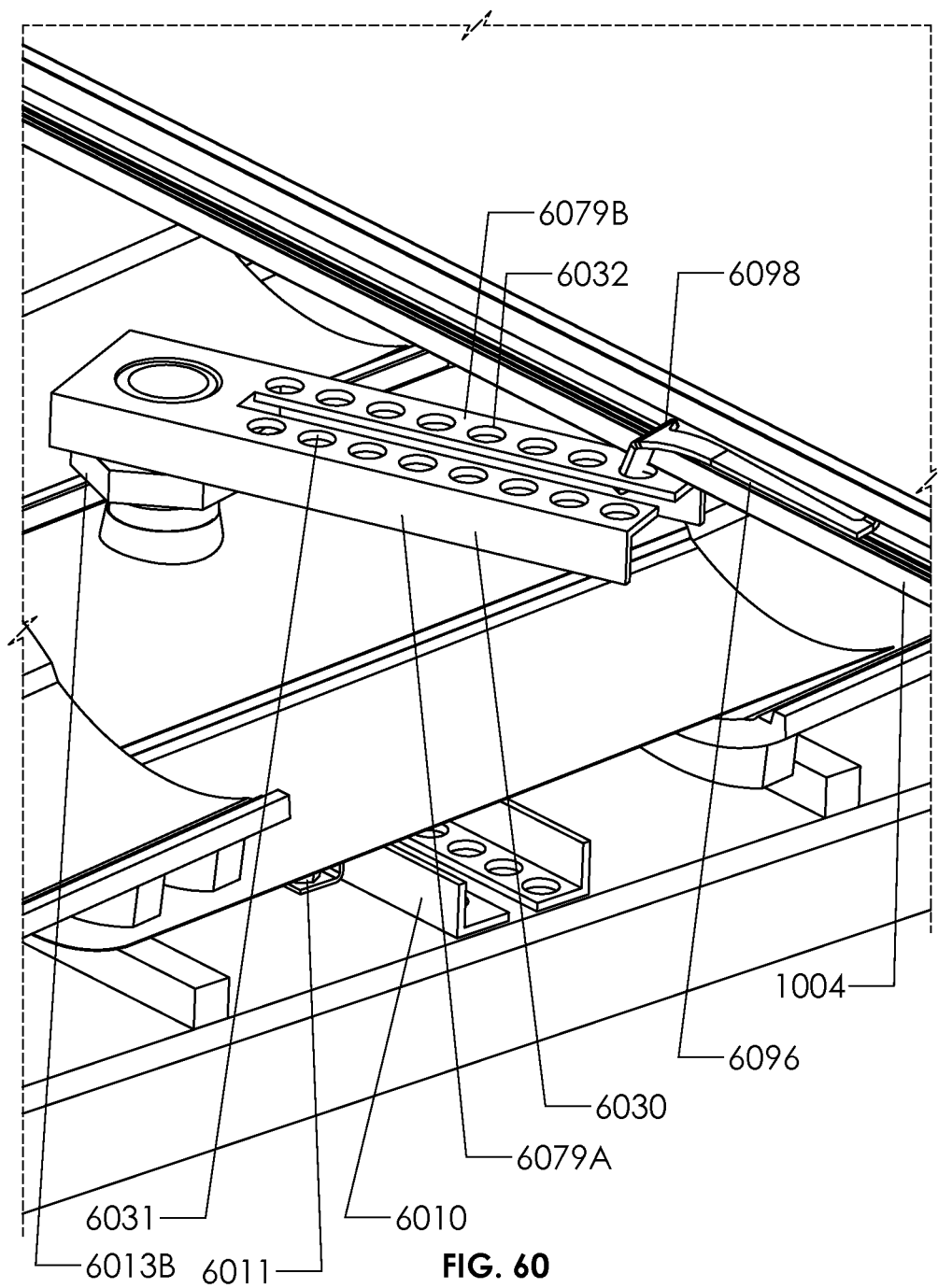
FIG. 60 is an isometric view of a PV module connecting to a top arm using a dream clip.
Figure 61:
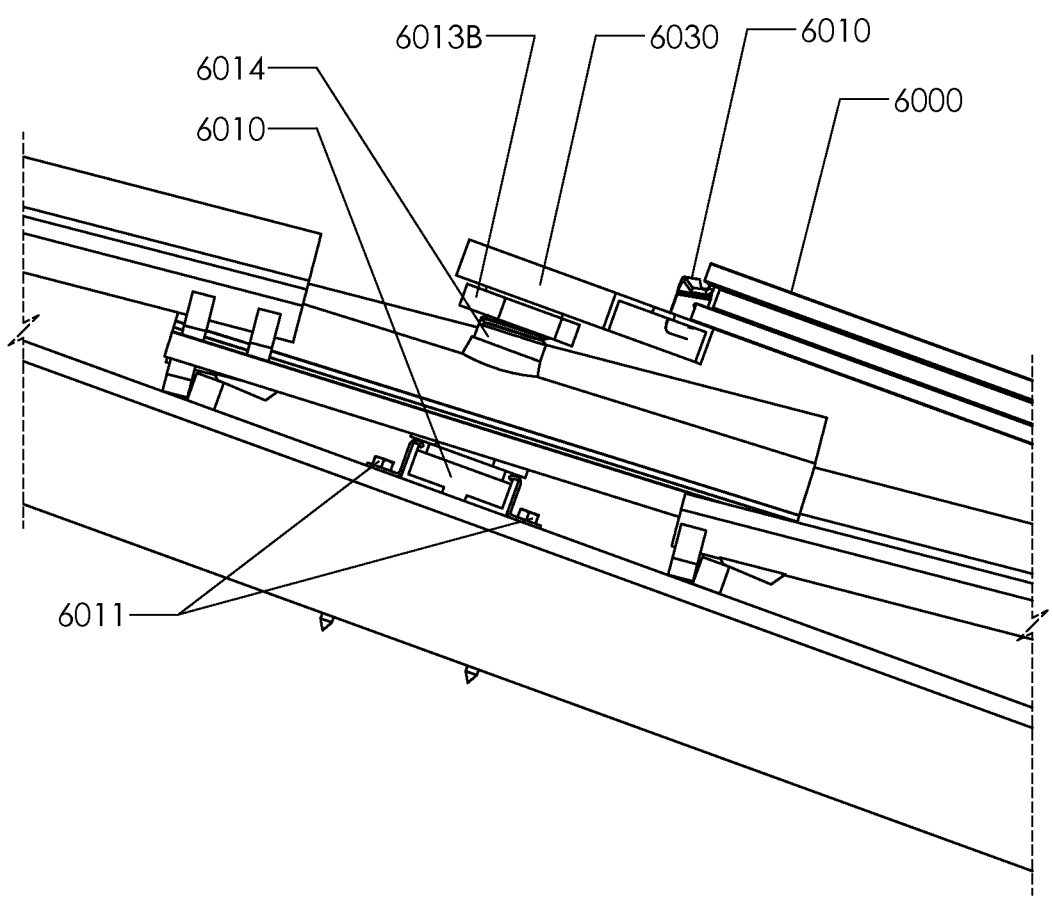
FIG. 61 is an orthogonal view of FIG. 60.

FIG. 60 provides a perspective view of tile flashing mount 6000 installed on tile roof 10 and connected to PV module 1000 via clip 6098. FIG. 61 shows a side view of the same installation shown in FIG. 60. Clip 6098 operates in a similar manner to clip 5610 and thus it may act by clamping PV module frame 1004 to another surface located beneath module frame 1004. And since this clamping action requires clip 6098 to apply a force to the underside of the surface beneath frame 1004, the flipping over of upper arm, as discussed above, enables a reasonably flat surface, upward facing surface of extensions 6079a, 6079b, to be positioned beneath an edge of frame 1004 for engagement with clip 6098. The provision of holes 6031, 6032 allows for easy insertion of clip 6098 in different places along extensions 6079a, 6079b since the edge of frame 1004 may cross upper arm 6030 in different places depending on where module 1000 is located relative to pipe 6014.

Clip 6098, as shown in FIG. 60, operates in a very similar manner to the lever clip of our Application 61/698,292 (the "292 Application"). See clip 302 in FIG. 5 of the '292 application wherein a PV module frame and a relatively flat plate (in the location of the lever clip) are clamped by an upper catch engaging the frame and a lower portion engaging beneath the plate (a corner support 302 or wind diffusor 303 in the '292 Application) by a rotating action of the lever clip and then a locking of the clip to the frame via a catch near the end of a bending spring arm. Clip 6098 is shown in FIG. 60 fully installed and the bending of spring arm 6096 is viewable here.

Figure 62:
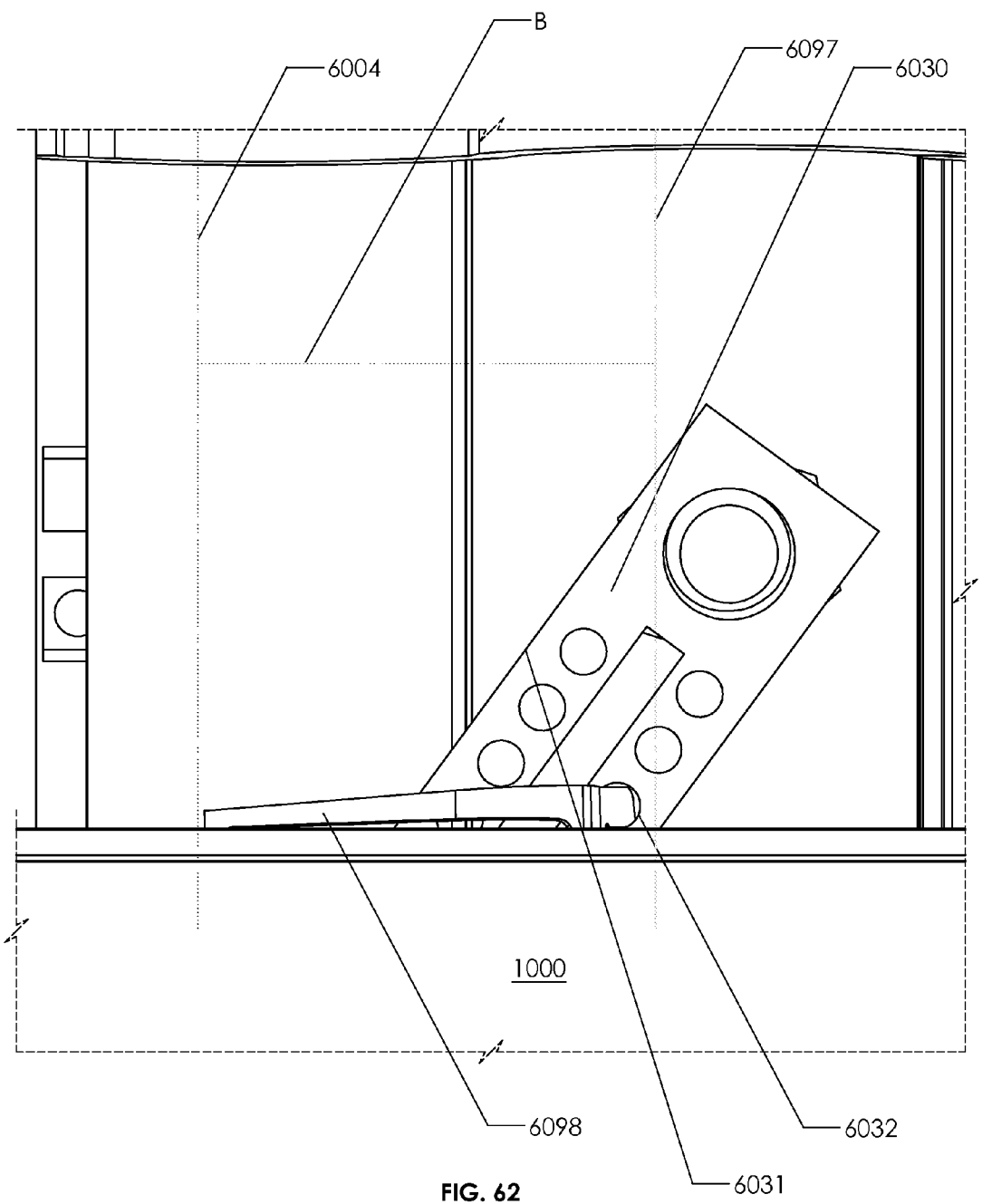
FIG. 62 is a top view of FIG. 60.
Figure 63:
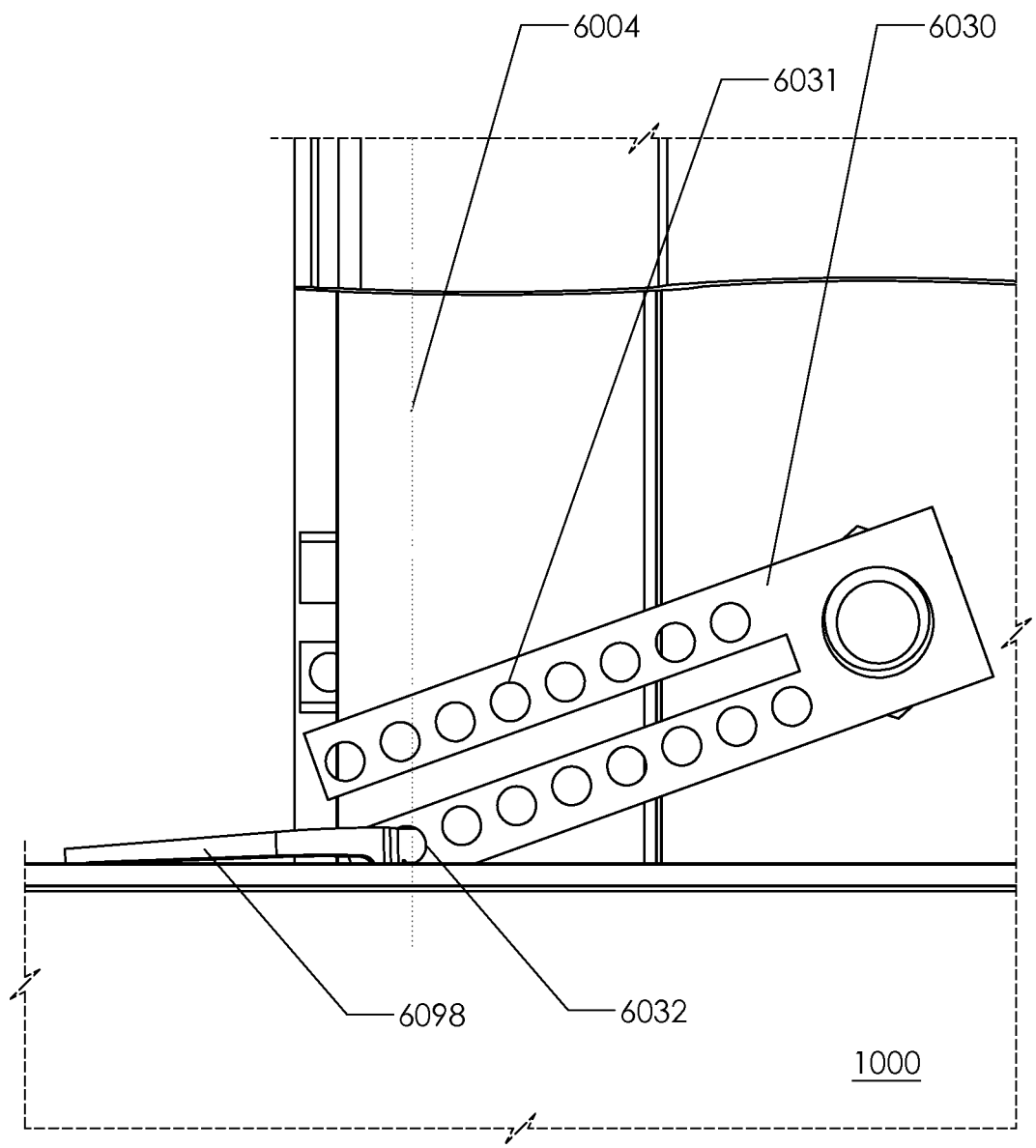
FIG. 63 is a top view of FIG. 60.
Figure 64:
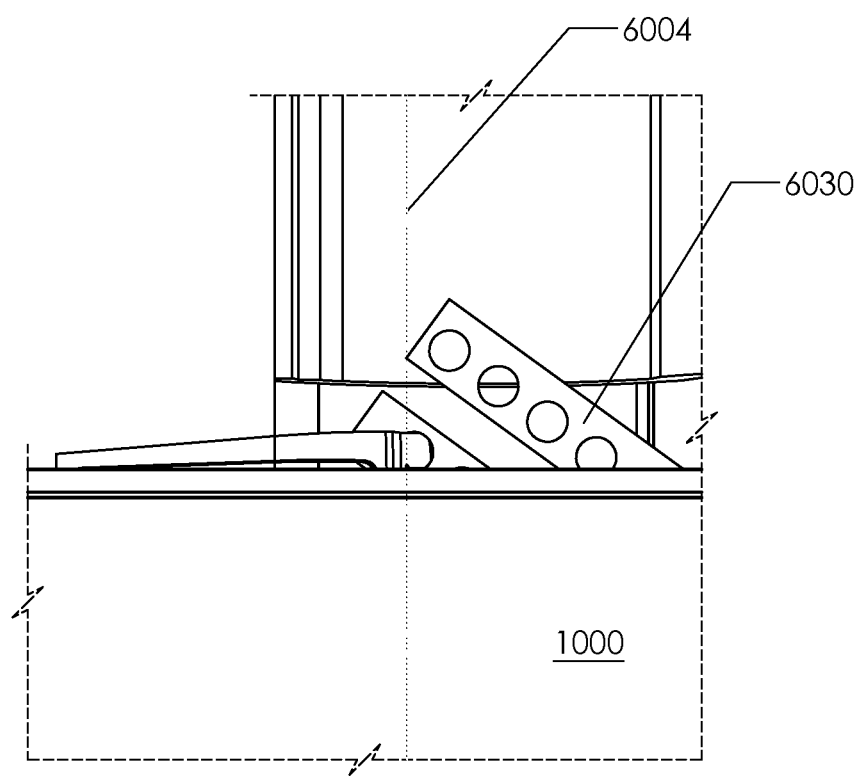
FIG. 64 is a top view of FIG. 60.

FIGS. 62-64 show top views perpendicular to a plane of roof 10 depicting various installation configurations for tile flashing mount 6000. FIGS. 62-64 show roof 10 as in previous figures, except that the position of rafter 6004 (indicated by dashed line) beneath sheathing 205 is in a different location than rafter 204. As discussed above, it may be desired to reduce a prying moment on lag screws that are installed into rafter 6004 (not visible in these two figures since they are beneath tiles 201). FIGS. 62-63 demonstrate how a reduction in prying moment may be accomplished. In both FIGS. 62 and 63, PV module 1000, lower arm 6010, and pipe 6014 are in approximately the same location. However, in FIG. 62 upper arm is positioned such that extensions 6079a, 6079b are extending in a direction that is more down-roof than in FIG. 63 and clip 6098 is connected to module 1000 in different locations relative to the x-axis. More specifically, clip 6098 in FIG. 62 connects PV module 1000 to upper arm 6030 at approximately line 6097. Whereas, in FIG. 63 clip 6098 connects PV module 1000 to upper arm 6030 at approximately line 6004 which is approximately directly over the lag screws 6011 (not visible in FIG. 63, but connecting lower arm 6010 to rafter 6004 beneath tile 201 at line 6004). It is therefore clear in FIG. 62 that a moment about the y-axis that may result from an upward force on module 1000 (which translates into an upward force on clip 6098 at line 6097) may be described as the distance B since the x-axis position of lag screw 6011 may act as the center of rotation about the y-axis. The moment B may be described as a prying moment since upward forces acting on this moment may result in a prying action on lag screw 6011 that effectively pulls upward on screw 6011 when upward loads are applied to PV module 1000. In FIG. 63 the same upward force on module 1000 would result in a moment about the y-axis of approximately zero since the force is being applied substantially directly above the center of rotation about the y-axis. It is therefore clear that rotation of upper arm 6030 from the position shown in FIG. 62 to the position shown in FIG. 63, and a corresponding repositioning of clip 6098, may result in the reduction of at least one moment acting on lag screw 6011. One skilled in the art will recognize that other embodiments described herein may reduce prying moments in a similar manner.

Holes 6031, 6032 may be laid out in different locations on extensions 6079a, 6079b. For example, the configuration shown in FIGS. 60-64 has holes 6031 offset from holes 6032 along the length of extensions 6079a, 6079b. This layout may allow clip 6098 to be located closer to rafter 6004 in certain conditions. For example, the exact x-axis position of clip 6098 along frame 1004 is determined by where the hole selected for connection intersects with the edge of frame 1004; and in the hole layout shown the x-axis position of clip 6098 will be different if a specific hole 6031 is chosen instead of the nearest hole 6032. This difference along the x-axis results in more possible positions and thus the opportunity to connect clip 6098 closer to a desired location above a rafter than if less choices were available. In other embodiments other hole layouts are provided.

FIG. 64 shows a similar configuration to that of FIG. 63 except module 1000 has been moved up-roof to a location above, and covering, pipe 6014. Upper arm 6030 has been rotated counterclockwise from the position shown in FIG. 63, demonstrating that even with a new position of module 1000, upper arm 6030 may be positioned such that clip 6098 is connectable to frame 1004 approximately above rafter 6004.

FIG. 64 also demonstrates how tile flashing mount 6000, as well as tile flashing mounts 200, 2000, 2100, 3300, 4000, and 4600, provides the ability to connect to an edge of a PV module substantially anywhere that it may fall along the y-axis of a tile roof without requiring the use of rails that span between connection points, as is common in the art. In practice, an installer may first determine, for a given installation, where the edge of each PV module will be relative to the roof. The installer may then choose to remove specific tiles from the roof that fall beneath the module edges, and then replace the removed tiles with tile flashing mounts according to the instant disclosure. With all tile flashing mounts installed, the installer may then connect PV modules to the tile flashing mounts via leveling feet, clips, brackets, etc., as described herein; again without running expensive rails between tile flashing mounts.

Figure 65:
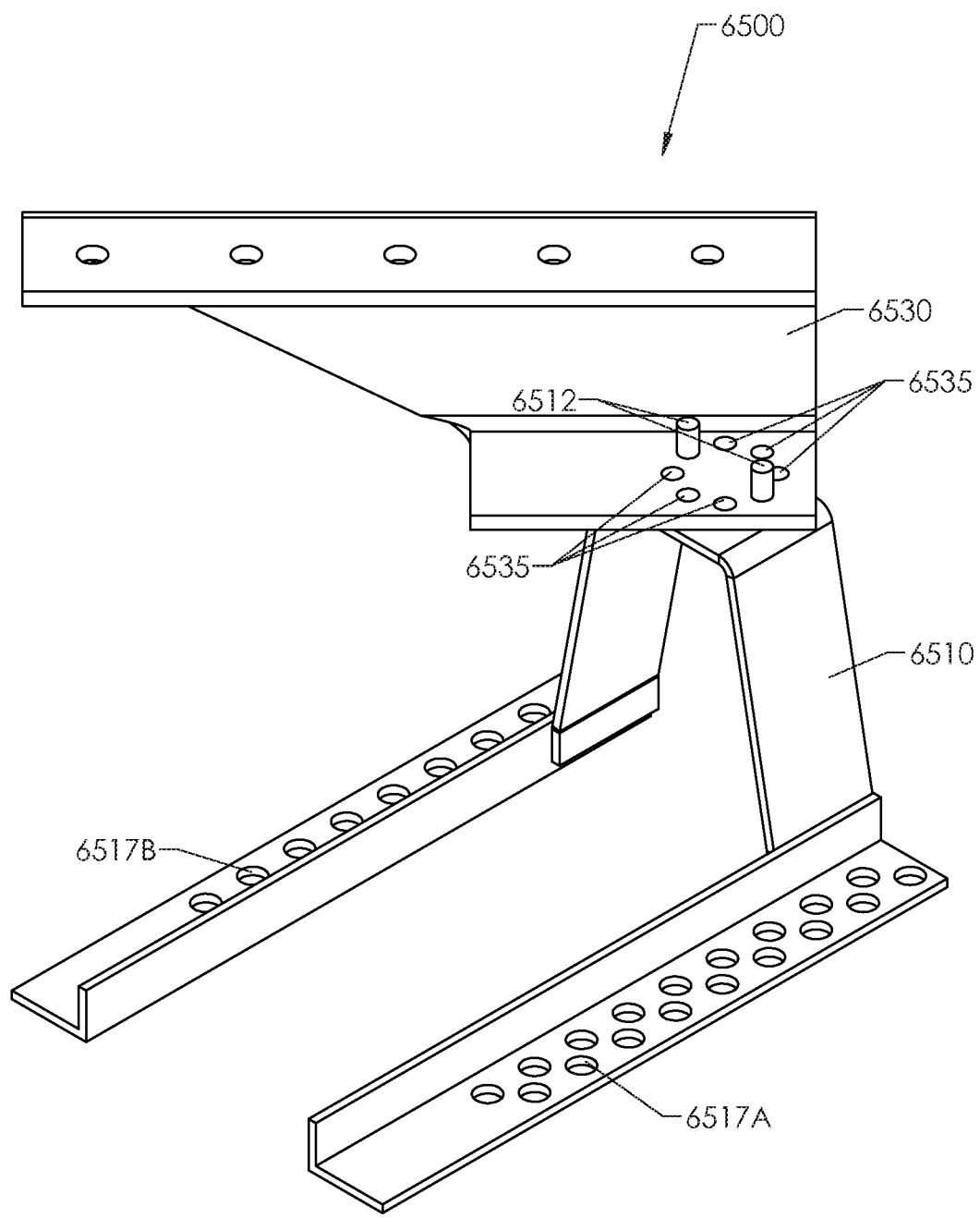
FIG. 65 is an isometric view of a support structure with a top arm.

FIG. 65 shows an embodiment of a tile flashing mount 6500 that is similar to tile flashing mount 200, as described in FIGS. 9-16, except that the upper pedestal may be rotated relative to the base to provide better x-axis flexibility and in some cases to allow a lower cost means to enable the reduction of a prying moment on lag screws as discussed above. Upper pedestal 6530 is shown with multiple holes 6535 for receiving bolts 6512 that may secure upper pedestal to base via nuts or the like (nuts not shown). A flashing, similar to flashing 220, that would be placed between upper pedestal 6530 and base 6510 is not shown in FIG. 65. Holes 6535 allow upper pedestal to be secured to base 6510 in a multiple discrete rotational locations. Base 6510 may comprise holes 6517a, 6517b for securing base 6510 to a support structure, such as the rafter of a building, as discussed above.

Some benefits of tile flashing mounts 200, 2000, 2100, 3300, 4000, 4600, and 6000 may include:

Enables simple method for rail-free mounting on tile roofs, which is difficult in prior art systems since they do not typically provide enough connection flexibility along the y-axis;

Enables easy method(s) and structure(s) to resolve conflicts between interlocks and leveling feet for space in groove 105a;

Reduces or eliminates the need to grind tile(s) during a solar module installation on a tile roof (a common practice when utilizing prior art technology) by simply removing and replacing an entire tile, leaving the surrounding tiles unaltered; and/or Enables improved water-proofing or fluid-resistance for the roof compared to prior art technology, such as tile hooks, since tile hooks require tile grinding which compromises the water-proofing or fluid-resistance characteristics of the tile.

Figure 66:
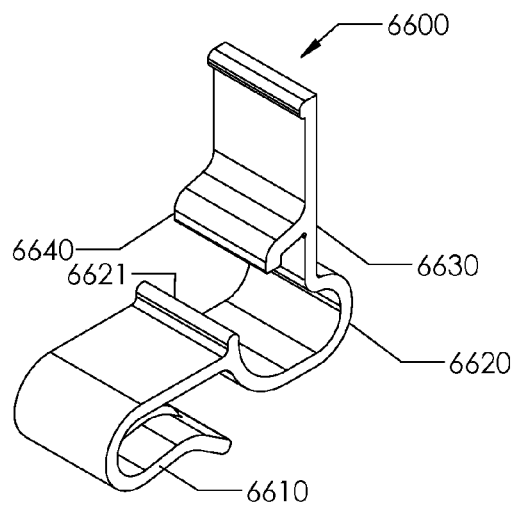
FIGS. 66-68 are views of a wire clip.
Figure 67:
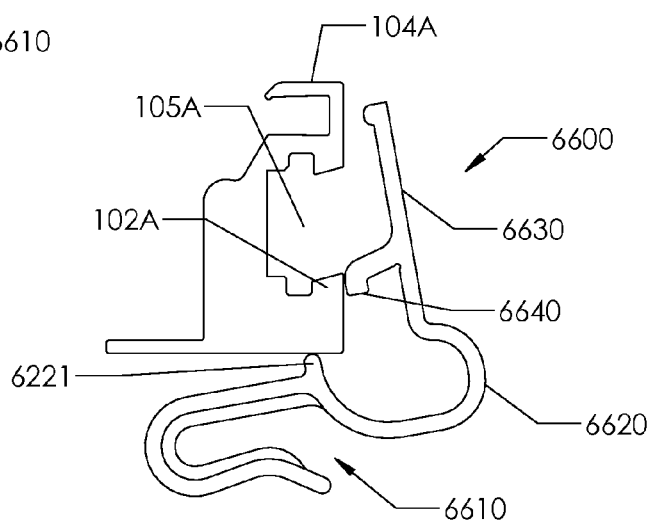
Figure 68:
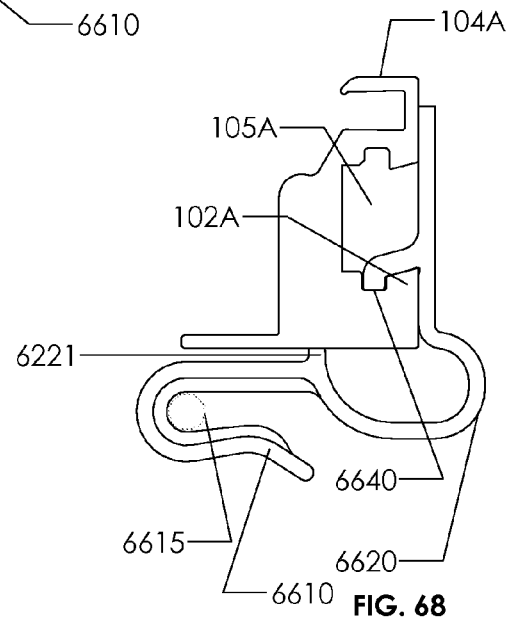

FIGS. 66-68 show an embodiment of a wire retaining, restraining, routing or management device, such as wire clip 6600. Wire clip 6600 may be connected to a PV module frame, such as frame 104a as discussed above. FIG. 66 shows a perspective view of wire clip 6600 and FIGS. 67-68 show section views as wire clip 6600 is being connected to frame 104*a*. Wire clip 6600 may comprise a wire retaining portion 6610, a spring portion 6620, a riser portion 6630, and a tooth 6640 and may be manufactured from any suitable material such as metal or plastic.

Wire clip 6600 is installed as follows. Wire clip 6600 is first placed in the position shown is FIG. 67, with tooth 6640 resting against an outside face of frame 104*a* below groove 105*a* and bump 6621, which may define a beginning to spring portion 6620, touching a bottom surface of frame 104*a*. Wire clip 6600 is then pushed or pressed approximately in the direction of the arrow shown in FIG. 67, which then results in spring portion bending open approximately in the direction of the arrow shown in FIG. 68. The pressing force may be released when spring portion 6620 has opened up enough to allow tooth 6640 to enter groove 105*a* and then drop behind a lip 102*a* of groove 105*a*. Wire clip 6600 is now held by the clamping action of spring portion 6620 which has been bent open and now applies a spring force approximately opposite the direction of the arrow in FIG. 68. Riser portion 6630 may optionally contact frame 104*a* above or within groove 105*a* to further stabilize wire clip 6600 once installed. With wire clip connected to frame 104*a*, a wire, cable, ground wire, or the like, such as wire 6615, may be placed into wire retaining portion 6610. Wire retaining portion 6610 may comprise a press-fit mechanism for holding wires or it may loosely hold wires and it may comprise multiple-sized press-fit portions for accommodating different diameters of wires.

Figure 69:
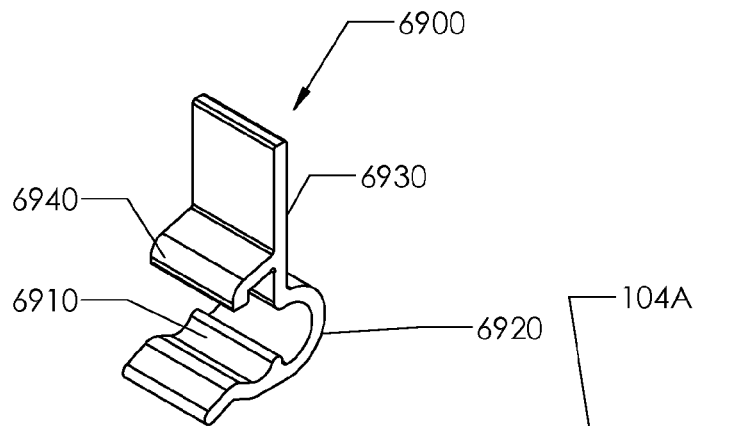
FIGS. 69-71 are views of a wire clip.
Figure 70:
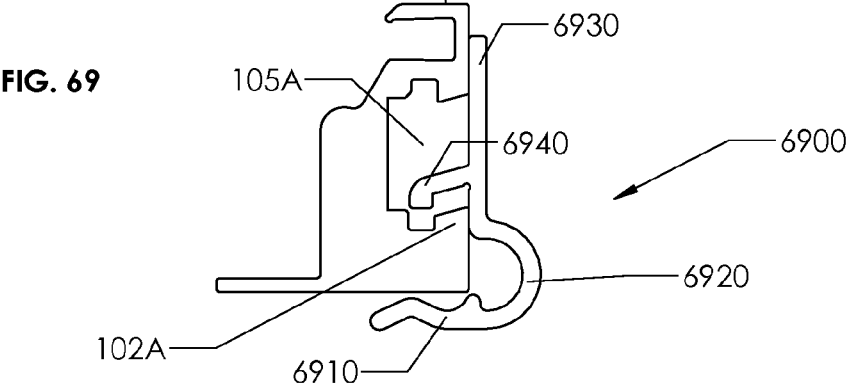
Figure 71:
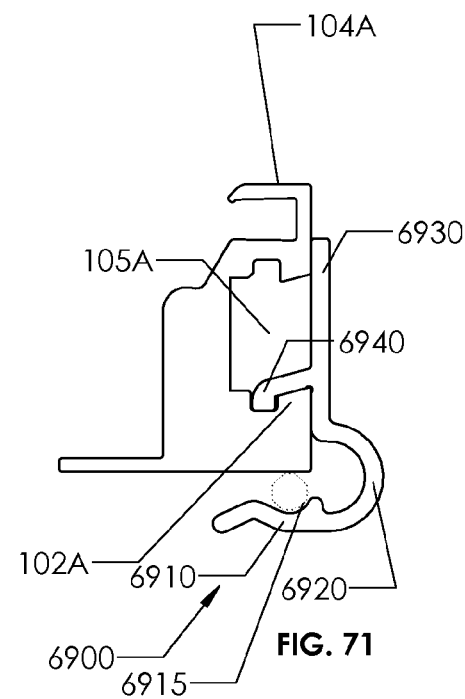

FIGS. 69-71 show an embodiment of a wire retaining, restraining, routing or management device, such as wire clip 6900. Wire clip 6900 may be connected to a PV module frame, such as frame 104*a*. FIG. 69 shows a perspective view of wire clip 6900 and FIGS. 70-71 show section views as wire clip 6900 is being connected to frame 104*a*. Wire clip 6900 may comprise a wire retaining portion 6910, a spring portion 6920, a riser portion 6930, and a tooth 6940 and may be manufactured from any suitable material such as metal or plastic.

Wire clip 6900 is installed as follows. Wire clip 6900 is first placed in the position shown is FIG. 70, with riser portion 6930 adjacent to an outside surface of frame 104*a* and tooth 6940 located at least partially inside groove 105*a* and at least partially behind lip 102*a*. A wire, cable, ground wire, or the like, such as wire 6915 is then pressed between wire retaining portion 6910 and a bottom surface of frame 105*a*, which results in wire clip dropping down to the position shown in FIG. 71 and spring portion bending open approximately in the direction of the arrow shown in FIG. 68. The pressing force may be released when spring portion 6920 has opened up enough to allow wire 6915 to fully seat in wire retaining portion 6910. In its final position tooth 6940 is captured behind lip 102*a*. Wire clip 6900 is now held by the clamping action of spring portion 6920 which has been bent open and now applies a spring force approximately opposite the direction of the arrow in FIG. 68. Riser portion 6930 may optionally contact frame 104*a* above or within groove 105*a* to further stabilize wire clip 6900 once installed.

Figure 72:
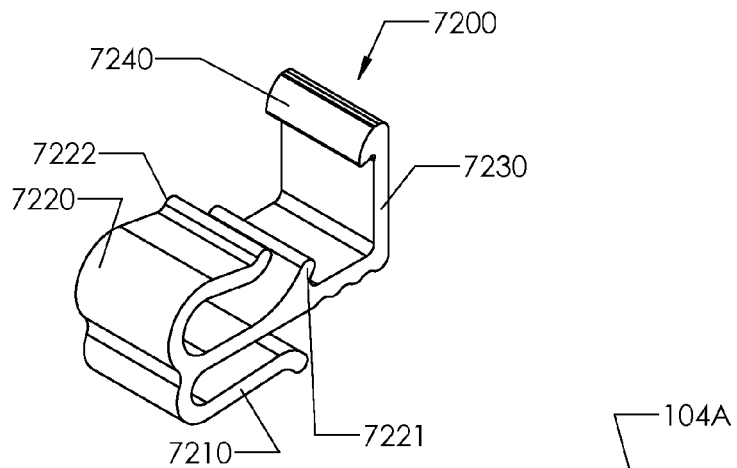
FIGS. 72-74 are views of a wire clip.
Figure 73:
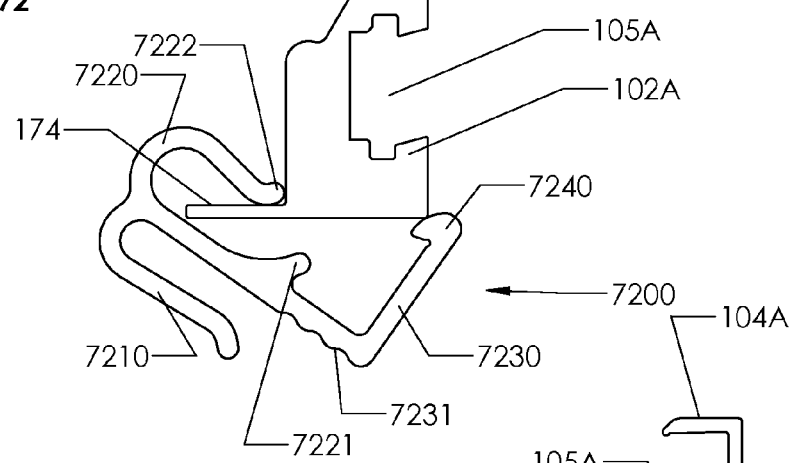
Figure 74:
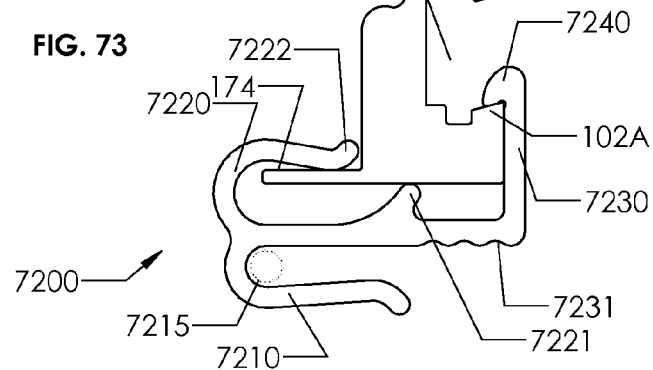

FIGS. 72-74 show an embodiment of a wire retaining, restraining, routing or management device, such as wire clip 7200. Wire clip 7200 may be connected to a PV module frame, such as frame 104*a* as discussed above. FIG. 72 shows a perspective view of wire clip 7200 and FIGS. 73-74 show section views as wire clip 7200 is being connected to frame 104*a*. Wire clip 7200 may comprise a wire retaining portion 7210, a spring portion 7220, a riser portion 7230, and a tooth 7240 and may be manufactured from any suitable material such as metal or plastic.

Wire clip 7200 is installed as follows. Wire clip 7200 is first placed in the position shown is FIG. 73, with tooth 7240 resting against an outside surface of frame 104*a* below groove 105*a* and bump 7222, which may define a beginning to spring portion 7220, touching a top surface of lower flange 174 of frame 104*a*. Wire clip 720 is then pushed or pressed at 7231 approximately in the direction of the arrow shown in FIG. 73, which then results riser portion 7230 bending approximately in the direction of the right arrow shown in FIG. 74. Once bump 7221 contacts frame 105*a*, spring portion 7220 bends open approximately in the direction of the left arrow shown in FIG. 74 to allow tooth 7240 to get high enough up to enter groove 105*a*. The pressing force may be released when spring portion 7220 has opened up enough to allow tooth 7240 to enter groove 105*a*. Wire clip 7200 is now held by the force delivered by spring portion 7220 which results in a downward force at tooth 7240, effectively pushing it down against lip 102*a*. With wire clip connected to frame 104*a*, a wire, cable, ground wire, or the like, such as wire 7215, may be placed into wire retaining portion 7210. Wire retaining portion 7210 may comprise a press-fit mechanism for holding wires or it may loosely hold wires and it may comprise multiple-sized press-fit portions for accommodating different diameters of wires.

Referring now to FIGS. 1-4, various views of a leveling foot are shown. A leveling foot such as leveling foot 110 may include, without limitation, a base 140 with a slot 143, a stud 130, and a coupling 120 with male portions such as a tongue side 122 and a key side 121 where the key side includes an upper jaw 187 and a lower jaw 188.

Referring now to FIG. 5, an isometric view of a grounding clip is shown. A grounding clip such as clip 124 may include teeth 196, edges 125, and edges 126. Grounding clip 124 may comprise a portion of leveling foot 110 and may engage coupling 120 by being pressed between upper jaw 187 and lower jaw 188 such that teeth 196 face upward and are closer to the tongue side 122 than the key side 121. Edges 125 and 126 may penetrate the exterior surface of the frame of a PV module when such a module is installed on the coupling 120, and teeth 196 may penetrate the exterior surface of the coupling 120, creating a grounding connection between all components.

Referring now to FIG. 6, a cross section of a leveling foot 110 and two PV modules 100A and 100B is shown with the key side 121 engaging the frame of PV module 100A. An exterior portion of the frame of PV module 100B rests atop coupling 120 of leveling foot 110.

Referring now to FIGS. 7 and 8, a cross section of a leveling foot 110 and two PV modules 100A and 100B is shown with the key side 121 engaging the frame of PV module 100A and two positions of PV module 100B indicating how PV module 100B engages coupling 120. FIG. 8 is an enlarged version of Area A of FIG. 7. Upon installation, key side 121 may compress as a spring under load, moving upper jaw 187 and lower jaw 188 closer to one another, and such compression may allow for tolerances. Simultaneously, the upper jaw 187 and lower jaw 188 may further pry open a groove integrated into a frame of a PV module 100B.

Referring now to FIG. 9, a flashing 220 is shown installed on a base 210 (also referred to as a support). Connected to base 210 is an upper pedestal 230 (also referred to as a top arm). A leveling foot 110 is connected to the upper pedestal 230. Base 210 may serve as a support structure and may include a vertical component and a horizontal component. Flashing 220 may include an upper surface and a lower surface and may feature a curvilinear shape that reflects the shapes of adjacent tiles.

Referring now to FIG. 10, a side view of the components of FIG. 9 is shown. Base 210 is shown affixed to rafter 204 using lag screws 211. In the instant embodiment, rubber seal 221 is placed between base 210 and flashing 220. Upper pedestal 230 is connected onto flashing 220 by passing fasteners 212 into base 210 and securing the connection with nuts 213. Leveling foot 110 is then connected to upper pedestal 230 by passing a fastener 212 (not shown) through a slot in the base of leveling foot 110 to engage upper pedestal 230.

Referring now to FIG. 10A, an isometric view of flashing 220 is shown. Flashing 220 may include overlapping portion 225 and side interleaving portion 226. Overlapping portion 225 and side interleaving portion 226 may be shaped to engage adjacent roof tiles such that flashing 220 engages adjacent roof tiles as though flashing 220 were a roof tile itself.

Referring now to FIG. 11, a roof such as roof 10 is shown with a missing tile 201.

Referring now to FIG. 12, base 210 with holes 218 is placed on roof 10.

Referring now to FIG. 13, flashing 220 is placed atop base 210 such that a pair of holes 223 aligns with holes 218.

Referring now to FIG. 14, upper pedestal 230 is placed onto flashing 220.

Referring now to FIG. 15, another configuration of base 210, flashing 220, and upper pedestal 230 is shown.

Referring now to FIGS. 16-18, multiple views of an upper pedestal are shown. An upper pedestal such as upper pedestal 1630 is similar to upper pedestal 230 as shown and described in FIG. 9 and others, and to other upper pedestals. Upper pedestal 1630 may include slots 1635 and 1636 that may align with holes 223 and holes 218, shown and described in FIGS. 12 and 13.

Referring now to FIG. 19, an alternate embodiment of a base is shown.

Referring now to FIG. 20, an alternate configuration of a base 2210, flashing 2220, and leveling foot 110 is shown where no upper pedestal appears between the flashing 2220 and the leveling foot 110.

Referring now to FIG. 21, an alternate upper pedestal, flashing, and base are shown. An upper pedestal such as upper pedestal 2130 is similar to upper pedestal 230 as shown and described in FIG. 9 and others, to upper pedestal 1630 as shown and described in FIG. 16 and others, and to other upper pedestals. A base such as base 2110 is similar to base 2210 as shown and described in FIG. 20 and others, and to other bases. A flashing such as flashing 2120 is similar to flashing 2220 as shown in FIG. 20 and others, and to other flashings.

Referring now to FIG. 22, a side view of the components of FIG. 21 is shown.

Referring now to FIG. 23, an isometric view of flashing 2120 is shown.

Referring now to FIGS. 24-28, various views of upper pedestal 2133 are shown.

Referring now to FIGS. 29-32, the installation sequence of the components of FIG. 21 is shown.

Referring now to FIG. 33, an alternate upper pedestal, flashing, and base are shown. An upper pedestal such as upper pedestal 3330 is similar to upper pedestal 230 as shown and described in FIG. 9 and others, to upper pedestal 1630 as shown and described in FIG. 16 and others, and to other upper pedestals. A base such as base 3110 is similar to base 2210 as shown and described in FIG. 20 and others, and to other bases. A flashing such as flashing 3320 is similar to flashing 2220 as shown in FIG. 20 and others, and to other flashings.

Referring now to FIG. 34, a side view of the components of FIG. 33 is shown.

Referring now to FIG. 34A, a bottom-isometric view of upper pedestal 3330 is shown.

Referring now to FIG. 35, an isometric view of flashing 3320 is shown.

Referring now to FIGS. 36-39, the installation sequence of the components of FIG. 33 is shown.

Referring now to FIG. 40, an alternative embodiment of a base is shown. Base 4010 is similar to base 3310 as shown and described in FIG. 36 and others, and to other bases.

Referring now to FIGS. 41 and 42, an alternative embodiment of a flashing is shown. Flashing 4020 is similar to flashing 3320 as shown and described in FIG. 33 and others, and to other flashings. As described further below, flashing 4020 is formed to engage base 4010.

Referring now to FIGS. 43-45, flashing 4020 is shown installed on base 4010 and then connected to a leveling foot.

Referring now to FIG. 46, an alternate embodiment for installing a leveling foot on a roof through a flashing is shown.

Referring now to FIG. 47, an embodiment of a flashing is shown. Flashing 4620 is similar to flashing 4020 as shown and described in FIG. 43 and others, and to other flashings.

Referring now to FIG. 48, the top portion of the components of FIG. 46 is shown.

Referring now to FIGS. 49-52, the installation steps for the components of FIG. 46 are shown.

Referring now to FIGS. 53 and 54, a shingle flashing mount is shown. A shingle flashing mount such as shingle flashing mount 5300 may include flashing 5310, base 5320, threaded pedestal 5330, and platform 5335.

Referring now to FIG. 55, PV module 1000 is shown connected to a shingle flashing mount. FIG. 56 is an enlarged view of area B of FIG. 55.

Referring now to FIG. 56, PV module 1000 is shown resting atop platform 5335. Clip 5610 then engages groove 1005 and platform 5335 to secure PV module 1000 to shingle flashing mount 5300.

Referring now to FIGS. 57-59, a metal roof mount is shown. A metal roof mount such as metal roof mount 5700 may connect a leveling foot to a trapezoidal roof.

Referring now to FIG. 60, an alternative embodiment of an upper arm is shown. An upper arm such as upper arm 6030 may connect a PV module to a tile roof using a clip such as clip 6098 rather than a leveling foot.

Referring now to FIGS. 61-64, multiple views show a PV module connecting to a top arm using a clip.

Referring now to FIG. 65, yet another embodiment of a base 6510 and top arm 6500 are shown.

Referring now to FIGS. 66-74, embodiments of wire clips are shown. Wire clips 6600, 6900, and 7200 engage a wire and the groove 105A of a frame to capture the wire.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions, and sub-combinations as are within their true spirit and scope.

What is claimed is:

1. A leveling foot for mounting first and second photovoltaic modules on a structure and adjusting the height of the first and second photovoltaic modules above the structure, comprising:
   (a) a base portion;
   (b) a stud portion extending upwardly from the base portion; and (c) a spring coupling mounted to the stud portion, wherein the spring coupling comprises:
 (i) a key portion having upper and lower jaws, and
 (ii) a tongue portion, and
 (iii) a grounding clip received between the upper and lower jaws of the key portion,
 wherein the height of the spring coupling is adjustable with respect to the base portion to raise or lower the first and second photovoltaic modules, and
 wherein the grounding clip penetrates into frames of the first and second photovoltaic modules.

2. The leveling foot of claim 1, wherein the spring coupling further comprises:
 (iv) a support below the lower jaw, and
 (v) a tail below the tongue portion.

3. The leveling foot of claim 2, wherein the tail is longer than the tongue portion.

4. The leveling foot of claim 1, wherein the key and tongue portions extend from opposite sides of the spring coupling.

5. The leveling foot of claim 1, wherein the key portion is shorter than the tongue portion.

6. The leveling foot of claim 1, wherein the upper and lower jaws compress together when the key portion is received into a side groove in a photovoltaic module.

7. The leveling foot of claim 1, wherein the grounding clip penetrates into frames of first and second photovoltaic modules when the first photovoltaic module is received onto the key portion of the spring coupling and the second photovoltaic module is received onto the tongue portion of the spring coupling.

8. The leveling foot of claim 1, wherein the grounding clip has teeth on opposite ends.

9. The leveling foot of claim 1, wherein the key portion is dimensioned to be received within a side groove of a first photovoltaic module and the tongue portion is dimensioned to be received within a side groove of a second photovoltaic module.

10. The leveling foot of claim 1, wherein the key portion locks into a side groove in a first photovoltaic module and prevents the first photovoltaic module from moving, and wherein the tongue portion locks into a side groove in a second photovoltaic module but permits the second photovoltaic module to move in a horizontal direction.

11. The leveling foot of claim 1, wherein the height of the spring coupling above the base portion is adjustable by rotating the stud portion with respect to the spring coupling.

12. The leveling foot of claim 11, wherein the stud portion is rotatable by accessing a tool-receiving structure on the top of the stud portion.

13. The leveling foot of claim 1, wherein the base portion has an attachment slot passing therethrough.

14. The leveling foot of claim 1, wherein both the key and tongue portions have upwardly facing ridges at their distal ends.

* * * * *